US012634379B1

(12) United States Patent
Paithankar et al.

(10) Patent No.: US 12,634,379 B1
(45) Date of Patent: May 19, 2026

(54) FAULT-TOLERANT STREAMING SESSION SETUP

(71) Applicant: NVIDIA Corporation, Santa Clara, CA (US)

(72) Inventors: Abhijit Prakash Paithankar, San Jose, CA (US); Suryanarayan Ramamurthy, Sunnyvale, CA (US); Sukesh Roy, San Ramon, CA (US); Srivatsan Kasturi, Saratoga, CA (US); Nivedita Viswanath, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/225,039

(22) Filed: Jul. 21, 2023

Related U.S. Application Data

(60) Provisional application No. 63/401,109, filed on Aug. 25, 2022.

(51) Int. Cl.
*H04L 67/56* (2022.01)
*H04L 9/40* (2022.01)
*H04L 67/14* (2022.01)
(52) U.S. Cl.
CPC .......... *H04L 67/56* (2022.05); *H04L 63/0281* (2013.01); *H04L 67/14* (2013.01)
(58) Field of Classification Search
CPC ...... H04L 63/0281; H04L 67/14; H04L 67/56
See application file for complete search history.

(56) References Cited

U.S. PATENT DOCUMENTS

| | | | |
|---|---|---|---|
| 11,695,736 B2 * | 7/2023 | Niemi | H04L 67/10 726/12 |
| 2008/0170553 A1 * | 7/2008 | Montemurro | H04W 28/065 370/338 |
| 2017/0093923 A1 * | 3/2017 | Duan | G06F 11/2028 |
| 2018/0270202 A1 * | 9/2018 | Li | H04L 63/0209 |
| 2019/0238514 A1 * | 8/2019 | Safford | G06F 21/53 |
| 2020/0045015 A1 * | 2/2020 | Nukala | H04L 63/1416 |
| 2020/0067801 A1 * | 2/2020 | McCormick | H04L 43/062 |
| 2023/0164117 A1 * | 5/2023 | Wu | H04L 63/20 726/1 |
| 2023/0319112 A1 * | 10/2023 | Kaimal | H04L 63/20 726/1 |

OTHER PUBLICATIONS

IEEE "IEEE Standard for Floating-Point Arithmetic", Microprocessor Standards Committee of the IEEE Computer Society, IEEE Std 754-2008, dated Jun. 12, 2008.

(Continued)

*Primary Examiner* — Gil H. Lee
(74) *Attorney, Agent, or Firm* — Robert C. Kowert; Kowert, Hood, Munyon, Rankin & Goetzel, P.C.

(57) ABSTRACT

Apparatuses, systems, and techniques to generate and/or perform one or more software containers. In at least one embodiment, one or more software containers configure communication, such as to perform streaming applications. In at least one embodiment, a processor comprising one or more circuits generates one or more software containers, wherein one or more software containers are to automatically provide network configuration information to one or more proxy servers.

20 Claims, 50 Drawing Sheets

(56)         References Cited

OTHER PUBLICATIONS

IEEE, "IEEE Standard for 802.3," IEEE Standard for Ethernetn, IEEE Computer Society, Dec. 28, 2012, 634 pages.
Wikipedia, "IEEE 802.11," Wikipedia the Free Encyclopedia, https://en.wikipedia.org/wiki/IEEE_802.11, most recent edit Sep. 20, 2020 [retrieved Sep. 22, 2020], 15 pages.
Wikipedia, "IEEE 802.5," Wikepedia The Free Encyclopedia, https://en.wikipedia.org/wiki/Token_Ring, Jan. 14, 2020, 12 pages.

* cited by examiner

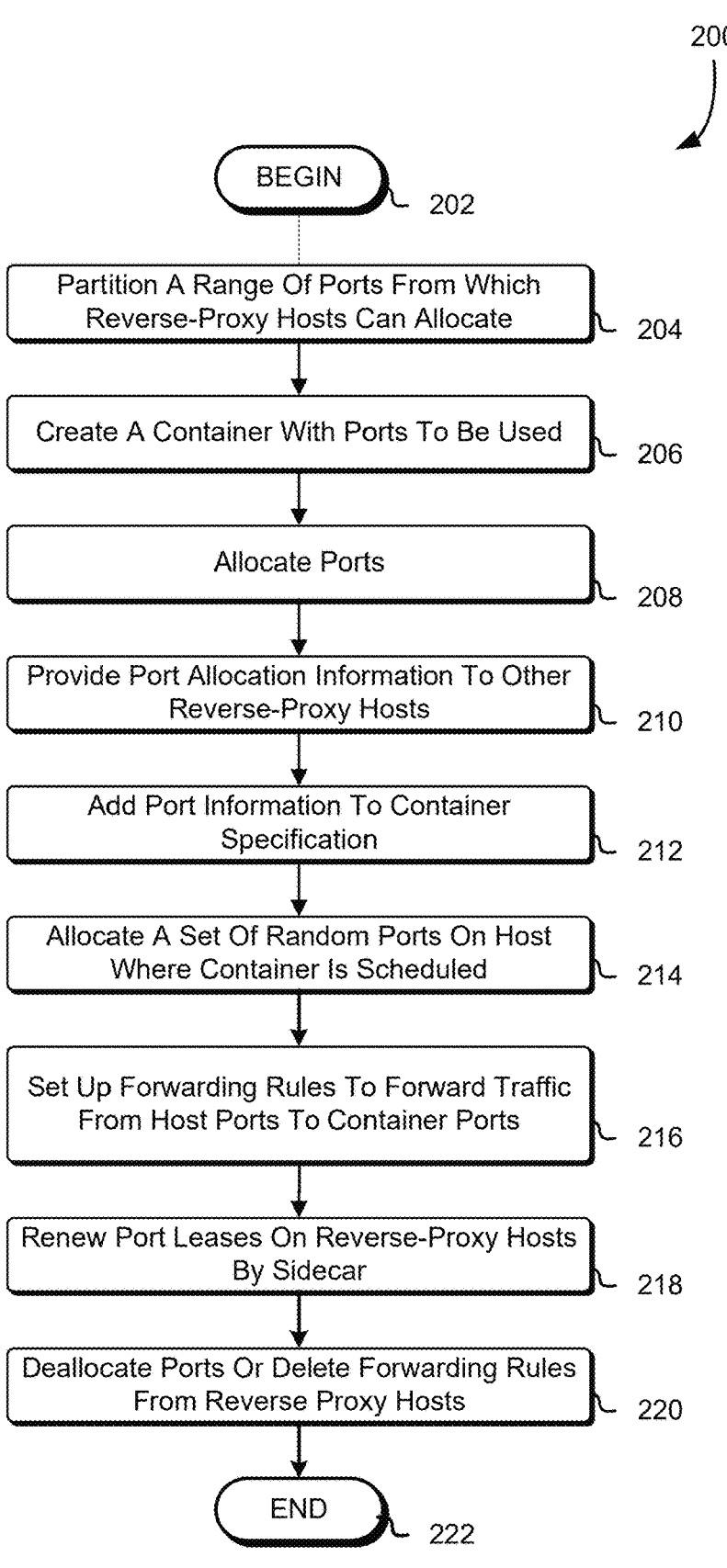

200

BEGIN — 202

Partition A Range Of Ports From Which
Reverse-Proxy Hosts Can Allocate — 204

Create A Container With Ports To Be Used — 206

Allocate Ports — 208

Provide Port Allocation Information To Other
Reverse-Proxy Hosts — 210

Add Port Information To Container
Specification — 212

Allocate A Set Of Random Ports On Host
Where Container Is Scheduled — 214

Set Up Forwarding Rules To Forward Traffic
From Host Ports To Container Ports — 216

Renew Port Leases On Reverse-Proxy Hosts
By Sidecar — 218

Deallocate Ports Or Delete Forwarding Rules
From Reverse Proxy Hosts — 220

END — 222

Software Program

602

Driver/Runtime                                              604

API(s)                                              608

Function(s)                                   610

Library                                              606

Memory

612

700

800

DATABASE
814

DATABASE
816

COMPONENT
818

COMPONENT
820

COMPONENT
822

• • •

SERVER 812

NETWORK(S)
810

802

808

804

806

DATA CENTER
900
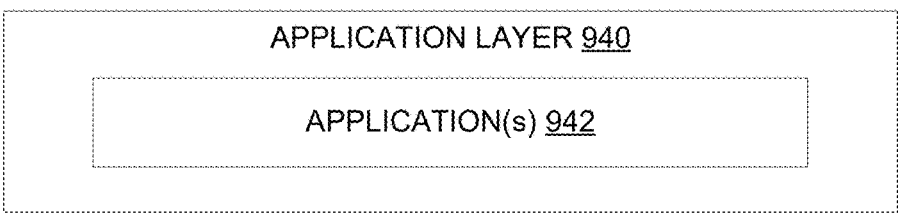
APPLICATION LAYER 940
APPLICATION(s) 942
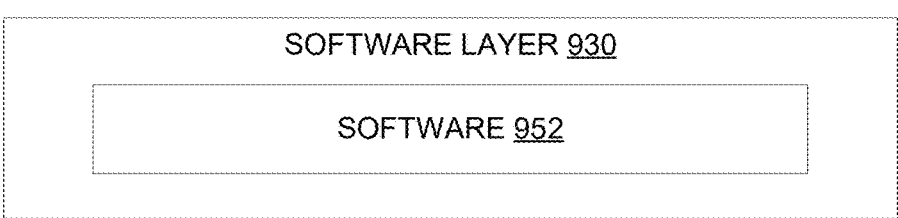
SOFTWARE LAYER 930
SOFTWARE 952
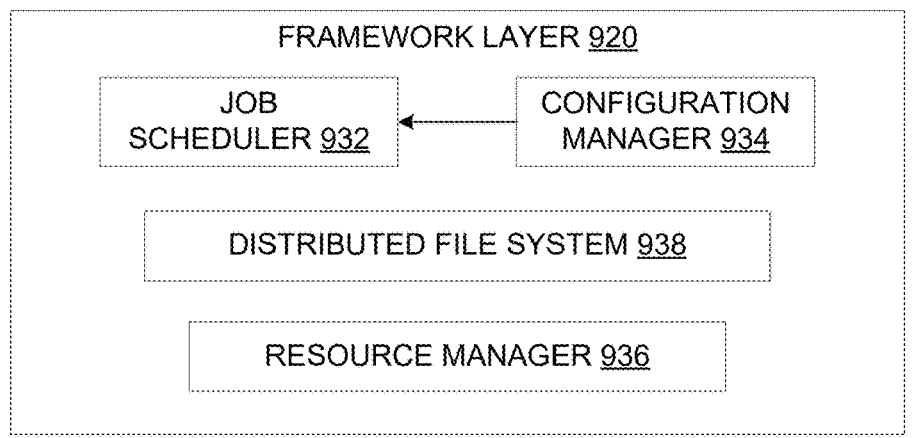
FRAMEWORK LAYER 920
JOB SCHEDULER 932 ← CONFIGURATION MANAGER 934
DISTRIBUTED FILE SYSTEM 938
RESOURCE MANAGER 936
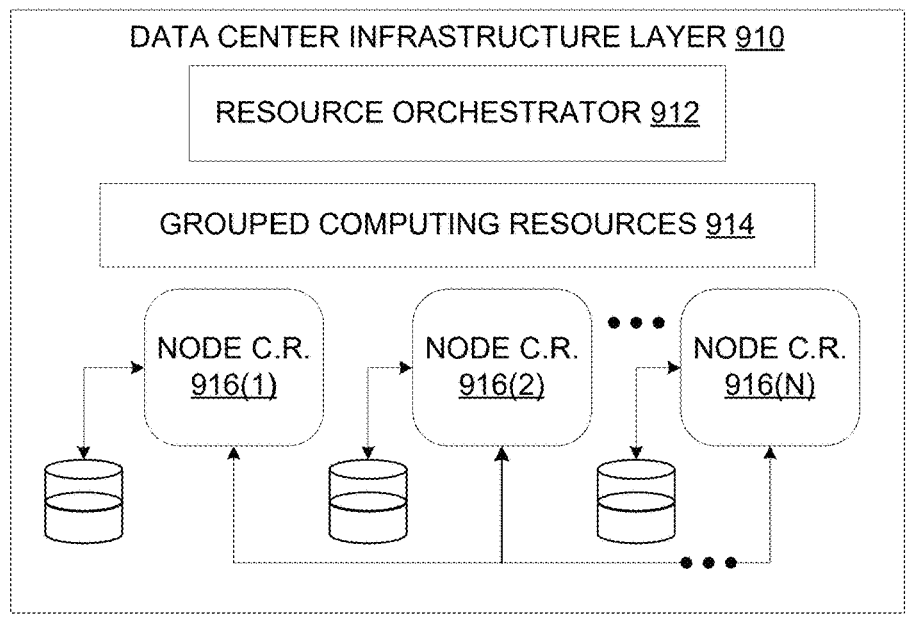
DATA CENTER INFRASTRUCTURE LAYER 910
RESOURCE ORCHESTRATOR 912
GROUPED COMPUTING RESOURCES 914
NODE C.R. 916(1)   NODE C.R. 916(2)   • • •   NODE C.R. 916(N)
FIG. 9

1200C

2200

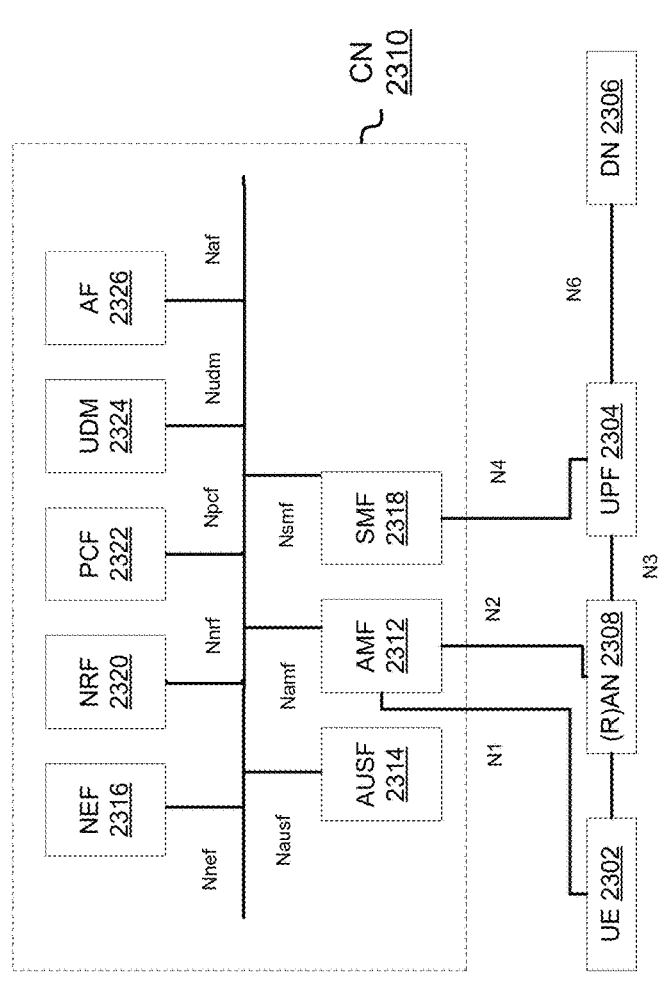
FIG. 23

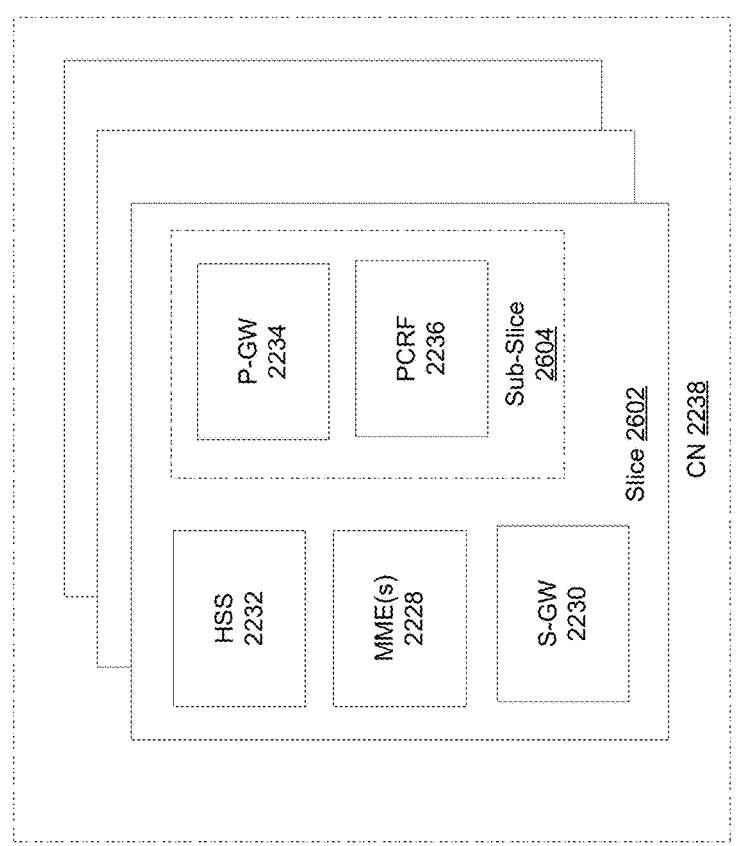
FIG. 26

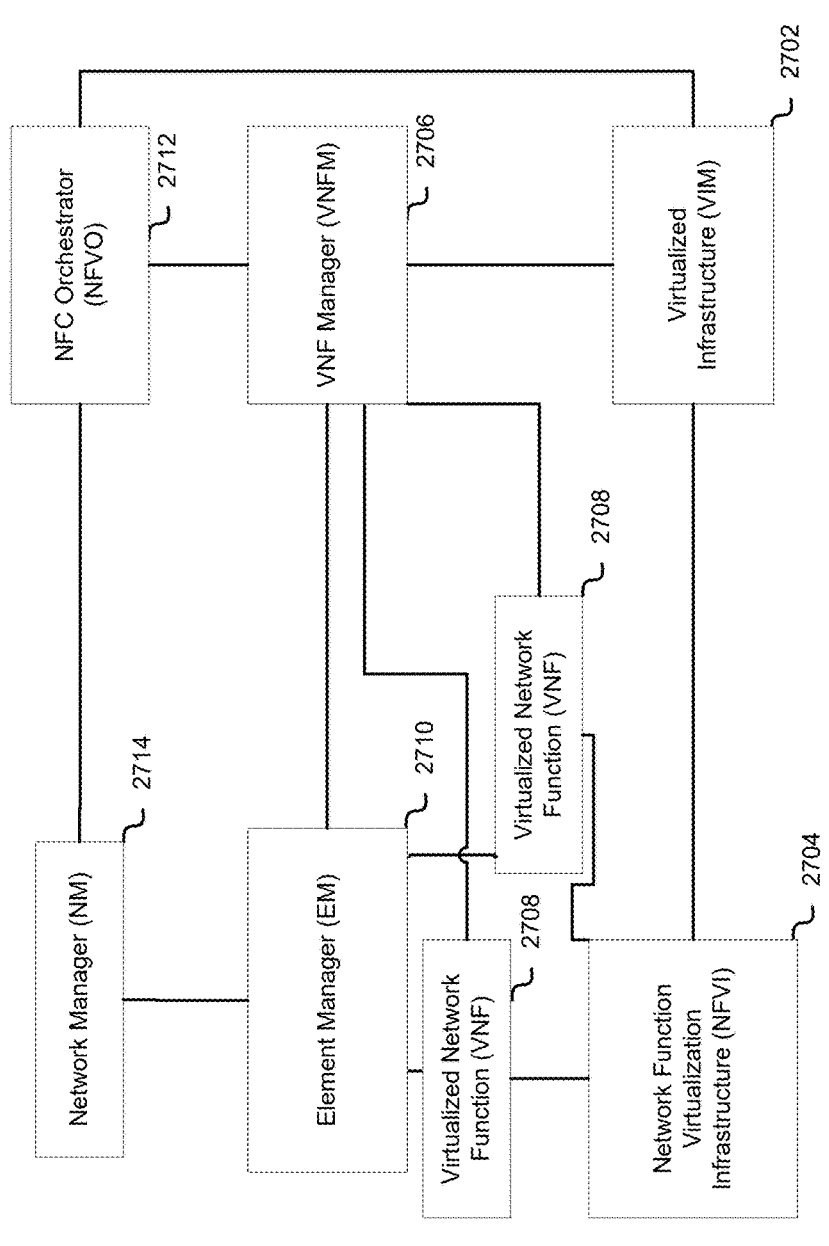
FIG. 27

GRAPHICS PROCESSOR
3610

GRAPHICS PROCESSOR
3640

GRAPHICS CORE
3700

FAULT-TOLERANT STREAMING SESSION SETUP

CLAIM OF PRIORITY

This application claims the benefit of U.S. Provisional Application No. 63/401,109 titled "FAULT-TOLERANT STREAMING SESSION SETUP," filed Aug. 25, 2022, the entire contents of which is incorporated herein by reference.

TECHNICAL FIELD

At least one embodiment pertains to processors or computing systems used to generate one or more software containers, wherein one or more software containers are to automatically provide network configuration information to one or more proxy servers according to various novel techniques described herein. For example, in at least one embodiment, a processor uses a software container to perform streaming applications and, in at least one embodiment, a processor uses one or more proxy servers to communicate through a firewall.

BACKGROUND

Existing techniques to provide streaming sessions for accelerated graphics can use significant computing resources and can suffer from faults due to network latency. Techniques for streaming accelerated graphics can be improved.

BRIEF DESCRIPTION OF THE DRAWINGS

FIG. 2 illustrates an example process of allocating or deallocating ports, in accordance with at least one embodiment;

FIG. 9 illustrates an exemplary data center, in accordance with at least one embodiment;

FIG. 23 illustrates an architecture of a system of a network, in accordance with at least one embodiment;

FIG. 26 illustrates components of a core network, in accordance with at least one embodiment;

FIG. 27 illustrates components of a system to support network function virtualization (NFV), in accordance with at least one embodiment;

DETAILED DESCRIPTION

Figure 1:
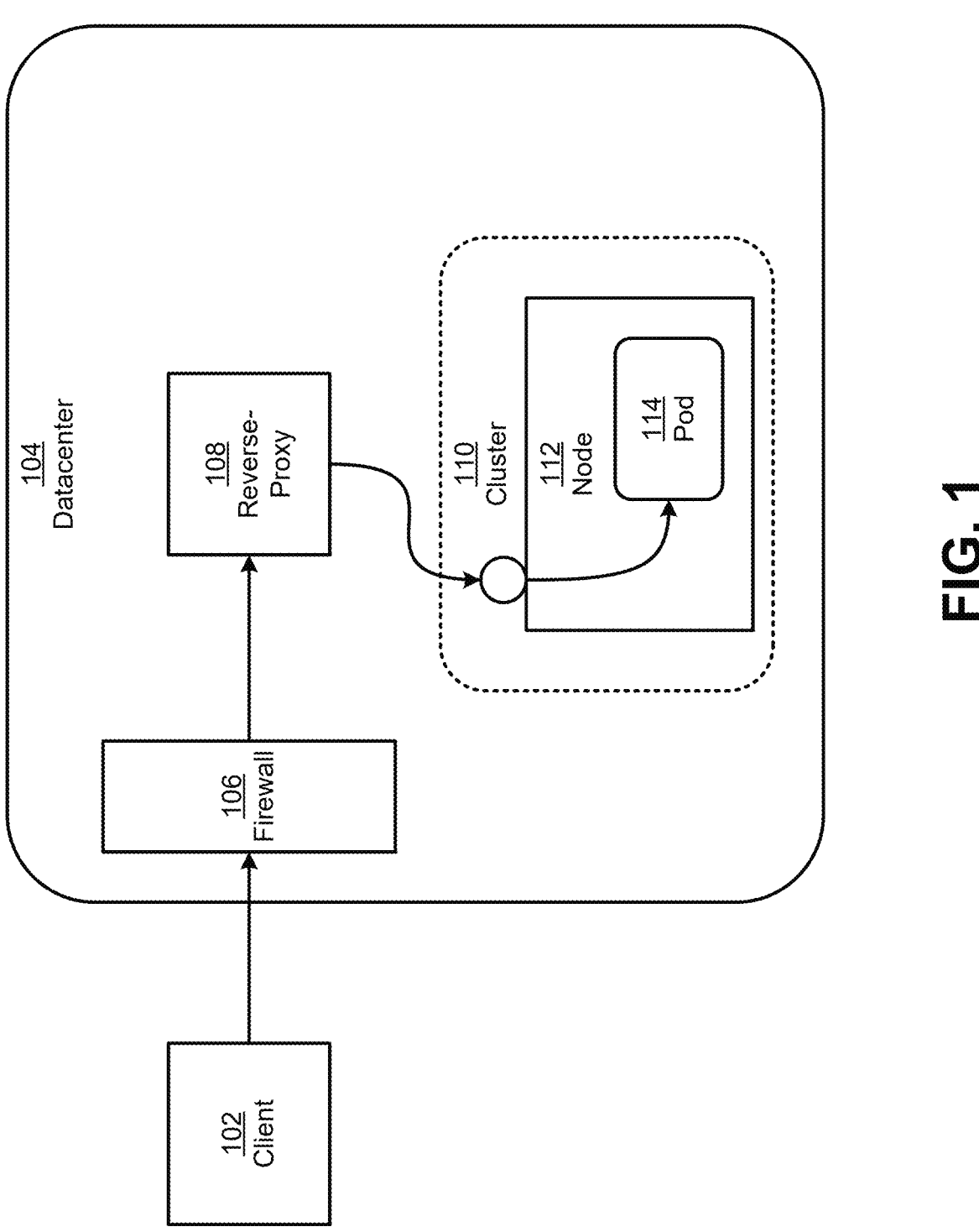
FIG. 1 illustrates a system to setup a fault-tolerant streaming session, according to at least one embodiment.

In at least one embodiment, software containers are used to run streaming applications with lower latency than virtual machines. In at least one embodiment, a software container comprises a set of software, including an application program and software libraries, that is sufficient to enable said application to run in a computing environment independently of that computing environment's underlying operating system. In at least one embodiment, a container implements a virtual operating system. In at least one embodiment, a container comprises application software and software libraries required for said application to be run, without reliance on operating system software not included in said container. In at least one embodiment, a software container is a Docker container, Kubernetes container, or Open Container Initiative (OCI) container. In at least one embodiment, a software container is another type of container.

In at least one embodiment, processes and systems described herein include automatic configuration of various network settings of software containers, such as settings for firewalls and port forwarding. In at least one embodiment, for example, a process does not require manual configuration of network settings, such that a streaming session is configured to leverage these settings automatically.

In at least one embodiment, a processor selects a firewall port to use and to generate a software container with one or more programs. In at least one embodiment, for example, said one or more programs include a server program and a program to configure a proxy server to use a selected firewall port to communicate with said server program. In at least one embodiment, a control plane server is a server that manages other servers in a data center, where said other servers are implemented as software containers. In at least one embodiment, a control plane server randomly selects a firewall port to use. In at least one embodiment, random selection is a security measure to prevent attackers from predicting which port to attack. In at least one embodiment, a control plane server then generates a software container with one or more programs, such as a server program and a program to configure a proxy server to use a port. In at least one embodiment, a program to configure a proxy server transmits network configuration information (e.g., including a selected firewall port) to a proxy server to enable a proxy server to communicate with a server program through a firewall. In at least one embodiment, a control plane server determines a network settings (e.g., firewall port) and generates a software container to automatically configure a proxy server to communicate with a software container. In at least one embodiment, for example, a processor comprising one or more circuits generates one or more software containers, wherein one or more software containers are to automatically provide network configuration information to one or more proxy servers.

In the following description, numerous specific details are set forth to provide a more thorough understanding of at least one embodiment. However, it will be apparent to one skilled in the art that the inventive concepts may be practiced without one or more of these specific details.

FIG. 1 illustrates a system 100 to setup a fault-tolerant streaming session, according to at least one embodiment. In at least one embodiment, a system 100 includes a client 102, datacenter 104, firewall 106, reverse-proxy 108 (e.g., network intermediary), cluster 110 (e.g., processing cluster illustrated in FIG. 38B), node 112, and/or pod 114. In at least one embodiment, a data center includes a firewall 106, reverse-proxy 108, a cluster 110, a node 112, and a pod 114.

In at least one embodiment, a client 102 sends a packet of data (e.g., transmission control protocol (TCP) and/or user datagram protocol (UDP)) to a public internet protocol (IP) address, such as a port assigned to a stream of data. In at least one embodiment, a public IP routes to a firewall 106 (e.g., FORTIGATE network address translation (NAT)). In at least one embodiment, a firewall 106 performs destination network address translation (DNAT) of a public IP, ports to a private IP, and ports to a reverse-proxy 108. In at least one embodiment, a firewall 106 (e.g., FORTIGATE) is configured a-priori to map a block of ports to a reverse-proxy 108 IP one-to-one. In at least one embodiment, a reverse-proxy 108 is configured with IP table rules to DNAT a destination private IP, port to a node 112 IP, and port for a job. In at least one embodiment, a cluster 110 includes one or more nodes 112. In at least one embodiment, a node 112 includes one or more pods 114. In at least one embodiment, a node 112 IP is a reachable IP of a node 112 where a pod 114 is scheduled. In at least one embodiment, a reverse-proxy 108 performs source network address translation (SNAT) of a connection as well to its own private IP. In at least one embodiment, at a node 112, a packet of data gets forwarded to a pod 114 by a node-port service IP virtual server's (IPVS) rules.

In at least one embodiment, system 100 includes a collection of one or more hardware and/or software computing resources with instructions that, when executed, performs one or more communication processes such as those described herein. In at least one embodiment, system 100 is a software program executing on computer hardware, application executing on computer hardware, and/or variations thereof. In at least one embodiment, one or more processes of system 100 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof.

In at least one embodiment, a datacenter is as illustrated in FIGS. 8-44. In at least one embodiment, a firewall 106 is a firewall 406 (see FIG. 4) and/or firewall 530 (see FIG. 5). In at least one embodiment, a firewall 406 is a FORTIGATE firewall. In at least one embodiment, a reverse-proxy 108 is a network intermediary. In at least one embodiment, a reverse-proxy 108 includes a reverse-proxy 408A-D (see FIG. 4) and/or reverse-proxy 524A-C (see FIG. 5). In at least one embodiment, a cluster 110 is a BCP 410A-C cluster (see FIG. 4).

In at least one embodiment, a system 100 includes a processor comprising one or more circuits to generate one or more software containers, wherein one or more software containers are to automatically provide network configuration information to one or more proxy 108 servers. In at least one embodiment, a software container is one or more software programs, to an application and/or a software library to communicate with a virtual operations system. In at least one embodiment, a control plane, which manages one or more servers of a datacenter 104, generates a software container. In at least one embodiment, to automatically provide is otherwise to automatically communicate. In at least one embodiment, a software container automatically communicates with a proxy 108 server using one or more application programming interfaces (APIs) or other communication methods described herein. In at least one embodiment, network configuration information includes a public IP, external ports to connect to, and/or other information described herein. In at least one embodiment, to generate is otherwise to write instructions. In at least one embodiment, a generated software container contains, or otherwise includes, instructions to configure (e.g., setup) one or more proxy 108 servers to use one or more selected firewall ports. In at least one embodiment, a proxy 108 server is a system and/or router to provide a gateway between one or more users and internet. In at least one embodiment, a firewall port is a point of entry or exit of network traffic, such as data traffic. In at least one embodiment, a firewall port is randomly selected using methods described herein. In at least one embodiment, random is otherwise semi-randomization. In at least one embodiment, using a port, a system 100 streams graphics to a client 100 via one or more randomly configured firewall ports. In at least one embodiment, to stream is otherwise to live-stream one or more applications such as a graphic application. In at least one embodiment, a streaming session communicates through ne or more proxy 108 servers, such as by an API to indicate a port renewal or termination. In at least one embodiment, for example, a streaming session communicates through one or more proxy 108 servers is to expire a leased port when not renewed within a threshold (e.g., period) amount of time, such as when an amount of time has elapsed.

In at least one embodiment, a system 100 performs process 200 (see FIG. 2), process 300 (see FIG. 3), combinations, and/or portions thereof. In at least one embodiment, a system 100 is further illustrated in FIGS. 4-7. In at least one embodiment, a system 100 includes one or more hardware illustrated in FIGS. 8-44, such as to generate one or more software containers, wherein one or more software containers are to automatically provide network configuration information to one or more proxy servers and/or otherwise perform operations described herein.

FIG. 2 illustrates an example process 200 of allocating or deallocating ports, in accordance with at least one embodiment. In at least one embodiment, a process 200 begins 202 when invoked by one or more processors, such as in response to an API. In at least one embodiment, a system (e.g., 400, 500, 600, and/or 700) using a process 200 performs allocation and/or deallocation of one or more ports, such as to perform one or more streaming applications based, at least in part, on generating a software container and/or otherwise performing operations described herein. In at least one embodiment, a processor 702 performs one or more steps of process 200, 300, and/or a combination of both. In at least one embodiment, a process 200 includes one or more steps to partition 204 a range of ports from which one or more reverse-proxy hosts can allocate ports, create 206 a container with ports to be exposed to an outside world, allocate 208 ports, provide 210 port allocation information to other reverse-proxy hosts, add 212 port information to container specification, allocate 214 a set of random ports on host where container is scheduled, set 216 up forwarding rules on reverse proxies and host to forward traffic from host ports, through one or more reverse proxies, to container ports, renew 218 port leases on reverse-proxy hosts by sidecar, deallocate 220 ports or delete forwarding rules from a reverse-proxy host, and/or combinations thereof. In at least one embodiment, for example a machine-readable medium having stored thereon a set of instructions (e.g., instructions to perform process 200), which if performed by one or more processors, cause one or more processors to generate one or more software containers, wherein the one or more software containers are to automatically provide network configuration information to one or more proxy servers and/or otherwise perform operations described herein.

In at least one embodiment, some or all of process 200 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium comprising a plurality of computer-readable instructions executable by one or more processors. In at least one embodiment, a computer-readable storage medium is a non-transitory computer-readable medium. In at least one embodiment, at least some computer-readable instructions usable to perform process 200 are not stored solely using transitory signals (e.g., a propagating transient electric or electromagnetic transmission). In at least one embodiment, process 200 is performed at least in part on a computer system such as those described elsewhere in this disclosure. In at least one embodiment, logic (e.g., hardware, software, or a combination of hardware and software) performs process 200.

In at least one embodiment, a processor (e.g., processor 702) begins 202 a process 200, which includes to receive one or more inputs. In at least one embodiment, for example, a process 200 includes receiving one or more inputs, which includes information received from one or more APIs, such as network configuration information.

In at least one embodiment, an input of a process 200 includes information, software programs, an API output, video, text, symbols, previous inputs, information of a streaming application, information represented as data, an output od described systems, and/or other inputs described herein. In at least one embodiment, one or more inputs are conveyed by a signal to a processor. In at least one embodiment, one or more information are information represented as one or more packets of data. In at least one embodiment, an input is received by a software process, such as those described in connection to any FIGS. 1-7. In at least one embodiment, an input of a process 200 is an output of one or more systems in FIGS. 8-44.

Figure 3:
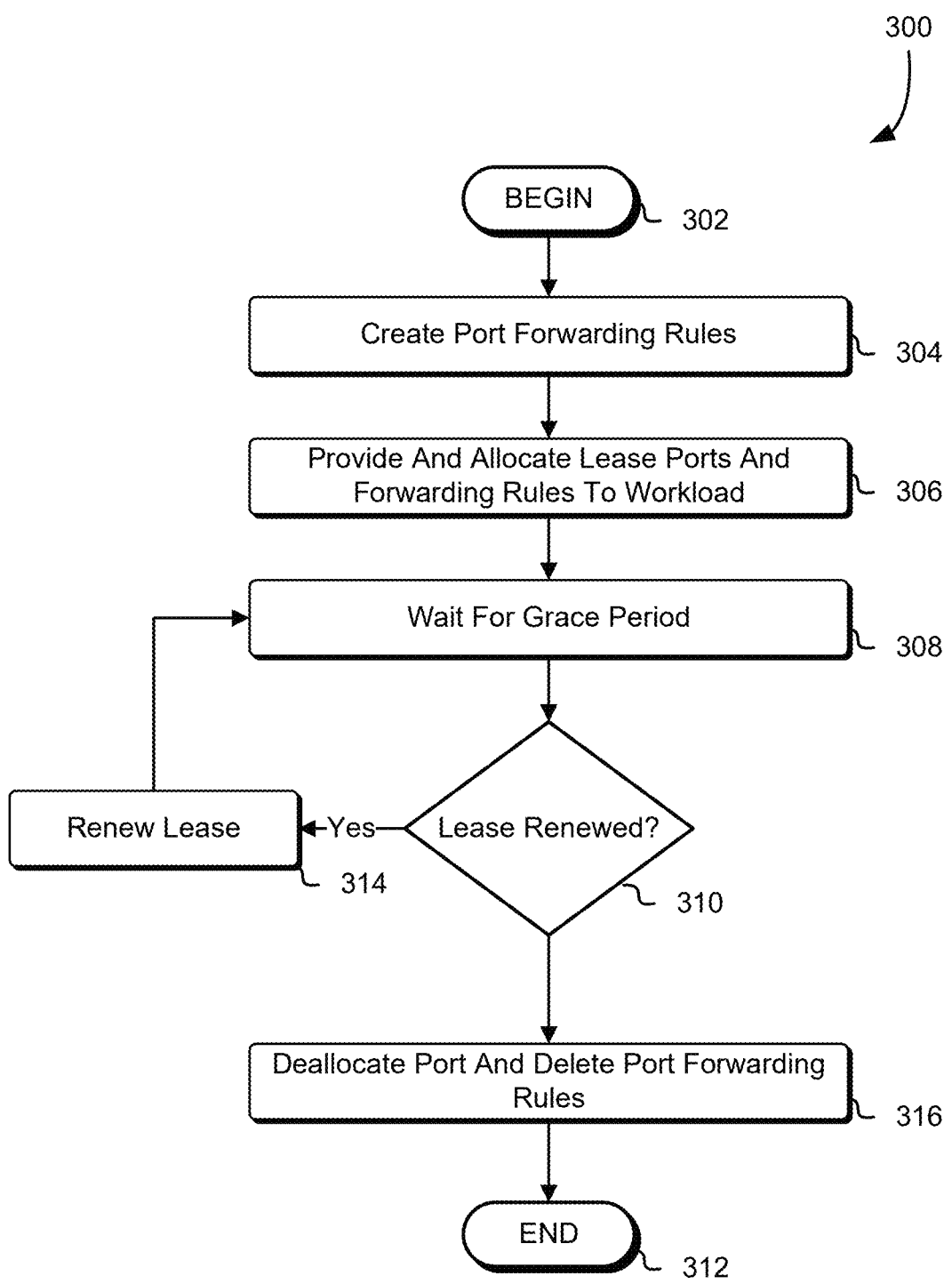
FIG. 3 illustrates an example process of configuring and maintaining port forwarding rules, in accordance with at least one embodiment.

In at least one embodiment, a process is implemented in GPU cloud, such as to be executed in a cloud. Note that although FIGS. 2 and 3 are illustrated and described as a series of steps, embodiments may alter s depicted or described order in various ways, including reordering steps, omitting steps, or performing steps in parallel, except where explicitly stated or logically required.

In at least one embodiment, streaming accelerated graphics from a data center to remote clients allows immersive interactive three-dimensional (3D) applications to be delivered to different places, times, and/or platforms. In at least one embodiment, such streaming applications allow businesses to scale rapidly. In at least one embodiment, streaming is performed using streamSDK. In at least one embodiment, streaming involves a client being able to connect to a streaming server using various transmission control protocol (TCP) and user datagram protocol (UDP) ports. In at least one embodiment, for example, streaming involves one or more ports, such as 48010 (TCP, signaling), 47998 (UDP, video), 47999 (UDP, control), and/or 4800 (UDP, audio).

In at least one embodiment, one or more systems use containerized applications in connection with process 200 to dynamically set up paths to services running in a container deployed in a compute cluster in a fault-tolerant and secure configuration, without needing to resort to static configuration of firewall or port-forwarding rules. In at least one embodiment, a process 200 includes a step to partition a range of ports from which a reverse-proxy host can allocate. In at least one embodiment, a processor partitions 204 one or more ports using layer-4 addresses, such as to direct data to a correct location within a device. In at least one embodiment, a next generation controller (NGC) job controller communicates to lease one or more ports, such as those partitioned 204.

In at least one embodiment, a set of stateful hosts act as network intermediaries (e.g., reverse-proxy hosts). In at least one embodiment, hosts provide a method to dynamically provision ports in a firewall and set up routes to direct traffic to/from endpoints within a datacenter. In at least one embodiment, such a framework does not require (e.g., though may include) special handling in a scheduler or pre-determined setup in cluster. In at least one embodiment, coordination between hosts is not needed to set up endpoints. Embodiments of this framework reduces a number of hops in connection paths and thereby improve fault-tolerance of a system and/or session while maintaining security. In at least one embodiment, a process 200 includes a step to create a container with ports to be expose to outside world. In at least one embodiment, a firewall has one or more ports created 206.

In at least one embodiment, an NGC controller indicates to begin leasing a port, otherwise to allocate 208 one or more ports to an NGC controller. In at least one embodiment, an NGC controller indicates to allocate a port based, at least in part, on one or more APIs. In at least one embodiment, for example, to allocate 208 one or more ports an NGC controller randomly chooses a reverse-proxy node to allocate 208 one or more ports. In at least one embodiment, an NGC controller waits a time period (e.g., 3 seconds) for a response, where if no response is received may repeat its communication to a reverse-proxy node until a response or communicate to a next reverse-proxy node. In at least one embodiment, a communication to allocate ports of a network intermediary includes using an API to create a streaming session using a first network intermediary (e.g., reverse-proxy node). In at least one embodiment, a reverse-proxy node responds using one or more APIs, to provide 210 port allocation information to other reverse-proxy hosts. In at least one embodiment, a reverse-proxy node is a network intermediary. In at least one embodiment, once a network intermediary (e.g., reverse-proxy node) provides 210 port allocation information to other reverse-proxy hosts, a processor adds port information to containerized application specification.

In at least one embodiment, a process 200 includes a step to add port information to a container specification. In at least one embodiment, endpoint ports on host and in a firewall are allocated 214 randomly. In at least one embodiment, for example, a processor allocates 214 a set of random ports on host where a container is scheduled. In at least one embodiment, a processor to allocate 214 randomly prevents unauthorized users from predicting a port to be used. In at least one embodiment, to allocate 214 includes double-randomized source-destination paths, which are created dynamically as well as insulated from abuse. In at least one embodiment, a process 200 includes to set 216 up forwarding rules on a host to forward traffic from host ports to containerized ports. In at least one embodiment, for example, routes are set 216 up or torn down dynamically to prevent unintended traffic from reaching workload endpoints. In at least one embodiment, port allocation or route information is replicated across one or more (e.g., all) intermediary nodes. In at least one embodiment, this replication across nodes may facilitate fault-tolerance or protection from abuse by users that should not have access.

In at least one embodiment, port allocations may utilize a lease-based protocol. In at least one embodiment, a process 200 includes to renew 218 one or more port leases on a network intermediary (e.g., reverse-proxy host) by a sidecar application. In at least one embodiment, a client is responsible to renew 218 a lease on port allocations in firewall. In at least one embodiment, client contacts server to renew 218 lease base on a lease term. In at least one embodiment, a client may provide port allocation information across reverse-proxy hosts. In at least one embodiment, an application programming interface renews 218 a lease. In at least one embodiment, a processor renews 218 a lease using an API to refresh a streaming session.

In at least one embodiment, a processor performing a process 200 deallocates 220 port or deletes forwarding rules from a network intermediary (e.g., reverse-proxy) hosts. In at least one embodiment, for example, a port is deallocated 220 based, at least in part, on a lease not being renewed. In at least one embodiment, a processor deallocates 220 a port or deletes forwarding rules using one or more APIs to cause deletion of a streaming session.

In at least one embodiment, ports are allocated or deallocated 220 as part of a workflow. In at least one embodiment, a port is deallocated when a lease expires, such as when it is not renewed over a period of time. In at least one embodiment, workflow includes partitioning a range of ports, from which reverse-proxy hosts can allocate. In at least one embodiment, partitioning range of ports does not require, though may include, coordination between reverse-proxy hosts during port allocation or deallocation 220. In at least one embodiment, a process 200, once a processor deallocates 220 a port, proceeds to end 222.

In at least one embodiment, a system uses a process 200 to generate one or more software containers, wherein one or more software containers are to automatically provide network configuration information to one or more proxy servers and/or otherwise perform operations described herein. In at least one embodiment, a system 100 (see FIG. 1), 400 (see FIG. 4), 500 (see FIG. 5), 600 (see FIG. 6), and/or 700 (see FIG. 7) uses process 200 and/or portions thereof. In at least one embodiment, a process 200 is further illustrated in FIGS. 1-7. In at least one embodiment, one or more hardware illustrated in FIGS. 8-44 uses a process 200, such as to generate one or more software containers, wherein one or more software containers are to automatically provide network configuration information to one or more proxy servers and/or otherwise perform operations described herein.

FIG. 3 illustrates an example process 300 of configuring and maintaining port forwarding rules, in accordance with at least one embodiment. In at least one embodiment, for example, a process 300 includes sone or more steps to create 304 port forwarding rules, provide 306 lease ports and forwarding rules to workload, wait 308 for grace period, renew 314 lease, deallocate 316 port, and/or allocate ports and forwarding rules. In at least one embodiment, a processor 702 performs a process 300.

In at least one embodiment, some or all of process 300 (or any other processes described herein, or variations and/or combinations thereof) is performed under control of one or more computer systems configured with computer executable instructions and is implemented as code (e.g., computer executable instructions, one or more computer programs, or one or more applications) executing collectively on one or more processors, by hardware, software, or combinations thereof. In at least one embodiment, code is stored on a computer-readable storage medium in form of a computer program comprising a plurality of computer-readable instructions executable by one or more processors. In at least one embodiment, a computer-readable storage medium is a non-transitory computer-readable medium. In at least one embodiment, at least some computer-readable instructions usable to perform process 300 are not stored solely using transitory signals (e.g., a propagating transient electric or electromagnetic transmission). In at least one embodiment, process 200 is performed at least in part on a computer system such as those described elsewhere in this disclosure. In at least one embodiment, logic (e.g., hardware, software, or a combination of hardware and software) performs process 300.

In at least one embodiment, a processor generates a software with ports that are to be exposed to an outside world. In at least one embodiment, ports may include TCP or UDP ports. In at least one embodiment, ports are allocated in a firewall. In at least one embodiment, once ports are allocated, port allocation information is replicated across reverse-proxy hosts. In at least one embodiment port allocation information includes port forwarding rules. In at least one embodiment, a processor creates 304 (e.g., otherwise to generate) one or more port forwarding rules. In at least one embodiment, a processor creates 304 port forwarding rules and port information, to include port forwarding rules, is added to a container specification. In at least one embodiment, port information is added to container specification before container is scheduled. In at least one embodiment, a set of random ports are allocated on a host where a container is scheduled. In at least one embodiment, a processor creates 304 port forwarding rules on a host to forward traffic from a host ports to one or more container ports. In at least one embodiment, a set of random ports is allocated in a firewall to match one or more host ports, where a processor provides one or more lease ports and forwarding rules to a workload. In at least one embodiment, a processor using a process 300 creates 304 port-forwarding rules are set up in a reverse-proxy host to forward traffic from a reverse-proxy ports to a host ports where container is running. In at least one embodiment, for example, a processor using a process 300 includes providing lease ports and forwarding rules to a workload, such as by an API. In at least one embodiment, an API obtains and/or provides information pertaining to a streaming session. In at least one embodiment, reverse-proxy hosts can allocate ports and forwarding rules. In at least one embodiment, double-randomized URL-like network path setup from firewall ports to applications. In at least one embodiment, lease-based port allocation and port forwarding policy is enabled.

In at least one embodiment, a processor using an API provides 306 a workload container application lease port information and forwarding rules. In at least one embodiment, a processor waits 308 for a grace period after providing lease port information or until receiving a response. In at least one embodiment, once a processor waits 308 for a grace period (e.g., a period of time expires) for a lease to be renewed or until otherwise indicated it will not be renewed. In at least one embodiment, in decision block 310, if "Yes," a process proceeds to renewed 314 a lease. In at least one embodiment, otherwise a decision is "No," and a process 300 proceeds to deallocate 316 a port and returns to wait 308 for a grace period. In at least one embodiment, upon deallocating 316 a port, a process 300 ends 312.

In at least one embodiment, a sidecar running alongside a workload container is responsible for renewing 314 port leases on reverse-proxy hosts. In at least one embodiment, sidecar is configured to access a list of all reverse-proxy hosts in a cluster. In at least one embodiment, sidecar is a separate container that may run alongside an application container in a Kubernetes pod. In at least one embodiment, a workload container completes (e.g., ends 312 successfully or otherwise in a crash), and ports are deallocated 316. In at least one embodiment, forwarding rules are deleted from reverse-proxy hosts.

In at least one embodiment, port-forwarding rules are created 304 to forward traffic between a datacenter firewall and a workload endpoint. In at least one embodiment, a processor provides 306 lease ports and forwarding rules to one or more workload containers. In at least one embodiment, leases are renewed by a sidecar to a workload container. In at least one embodiment, if one or more workload containers do not renew leases within a given time, ports are deallocated 316 and forwarding rules are removed.

In at least one embodiment, a reverse-proxy host starts up. In at least one embodiment, reverse-proxy waits 308 to allocate any ports for a grace period after starting. In at least one embodiment, to wait 308 a grace period is otherwise a timeout period+some additional period (e.g., delta or otherwise change) of time. In at least one embodiment, to wait 308 some additional period of time may be less than a lease-timeout period. In at least one embodiment, additional delta of time is equal to lease-timeout period. In at least one embodiment, grace period is used so a reverse-proxy will wait for an endpoint workload container to renew their lease. In at least one embodiment, a host thereby obtains state from one or more workloads themselves. In at least one embodiment, once a lease timeout expires, a current state of leases can be assumed to be fully updated.

In at least one embodiment, a system uses a process 300 to generate one or more software containers, wherein one or more software containers are to automatically provide network configuration information to one or more proxy servers and/or otherwise perform operations described herein. In at least one embodiment, a system 100 (see FIG. 1), 400 (see FIG. 4), 500 (see FIG. 5), 600 (see FIG. 6), and/or 700 (see FIG. 7) uses process 200 and/or portions thereof. In at least one embodiment, a process 300 is further illustrated in FIGS. 1-7. In at least one embodiment, one or more hardware illustrated in FIGS. 8-44 uses a process 300, such as to generate one or more software containers, wherein one or more software containers are to automatically provide network configuration information to one or more proxy servers and/or otherwise perform operations described herein.

Figure 4:
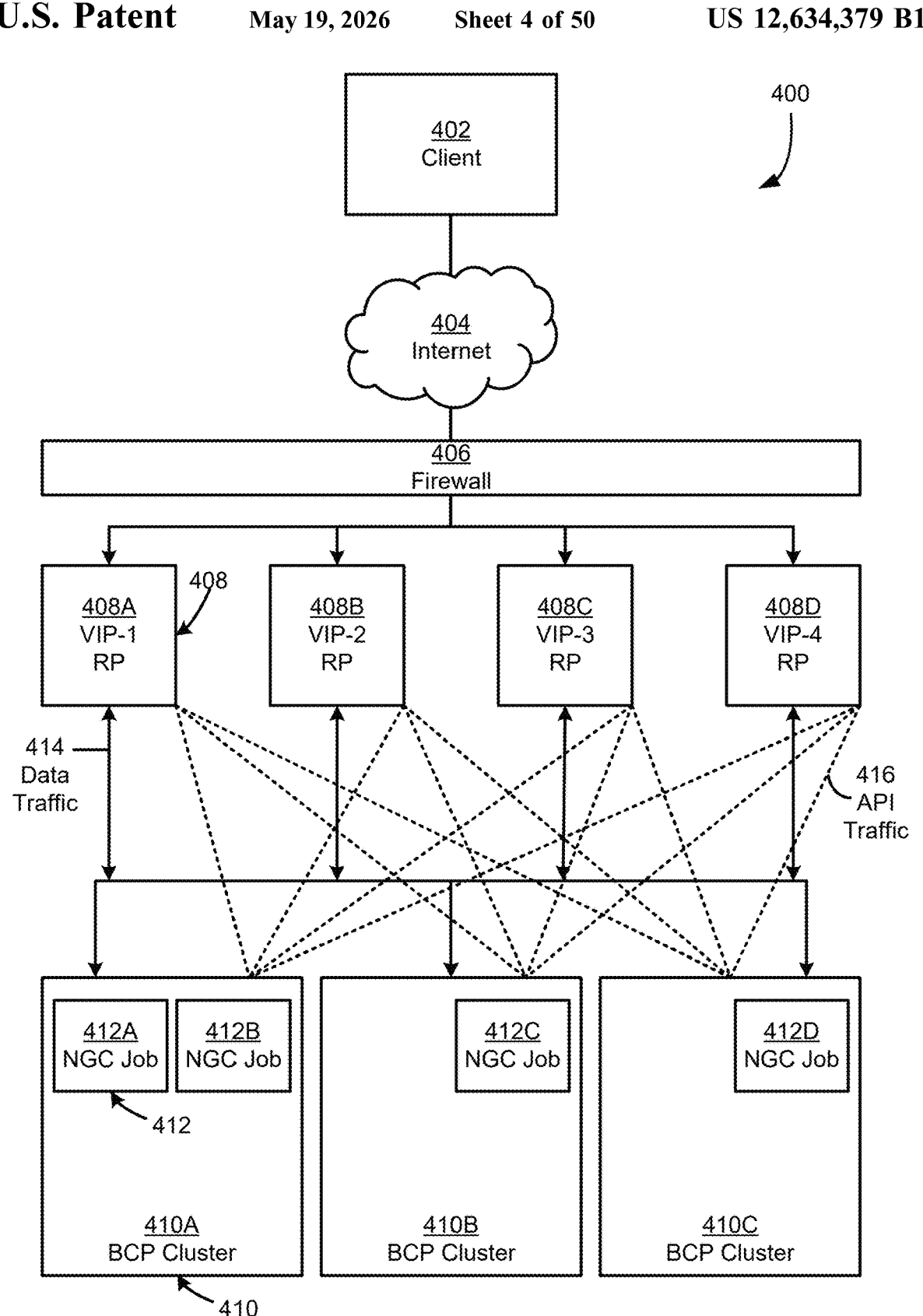
FIG. 4 illustrates an example high-level system diagram illustrating packet flow, in accordance with at least one embodiment.

FIG. 4 illustrates an example system 400 diagram illustrating packet flow, in accordance with at least one embodiment. In at least one embodiment, an illustrated system 400 includes a client 402, internet 404, a firewall 406, one or more network intermediaries (e.g., one or more reverse-proxy 408 nodes), an NGC 412 job, and/or a base command platform (BCP) 410 cluster. In at least one embodiment, an NGC controller otherwise refers to a control plane server.

In at least one embodiment, system 400 includes a collection of one or more hardware and/or software computing resources with instructions that, when executed, performs one or more communication processes such as those described herein. In at least one embodiment, system 400 is a software program executing on computer hardware, application executing on computer hardware, and/or variations thereof. In at least one embodiment, one or more processes of system 400 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof.

In at least one embodiment, a highly available ingress cluster (e.g., BCP cluster 410) setup is provided that can tolerate individual node failures without losing service connectivity. In at least one embodiment, range of ports from which a reverse-proxy 408A-D hosts can allocate is partitioned. In at least one embodiment, ports are allocated or deallocated without any coordination between reverse-proxy 408A-C hosts. In at least one embodiment, ports are allocated or deallocated without any input from at least some reverse-proxy 408A-C hosts. In at least one embodiment, ports are allocated or deallocated without any input from one or more reverse-proxy 408A-C hosts.

In at least one embodiment, ports are allocated in firewall 406. In at least one embodiment, firewall 406 is external to one or more reverse-proxy 408A-D hosts and internet 404. In at least one embodiment, firewall 406 reverse-proxy 408 hosts are located behind firewall 406 with respect to internet 404 or a client 402. In at least one embodiment, ports are allocated at random. In at least one embodiment, port numbers are randomly selected from a range of ports that have been partitioned or are available. In at least one embodiment, port allocation information is provided to reverse-proxy 408 hosts, such as by an API. In at least one embodiment, ports are allocated as a result of a container application being created (e.g., generated) with TCP or UDP ports. In at least one embodiment, generated container is such that it is configured to connect to an external user. In at least one embodiment, container is a job (e.g., NGC 412A-D job) in a cluster (e.g., BCP 410A-C cluster).

In at least one embodiment, port allocation information for ports allocated on firewall 406 is provided across reverse-proxy 408A-D hosts. In at least one embodiment, port allocation information includes a file that is replicated at reverse-proxy 408 hosts. In at least one embodiment, port information indicating or specifying allocated ports in a firewall 406 is added to a container specification before a container is scheduled.

In at least one embodiment, a set of ports are allocated on reverse-proxy 408 hosts where containers are scheduled. In at least one embodiment, one or more set of ports are allocated randomly from available ports, indicated by possible API 416 traffic and data 414 traffic. In at least one embodiment, for example, a set of specific ports is selected at random from available ports on reverse-proxy 408A host. In at least one embodiment, a set of ports are allocated in a firewall 406 to match selected reverse-proxy 408A host ports. In at least one embodiment, users may access a reverse-proxy 408A host via internet 404 through a firewall 406.

In at least one embodiment, forwarding rules are set up on a host to forward traffic between host ports to container ports. In at least one embodiment, forwarding rules include mapping individual host ports of set of selected host ports to individual container ports of set of selected container ports. In at least one embodiment, port forwarding rules may be implemented by an API.

In at least one embodiment, port-forwarding rules are set up in a reverse-proxy 408 hosts to forward traffic from reverse-proxy 408 ports to one or more host ports where a container is running. In at least one embodiment, a sidecar (e.g., session manager 522, see FIG. 5) running alongside a workload container is responsible for renewing port leases on all reverse-proxy 408 hosts. In at least one embodiment, a sidecar (e.g., session manager 522, see FIG. 5) accesses a list of one or more reverse-proxy 408 hosts in a BCP 410 cluster. In at least one embodiment, when a workload container completes (ends successfully or in a crash) one or more ports are deallocated and forwarding rules are deleted from one or more reverse-proxy hosts.

In at least one embodiment, reverse-proxy hosts run a service as a Kubernetes daemonset. In at least one embodiment, a client sends a packet (tcp, udp) to public IP at firewall 406 (e.g., fortigate) port assigned for a stream. In at least one embodiment, public IP routes to a firewall NAT. In at least one embodiment, for example, (Client IP, client Port→Public IP, external Port).

In at least one embodiment, firewall 406 DNATs a public IP, port to private IP, port of reverse-proxy. In at least one embodiment, a firewall 406 is configured a-priori to map a block of ports to a reverse-proxy IP one-to-one. In one or more embodiments, a reverse-proxy is configured with IP table rules to DNAT a destination private IP, port to a Node IP, or port for a job. In at least one embodiment, a node IP is a reachable IP of a node where a pod is scheduled. In one or more embodiments, a reverse-proxy SNATs a connection as well to its own private IP. In at least one embodiment, for example, a connection is formed of a ReverseProxy IP, dynamic port to a Node, Port.

In at least one embodiment, at a node, a packet gets forwarded to a BCP cluster (e.g. pod) via node-port service ipvs rules. In at least one embodiment, for example, a packet is forwarded from a Node, Port to a pod, container port. In at least one embodiment, a packet path traverses a series of NATs which are implemented in hardware (e.g., fortigate) or kernel (e.g., reversproxy iptables, nodeport service ipvs).

In at least one embodiment, a system 400 includes a processor comprising one or more circuits to generate one or more software containers, wherein one or more software containers are to automatically provide network configuration information to one or more proxy servers and/or otherwise perform operations described herein. In at least one embodiment, a system 400 performs process 200 (see FIG. 2), process 300 (see FIG. 3), combinations, and/or portions thereof. In at least one embodiment, a system 400 is further illustrated in FIGS. 4-7. In at least one embodiment, a system 400 includes one or more hardware illustrated in FIGS. 8-44, such as to generate one or more software containers, wherein one or more software containers are to automatically provide network configuration information to one or more proxy servers and/or otherwise perform operations described herein.

Figure 5:
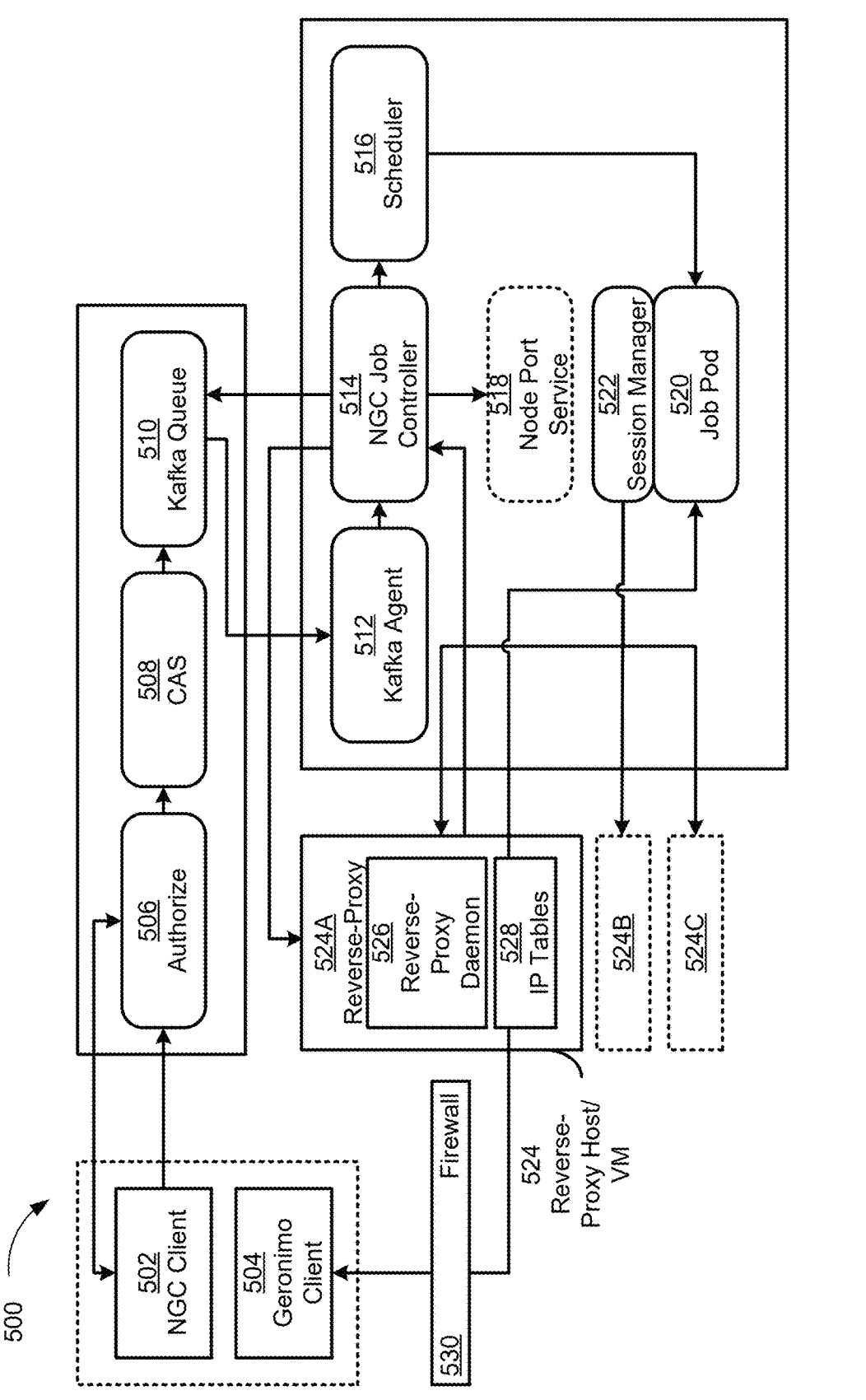
FIG. 5 illustrates workflow of an exemplary system, in accordance with at least one embodiment.

FIG. 5 illustrates workflow of an exemplary system 500, in accordance with at least one embodiment. In at least one embodiment, system 500 includes a collection of one or more hardware and/or software computing resources with instructions that, when executed, performs one or more communication processes such as those described herein. In at least one embodiment, system 500 is a software program executing on computer hardware, application executing on computer hardware, and/or variations thereof. In at least one embodiment, one or more processes of system 400 are performed by any suitable processing system or unit (e.g., graphics processing unit (GPU), general-purpose GPU (GPGPU), parallel processing unit (PPU), central processing unit (CPU)), a data processing unit (DPU), such as described below, and in any suitable manner, including sequential, parallel, and/or variations thereof. In at least one embodiment, a system includes one or more hardware illustrated non-exclusively in FIGS. 8-44.

In at least one embodiment, a system includes a client (e.g., NGC client 502 and GERONIMO 504 client), system authorization to authorize 506 an NGC batch, channel-associated server (CAS) 508, kafka queue 510, kafka agent 512, NGC job controller 514, scheduler 516, node port service 518, job pod 520, session manager 522, one or more reverse-proxy 524A-C nodes, reverse-proxy daemon 526, an IP table 528, and/or firewall 530.

In at least one embodiment, a GERONIMO 504 client illustrates an application server. In at least one embodiment, a GERONIMO 504 client receives a public IP to a firewall 530 port, communicating through a firewall 530 and reverse-proxy 524A node with a job pod 520. In at least one embodiment, a job pod 520 is a BCP cluster 410.

In at least one embodiment, an NGC client 502 sends an NGC batch to run, where said batch receives (e.g., or does not) authorization, otherwise to authorize 506 a batch to run. In at least one embodiment, if authorized, information proceeds to CAS 508 to publish a job schema. In at least one embodiment, a job schema is received by a kafka queue 510. In at least one embodiment, a kafka queue 510 is a distributed data store optimized for data storage to ingest and process streaming data, such as in real-time. In at least one embodiment, for example, a kafka queue 510 reads data and distributes an entry to a consumer.

In at least one embodiment, a kafka agent 512 receives (e.g., consumes) job specification and then creates an NGC job 412A-D (see FIG. 4). In at least one embodiment, an NGC job controller 514, a software container, receives a created NGC job 412 (see FIG. 4) and creates a node port service 518 when a job is running and provides job to a scheduler 516. In at least one embodiment, a scheduler 516 provides a job to a job pod 520, software container. In at least one embodiment, a job pod 520 software container includes a side car application session manager 522 which performs port lease renewals with one or more reverse-proxy 524A-C nodes. In at least one embodiment, a session manager 522 is otherwise referred to as a side car application. In at least one embodiment, one or more reverse-proxy 524A-C nodes are randomly selected by a job pod 520. In at least one embodiment, for example, 524C is an nth reverse-proxy node randomly selected for a streaming application job. In at least one embodiment, a software container (e.g., job pod 520) automatically provides network configuration information to one or more reverse-proxy 524 servers. In at least one embodiment, a reverse-proxy 524A-C node is a network intermediary.

In at least one embodiment, application includes a service that is ran as a Kubernetes daemon 526 on one or more individual nodes of reverse-proxy 524 nodes. In at least one embodiment, port-forwarding rules are created. In at least one embodiment, port forwarding rules may map ports between reverse-proxy 524 hosts and containers in a cluster (e.g., one or more second hosts). In at least one embodiment, a communication port is established. In at least one embodiment, a container port is established automatically when container is created. In at least one embodiment, a host port is mapped to container port (e.g., a port of a host running a container). In at least one embodiment, a host port may be randomly selected from a range of available host ports. In at least one embodiment, a host port corresponds to a port in a firewall 530.

In at least one embodiment, when a reverse-proxy 524 host starts up it does not allocate any ports for a grace period (e.g., lease-timeout period+some additional delta of time). In one or more embodiment, this is so that a reverse-proxy 524 will wait for an endpoint workloads to renew their leases, such as a session manager 522 using an API to indicate a renewal. In one or more embodiment, a reverse-proxy 524 host thereby gains state from one or more workloads themselves. In at least one embodiment, once a lease timeout expires, a current state of leases can be assumed to be fully updated. In at least one embodiment, a reverse-proxy host can allocate ports and forwarding rules from when a lease time-out expires.

In at least one embodiment, a user creates a streaming job (e.g., at step 1). In at least one embodiment, as a user crease a streaming job, user specifies TCP/UDP ports that may be used for streaming. In at least one embodiment, a system 500 performs a process which includes creating a job, which is processed and sent to NGC Job Controller 514 (e.g., a software container). In at least one embodiment, a system 500 performs a process which includes an NGC Job Controller 514 creates a node port service 518 on cluster for job, NGC job controller 514 queries a Kubernetes API server for node on which a job is running, NGC job controller 514 sends API request to reverse-proxy 524 node which may allocate external ports for client 504 to connect, or NGC job controller publishes a port-map, and public IP for job. In at least one embodiment, after job is created, network configuration information includes: Public IP, and external ports to connect to. In at least one embodiment, a streaming client can then connect to a stream.

In at least one embodiment, a system 500 includes a processor comprising one or more circuits to generate one or more software containers, wherein one or more software containers are to automatically provide network configuration information to one or more proxy servers and/or otherwise perform operations described herein. In at least one embodiment, a system 500 performs process 200 (see FIG. 2), process 300 (see FIG. 3), combinations, and/or portions thereof. In at least one embodiment, a system 100 is further illustrated in FIGS. 4-7. In at least one embodiment, a system 500 includes one or more hardware illustrated in FIGS. 8-44, such as to generate one or more software containers, wherein one or more software containers are to automatically provide network configuration information to one or more proxy servers and/or otherwise perform operations described herein.

Figure 6:
FIG. 6 is a block diagram illustrating a driver and/or runtime comprising one or more libraries to provide one or more application programming interfaces (APIs), in accordance with at least one embodiment.

FIG. 6 is a block diagram 600 illustrating a driver and/or runtime comprising one or more libraries to provide one or more application programming interfaces (APIs), in accordance with at least one embodiment. In at least one embodiment, a software program 602 is a software module, such as modules 704-710 (see FIG. 7). In at least one embodiment, a software container is a set of software programs. In at least one embodiment, a software program 602 comprises one or more software modules. In at least one embodiment, a software module is as further illustrated non-exclusively in FIG. 7. In at least one embodiment, one or more APIs 608 are sets of software instructions that, if executed, cause one or more processors (e.g., processor 702) to perform one or more computational operations. In at least one embodiment, one or more APIs 608 are distributed or otherwise provided as a part of one or more libraries 606, runtimes 604, drivers 604, and/or any other grouping of software and/or executable code further described herein. In at least one embodiment, one or more APIs 608 perform one or more computational operations in response to invocation by software programs 602. In at least one embodiment, a software program 602 is a collection of software code, commands, instructions, or other sequences of text to instruct a computing device to perform one or more computational operations and/or invoke one or more other sets of instructions, such as APIs 608 or API functions 610, to be executed. In at least one embodiment, functionality provided by one or more APIs 608 include software functions 610, such as those usable to accelerate one or more portions of software programs 602 using one or more parallel processing units (PPUs), such as graphics processing units (GPUs).

In at least one embodiment, APIs 608 are hardware interfaces to one or more circuits to perform one or more computational operations. In at least one embodiment, one or more software APIs 608 described herein are implemented as one or more circuits to perform one or more techniques described below in conjunction with FIGS. 1-7. In at least one embodiment, one or more software programs 602 comprise instructions that, if executed, cause one or more hardware devices and/or circuits to perform one or more techniques further described below in conjunction with FIGS. 1-7.

In at least one embodiment, software programs 602, such as user-implemented software programs, utilize one or more application programming interfaces (APIs) 608 to perform various computing operations, such as memory reservation, matrix multiplication, arithmetic operations, or any computing operation performed by parallel processing units (PPUs), such as graphics processing units (GPUs), as further described herein. In at least one embodiment, one or more APIs 608 provide a set of callable functions 610, referred to herein as APIs, API functions, and/or functions, that individually perform one or more computing operations, such as computing operations related to parallel computing. In at least one embodiment, for example, one or more APIs 608 provide functions 610 to generate one or more software containers, wherein one or more software containers are to automatically provide network configuration information to one or more proxy servers and/or otherwise perform operations described herein.

In at least one embodiment, one or more software programs 602 interact or otherwise communicate with one or more APIs 608 to perform one or more computing operations using one or more PPUs, such as GPUs. In at least one embodiment, one or more computing operations using one or more PPUs comprise at least one or more groups of computing operations to be accelerated by execution at least in part by said one or more PPUs. In at least one embodiment, one or more software programs 602 interact with one or more APIs 608 to generate one or more software containers, wherein one or more software containers are to automatically provide network configuration information to one or more proxy servers and/or otherwise perform operations described herein.

In at least one embodiment, an interface is software instructions that, if executed, provide access to one or more functions 610 provided by one or more APIs 608. In at least one embodiment, a software program 602 uses a local interface when a software developer compiles one or more software programs 602 in conjunction with one or more libraries 606 comprising or otherwise providing access to one or more APIs 608. In at least one embodiment, one or more software programs 602 are compiled statically in conjunction with pre-compiled libraries 606 or uncompiled source code comprising instructions to perform one or more APIs 608. In at least one embodiment, one or more software programs 602 are compiled dynamically and said one or more software programs utilize a linker to link to one or more pre-compiled libraries 606 comprising one or more APIs 608.

In at least one embodiment, a software program 602 uses a remote interface when a software developer executes a software program that utilizes or otherwise communicates with a library 606 comprising one or more APIs 608 over a network or other remote communication medium. In at least one embodiment, one or more libraries 606 comprising one or more APIs 608 are to be performed by a remote computing service, such as a computing resource services provider. In another embodiment, one or more libraries 606 comprising one or more APIs 608 are to be performed by any other computing host providing said one or more APIs 608 to one or more software programs 602, such as a software container comprising a software program.

In at least one embodiment, a processor (e.g., processor 702) performing or using one or more software programs 602 call, use, perform, or otherwise implement one or more APIs 608 to allocate and otherwise manage memory 612 to be used by said software programs 602. In at least one embodiment, one or more software programs 602 utilize one or more APIs 608 to allocate and otherwise manage memory 612 to be used by one or more portions of said software programs 602 to be accelerated using one or more PPUs, such as GPUs or any other accelerator or processor further described herein. Those software programs 602 request a neural network to perform signal processing using functions 610 provided, in an embodiment, by one or more APIs 608.

In at least one embodiment, an API 608 is an API to facilitate parallel computing. In at least one embodiment, an API 608 is any other API further described herein. In at least one embodiment, an API 608 is provided by a driver and/or runtime 604. In at least one embodiment, an API 608 is provided by a CUDA user-mode driver. In at least one embodiment, an API 608 is provided by a CUDA runtime. In at least one embodiment, a driver 604 is data values and software instructions that, if executed, perform or otherwise facilitate operation of one or more functions 610 of an API 608 during load and execution of one or more portions of a software program 602. In at least one embodiment, a runtime 604 is data values and software instructions that, if executed, perform or otherwise facilitate operation of one or more functions 610 of an API 608 during execution of a software program 602. In at least one embodiment, one or more software programs 602 utilize one or more APIs 608 implemented or otherwise provided by a driver and/or runtime 604 to provide information to configure a network by said one or more software programs 602 during execution by one or more PPUs, such as GPUs.

In at least one embodiment, one or more software programs 602 utilize one or more APIs 608 provided by a driver and/or runtime 604 to perform combined arithmetic operations of one or more PPUs, such as GPUs. In at least one embodiment, one or more APIs 608 provide combined arithmetic operations through a driver and/or runtime 604, as described above. In at least one embodiment, one or more software programs 602 utilize one or more APIs 608 provided by a driver and/or runtime 604 to allocate or otherwise reserve one or more blocks of memory 612 of one or more PPUs, such as GPUs. In at least one embodiment, one or more software programs 602 utilize one or more APIs 608 provided by a driver and/or runtime 604 to allocate or otherwise reserve blocks of memory 612. In at least one embodiment, one or more APIs 608 invoke a neural network to generate one or more software containers, wherein one or more software containers are to automatically provide network configuration information to one or more proxy servers and/or otherwise perform operations described herein, as described below in conjunction with any FIGS. 1-7.

To improve software programs 602 usability and/or optimization of one or more portions of said software programs 602 to be accelerated by one or more PPUs, such as GPUs, in an embodiment, one or more APIs 608 provide one or more API functions 610 for using 516 a split information as described above and further described below in conjunction with FIGS. 1-7. In at least one embodiment, an exemplary block diagram 600 depicts a processor (e.g., processor 702), comprising one or more circuits to perform one or more software programs to combine two or more application programming interfaces (APIs) into a single API. In at least one embodiment, an exemplary block diagram 600 depicts a system, comprising one or more processors to perform one or more software programs to combine two or more application programming interfaces (APIs) into a single API. In at least one embodiment, a processor (e.g., processor 702) uses an API to indicate split information, use a function to use split information, and/or otherwise perform operations described herein. In at least one embodiment, an exemplary block diagram 600 illustrates an API to use split 516 information in processing one or more signals. In at least one embodiment, a processor uses an exemplary API and uses one or more function(s) 610, where said function is using 516 split information, such as to indicate a split preference of a processor. In at least one embodiment, for example, a processor uses an API 608 to perform one or more operations illustrated in FIGS. 1-7.

As an example, block diagram 600 illustrates a processor comprising one or more circuits to perform an API 608 to provide information to generating one or more software containers, wherein one or more software containers are to automatically provide network configuration information to one or more proxy servers and/or otherwise perform operations described herein. In at least one embodiment, a block diagram 600 illustrates a processor comprising one or more circuits to perform an API 608 to cause one or more software programs indicated by an API 608 to automatically provide network configuration information to one or more proxy servers and/or otherwise perform operations described herein. In at least one embodiment, a block diagram 600 illustrates a processor performing one or more functions 610, such as those described in connection with FIGS. 1-7. In at least one embodiment, a block diagram 600 illustrates an API 608, such as to be performed by hardware described in connection with FIGS. 8-44.

In at least one embodiment, a system 600 includes a processor comprising one or more circuits to generate one or more software containers, wherein one or more software containers are to automatically provide network configuration information using an API 608 to one or more proxy servers and/or otherwise perform operations described herein. In at least one embodiment, a system 100 performs process 200 (see FIG. 2), process 300 (see FIG. 3), combinations, and/or portions thereof. In at least one embodiment, a system 600 using an API 608 is further illustrated in FIGS. 4-7. In at least one embodiment, a system 600 includes one or more hardware illustrated in FIGS. 8-44, such as to generate one or more software containers, wherein one or more software containers are to automatically provide network configuration information using an API to one or more proxy servers and/or otherwise perform operations described herein.

Figure 7:
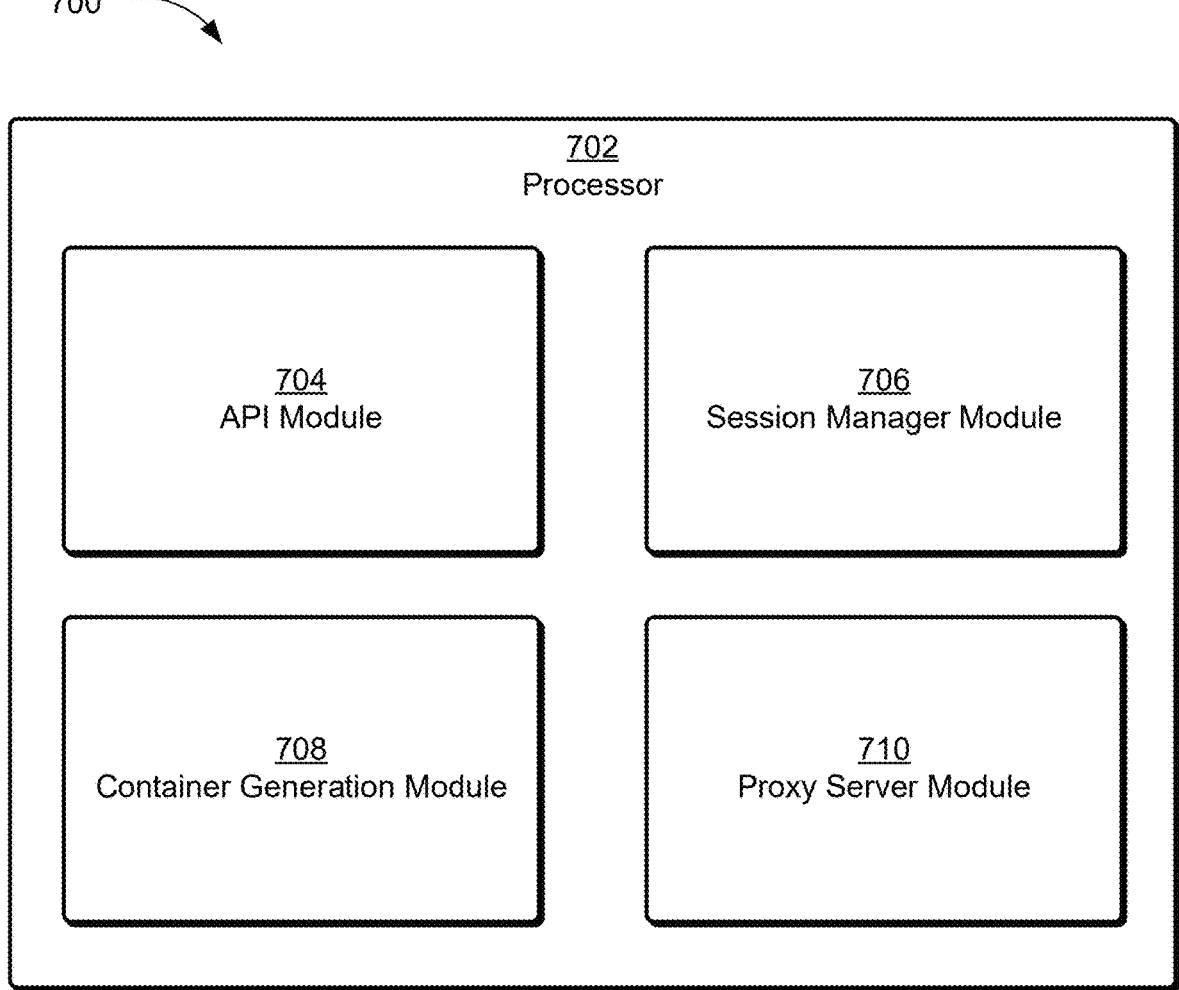
FIG. 7 illustrates an example including processor and modules, in accordance with at least one embodiment.

FIG. 7 illustrates an example 700 including processor and modules, in accordance with at least one embodiment. In at least one embodiment, a processor 702 performs one or more processes such as those described herein to perform an application programming interface (API) to cause generation of one or more software containers, wherein one or more software containers are to automatically provide network configuration information to one or more proxy servers and/or otherwise perform operations described herein. In at least one embodiment, a processor 702 performs one or more processes, such as those described herein to generate one or more software programs based, at least in part, on an application programming interface (API) and/or otherwise perform operations described herein. In at least one embodiment, processor 702 performs said program generation through one or more processes as described in connection with FIG. 1. In at least one embodiment, processor 702 performs one or more processes such as those described in connection with FIGS. 1-7.

In at least one embodiment, processor 702 comprises one or more processors such as those described in connection with FIGS. 8-44. In at least one embodiment, processor 702 is any suitable processing unit and/or combination of processing units, such as one or more CPUs, GPUs, DPUs, GPGPUs, PPUs, and/or variations thereof. In at least one embodiment, processor 702 includes an API Module 704, session manager module 706, container generation module 708, and/or proxy server module 710. In at least one embodiment, session manager module 706, container generation module 708, and/or proxy server module 710 are distributed among multiple processors that communicate over a bus, network, by writing to shared memory, and/or any suitable communication process such as those described herein.

In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, DPUs, PPUs, and/or variations thereof.

In at least one embodiment, application programming interface (API) module 704 is a module to perform one or more APIs, such as create a streaming session with randomly allocated external ports, to obtain and/or return public IP and session route information, to refresh a streaming session with a port, delete a streaming session, and/or to obtain or return a port's readiness, health, or both. In at least one embodiment, application programming interface (API) module 704 performs one or more processes such as those described herein by at least including or otherwise encoding instructions that cause performance of or otherwise can be utilized to perform said one or more processes (e.g., by processor 702). In at least one embodiment, application programming interface (API) module 704 obtains or otherwise indicates information (e.g., by one or more systems such as those described in connection with FIGS. 4, 5, and/or 6). In at least one embodiment, application programming interface (API) module 704 includes performing APIs using information. In at least one embodiment, runtime 604 (see FIG. 6) performs an application programming interface (API) module 704.

In at least one embodiment, session manager module 706 is a module which manages one or more servers based, at least in part, on network configuration information described in FIGS. 1-7. In at least one embodiment, session manager module 706 performs one or more processes such as those described herein by at least including or otherwise encoding instructions that cause performance of or otherwise can be utilized to perform said one or more processes (e.g., by processor 702). In at least one embodiment, session manager module 706 managers one or more sessions based, at least in part, on information indicated by an API 608 (see FIG. 6) in connection with API module 704. In at least one embodiment, session manager module 706 configures performance of one or more streaming programs. In at least one embodiment, session manager module 706 managers one or more servers in a data center based, at least in part, on network configuration information through one or more processes, such as those described in connection with FIGS. 1-7.

In at least one embodiment, container generation module 708 is a module to generate one or more software containers, such as applications to perform generation of one or more software containers, wherein one or more software containers are to automatically provide network configuration information to one or more proxy servers and/or otherwise perform operations described herein. In at least one embodiment, container generation module 708 performs one or more processes such as those described herein by at least including or otherwise encoding instructions that cause performance of or otherwise can be utilized to perform said one or more processes (e.g., by processor 702). In at least one embodiment, container generation module 708 generates one or more containers using information provided by an API, such as those described herein, and one or more software containers are to automatically provide network configuration information to one or more proxy servers, such as described in connection with FIGS. 1-7. In at least one embodiment, container generation module 708 generates one or more containers, such a container to provide network configuration information to one or more proxy servers of a proxy server module 710. In at least one embodiment, container generation module 710 is to generate one or more software containers in connection with one or more processes such as those described in connection with FIGS. 1-7.

In at least one embodiment, proxy server module 710 is a module is to configure a proxy server to sue a selected firewall port to communicate with a server program. In at least one embodiment, a proxy server module 710 performs one or more processes such as those described herein by at least including or otherwise encoding instructions that cause performance of or otherwise can be utilized to perform said one or more processes (e.g., by processor 702). In at least one embodiment, proxy server module 710 obtains information (e.g., network configuration information), such as from an API of an API module 704. In at least one embodiment, proxy server module 710 receives information from a program generated by a container generation module 708 and then enables communication between a proxy server program through a firewall, such as those described in connection with any FIGS. 1-7. In at least one embodiment, proxy server module 710 receives information and performs communication processes for a proxy server using one or more processes such as those described in connection with FIGS. 1-7.

As an example, a processor 702 comprises one or more circuits to generate one or more software containers, wherein one or more software containers are to automatically provide network configuration information to one or more proxy servers and/or otherwise perform operations described herein. As an example, a processor 702 includes one or more software containers to provide information using one or more APIs of an API module 704 and/or otherwise perform operations described herein. In at least one embodiment, a processor 702 performs operations described herein to generate one or more software containers, such as those described in connection with FIGS. 1-7. In at least one embodiment, a processor 702 performs one or more operations using hardware and/or software described in connection with FIGS. 8-44.

In the following description, numerous specific details are set forth to provide a more thorough understanding of at least one embodiment. However, it will be apparent to one skilled in the art that the inventive concepts may be practiced without one or more of these specific details.

Servers and Data Centers

The following figures set forth, without limitation, exemplary network server and data center based systems that can be used to implement at least one embodiment.

Figure 8:
FIG. 8 illustrates a distributed system, in accordance with at least one embodiment.

FIG. 8 illustrates a distributed system 800, in accordance with at least one embodiment. In at least one embodiment, distributed system 800 includes one or more client computing devices 802, 804, 806, and 808, which are configured to execute and operate a client application such as a web browser, proprietary client, and/or variations thereof over one or more network(s) 810. In at least one embodiment, server 812 may be communicatively coupled with remote client computing devices 802, 804, 806, and 808 via network 810.

In at least one embodiment, server 812 may be adapted to run one or more services or software applications such as services and applications that may manage session activity of single sign-on (SSO) access across multiple data centers. In at least one embodiment, server 812 may also provide other services or software applications can include non-virtual and virtual environments. In at least one embodiment, these services may be offered as web-based or cloud services or under a Software as a Service (SaaS) model to users of client computing devices 802, 804, 806, and/or 808. In at least one embodiment, users operating client computing devices 802, 804, 806, and/or 808 may in turn utilize one or more client applications to interact with server 812 to utilize services provided by these components.

In at least one embodiment, software components 818, 820 and 822 of system 800 are implemented on server 812.

In at least one embodiment, one or more components of system 800 and/or services provided by these components may also be implemented by one or more of client computing devices 802, 804, 806, and/or 808. In at least one embodiment, users operating client computing devices may then utilize one or more client applications to use services provided by these components. In at least one embodiment, these components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

In at least one embodiment, client computing devices 802, 804, 806, and/or 808 may include various types of computing systems. In at least one embodiment, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and/or variations thereof. In at least one embodiment, devices may support various applications such as various Internet-related apps, e-mail, short message service (SMS) applications, and may use various other communication protocols. In at least one embodiment, client computing devices may also include general purpose personal computers including, by way of example, personal computers and/or laptop computers running various versions of Microsoft Windows®, Apple Macintosh®, and/or Linux operating systems. In at least one embodiment, client computing devices can be workstation computers running any of a variety of commercially-available UNIX® or UNIX-like operating systems, including without limitation a variety of GNU/Linux operating systems, such as Google Chrome OS. In at least one embodiment, client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 810. Although distributed system 800 in FIG. 8 is shown with four client computing devices, any number of client computing devices may be supported. Other devices, such as devices with sensors, etc., may interact with server 812.

In at least one embodiment, network(s) 810 in distributed system 800 may be any type of network that can support data communications using any of a variety of available protocols, including without limitation TCP/IP (transmission control protocol/Internet protocol), SNA (systems network architecture), IPX (Internet packet exchange), AppleTalk, and/or variations thereof. In at least one embodiment, network(s) 810 can be a local area network (LAN), networks based on Ethernet, Token-Ring, a wide-area network, Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

In at least one embodiment, server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In at least one embodiment, server 812 can include one or more virtual machines running virtual operating systems, or other computing architectures involving virtualization. In at least one embodiment, one or more flexible pools of logical storage devices can be virtualized to maintain virtual storage devices for a server. In at least one embodiment, virtual networks can be controlled by server 812 using software defined networking. In at least one embodiment, server 812 may be adapted to run one or more services or software applications.

In at least one embodiment, server 812 may run any operating system, as well as any commercially available server operating system. In at least one embodiment, server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and/or variations thereof. In at least one embodiment, exemplary database servers include without limitation those commercially available from Oracle, Microsoft, Sybase, IBM (International Business Machines), and/or variations thereof.

In at least one embodiment, server 812 may include one or more applications to analyze and consolidate data feeds and/or event updates received from users of client computing devices 802, 804, 806, and 808. In at least one embodiment, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and/or variations thereof. In at least one embodiment, server 812 may also include one or more applications to display data feeds and/or real-time events via one or more display devices of client computing devices 802, 804, 806, and 808.

In at least one embodiment, distributed system 800 may also include one or more databases 814 and 816. In at least one embodiment, databases may provide a mechanism for storing information such as user interactions information, usage patterns information, adaptation rules information, and other information. In at least one embodiment, databases 814 and 816 may reside in a variety of locations. In at least one embodiment, one or more of databases 814 and 816 may reside on a non-transitory storage medium local to (and/or resident in) server 812. In at least one embodiment, databases 814 and 816 may be remote from server 812 and in communication with server 812 via a network-based or dedicated connection. In at least one embodiment, databases 814 and 816 may reside in a storage-area network (SAN). In at least one embodiment, any necessary files for performing functions attributed to server 812 may be stored locally on server 812 and/or remotely, as appropriate. In at least one embodiment, databases 814 and 816 may include relational databases, such as databases that are adapted to store, update, and retrieve data in response to SQL-formatted commands.

In at least one embodiment, one or more systems depicted in FIG. 8 are utilized to generate and/or perform one or more software containers with various algorithms, formulas, and processes such as those described in connection with FIG. 1.

In at least one embodiment, one or more systems depicted in FIG. 8 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

FIG. 9 illustrates an exemplary data center 900, in accordance with at least one embodiment. In at least one embodiment, data center 900 includes, without limitation, a data center infrastructure layer 910, a framework layer 920, a software layer 930 and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator 912 may include hardware, software or some combination thereof.

In at least one embodiment, as shown in FIG. 9, framework layer 920 includes, without limitation, a job scheduler 932, a configuration manager 934, a resource manager 936 and a distributed file system 938. In at least one embodiment, framework layer 920 may include a framework to support software 952 of software layer 930 and/or one or more application(s) 942 of application layer 940. In at least one embodiment, software 952 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 932 may include a Spark driver to facilitate scheduling of workloads supported by various layers of data center 900. In at least one embodiment, configuration manager 934 may be capable of configuring different layers such as software layer 930 and framework layer 920, including Spark and distributed file system 938 for supporting large-scale data processing. In at least one embodiment, resource manager 936 may be capable of managing clustered or grouped computing resources mapped to or allocated for support of distributed file system 938 and job scheduler 932. In at least one embodiment, clustered or grouped computing resources may include grouped computing resource 914 at data center infrastructure layer 910. In at least one embodiment, resource manager 936 may coordinate with resource orchestrator 912 to manage these mapped or allocated computing resources.

In at least one embodiment, software 952 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. In at least one or more types of applications may include, without limitation, CUDA applications, 5G network applications, artificial intelligence application, data center applications, and/or variations thereof.

In at least one embodiment, any of configuration manager 934, resource manager 936, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, one or more systems depicted in FIG. 9 are utilized to generate and/or perform one or more software containers with various algorithms, formulas, and processes such as those described in connection with FIG. 1. In at least one embodiment, one or more systems depicted in FIG. 9 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 10:
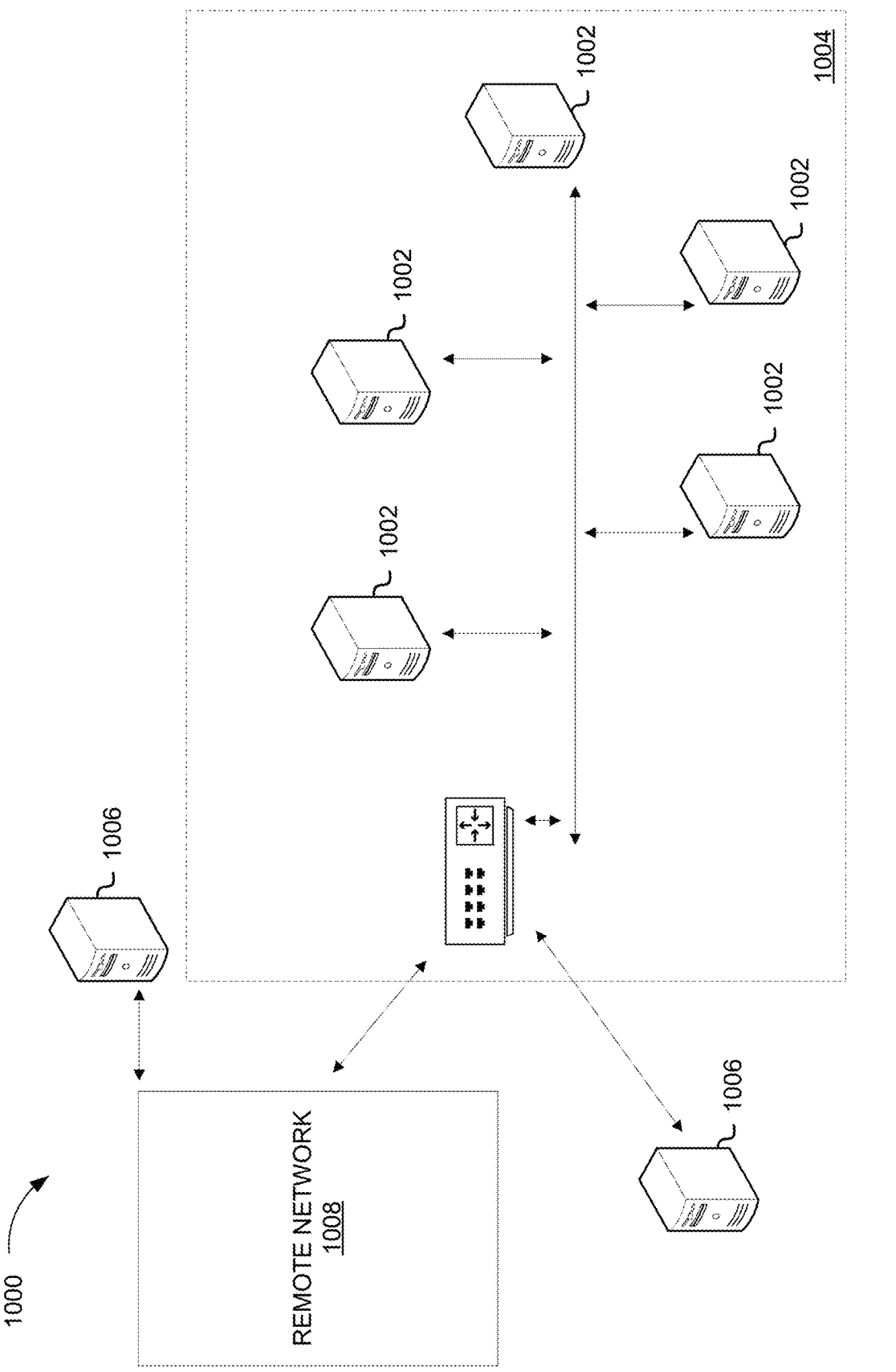
FIG. 10 illustrates a client-server network, in accordance with at least one embodiment.

FIG. 10 illustrates a client-server network 1004 formed by a plurality of network server computers 1002 which are interlinked, in accordance with at least one embodiment. In at least one embodiment, in a system 1000, each network server computer 1002 stores data accessible to other network server computers 1002 and to client computers 1006 and networks 1008 which link into a wide area network 1004. In at least one embodiment, configuration of a client-server network 1004 may change over time as client computers 1006 and one or more networks 1008 connect and disconnect from a network 1004, and as one or more trunk line server computers 1002 are added or removed from a network 1004. In at least one embodiment, when a client computer 1006 and a network 1008 are connected with network server computers 1002, client-server network includes such client computer 1006 and network 1008. In at least one embodiment, the term computer includes any device or machine capable of accepting data, applying prescribed processes to data, and supplying results of processes.

In at least one embodiment, client-server network 1004 stores information which is accessible to network server computers 1002, remote networks 1008 and client computers 1006. In at least one embodiment, network server computers 1002 are formed by main frame computers minicomputers, and/or microcomputers having one or more processors each. In at least one embodiment, server computers 1002 are linked together by wired and/or wireless transfer media, such as conductive wire, fiber optic cable, and/or microwave transmission media, satellite transmission media or other conductive, optic or electromagnetic wave transmission media. In at least one embodiment, client computers 1006 access a network server computer 1002 by a similar wired or a wireless transfer medium. In at least one embodiment, a client computer 1006 may link into a client-server network 1004 using a modem and a standard telephone communication network. In at least one embodiment, alternative carrier systems such as cable and satellite communication systems also may be used to link into client-server network 1004. In at least one embodiment, other private or time-shared carrier systems may be used. In at least one embodiment, network 1004 is a global information network, such as the Internet. In at least one embodiment, network is a private intranet using similar protocols as the Internet, but with added security measures and restricted access controls. In at least one embodiment, network 1004 is a private, or semi-private network using proprietary communication protocols.

In at least one embodiment, client computer 1006 is any end user computer, and may also be a mainframe computer, mini-computer or microcomputer having one or more microprocessors. In at least one embodiment, server computer 1002 may at times function as a client computer accessing another server computer 1002. In at least one embodiment, remote network 1008 may be a local area network, a network added into a wide area network through an independent service provider (ISP) for the Internet, or another group of computers interconnected by wired or wireless transfer media having a configuration which is either fixed or changing over time. In at least one embodiment, client computers 1006 may link into and access a network 1004 independently or through a remote network 1008.

In at least one embodiment, one or more systems depicted in FIG. 10 are utilized to generate and/or perform one or more software containers with various algorithms, formulas, and processes such as those described in connection with FIG. 1. In at least one embodiment, one or more systems depicted in FIG. 10 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 11:
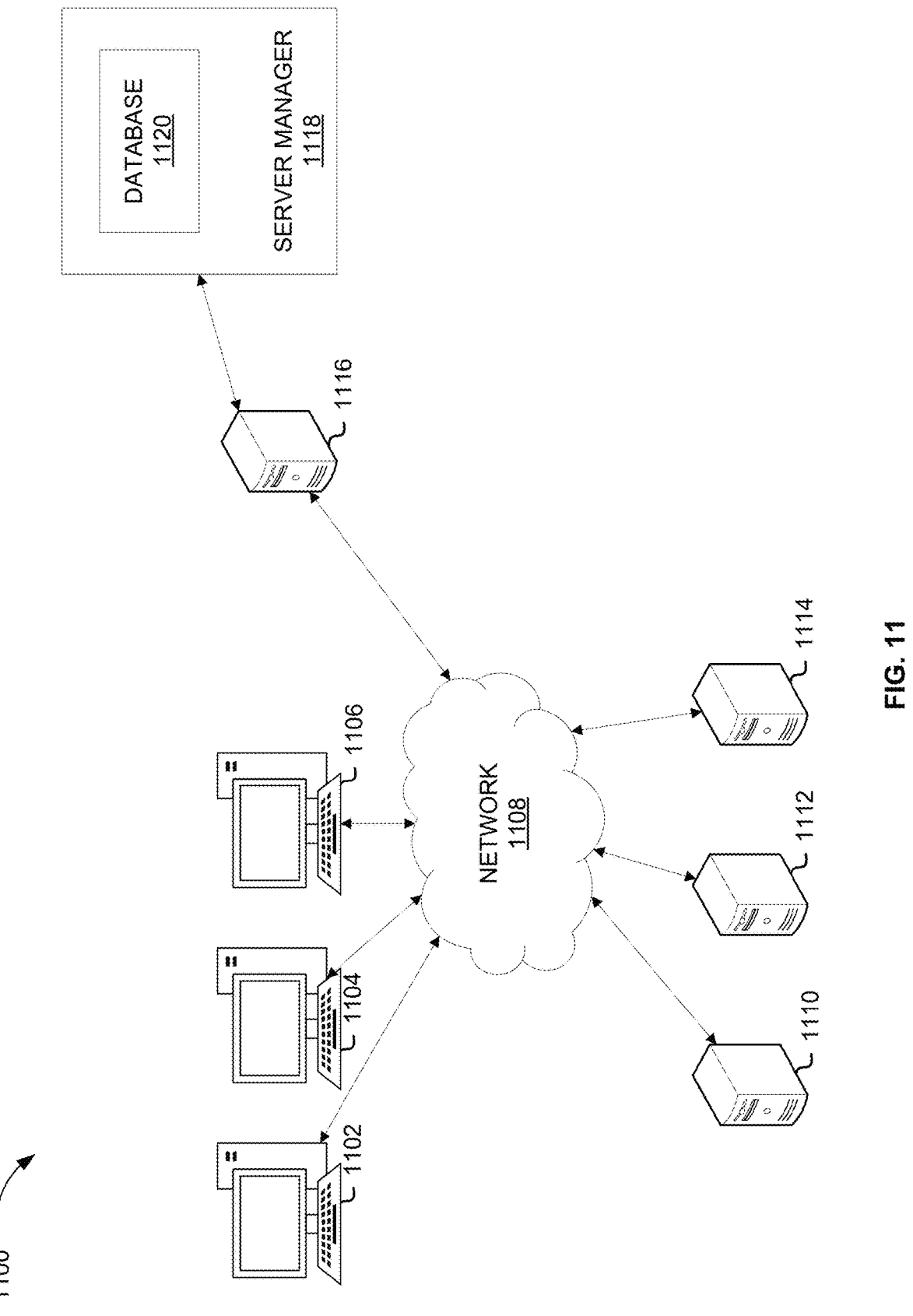
FIG. 11 illustrates an example of a computer network, in accordance with at least one embodiment.

FIG. 11 illustrates an example 1100 of a computer network 1108 connecting one or more computing machines, in accordance with at least one embodiment. In at least one embodiment, network 1108 may be any type of electronically connected group of computers including, for instance, the following networks: Internet, Intranet, Local Area Networks (LAN), Wide Area Networks (WAN) or an interconnected combination of these network types. In at least one embodiment, connectivity within a network 1108 may be a remote modem, Ethernet (IEEE 802.3), Token Ring (IEEE 802.5), Fiber Distributed Datalink Interface (FDDI), Asynchronous Transfer Mode (ATM), or any other communication protocol. In at least one embodiment, computing devices linked to a network may be desktop, server, portable, handheld, set-top box, personal digital assistant (PDA), a terminal, or any other desired type or configuration. In at least one embodiment, depending on their functionality, network connected devices may vary widely in processing power, internal memory, and other performance aspects. In at least one embodiment, communications within a network and to or from computing devices connected to a network may be either wired or wireless. In at least one embodiment, network 1108 may include, at least in part, the world-wide public Internet which generally connects a plurality of users in accordance with a client-server model in accordance with a transmission control protocol/internet protocol (TCP/IP) specification. In at least one embodiment, client-server network is a dominant model for communicating between two computers. In at least one embodiment, a client computer ("client") issues one or more commands to a server computer ("server"). In at least one embodiment, server fulfills client commands by accessing available network resources and returning information to a client pursuant to client commands. In at least one embodiment, client computer systems and network resources resident on network servers are assigned a network address for identification during communications between elements of a network. In at least one embodiment, communications from other network connected systems to servers will include a network address of a relevant server/network resource as part of communication so that an appropriate destination of a data/request is identified as a recipient. In at least one embodiment, when a network 1108 comprises the global Internet, a network address is an IP address in a TCP/IP format which may, at least in part, route data to an e-mail account, a website, or other Internet tool resident on a server. In at least one embodiment, information and services which are resident on network servers may be available to a web browser of a client computer through a domain name (e.g. www.site.com) which maps to an IP address of a network server.

In at least one embodiment, a plurality of clients 1102, 1104, and 1106 are connected to a network 1108 via respective communication links. In at least one embodiment, each of these clients may access a network 1108 via any desired form of communication, such as via a dial-up modem connection, cable link, a digital subscriber line (DSL), wireless or satellite link, or any other form of communication. In at least one embodiment, each client may communicate using any machine that is compatible with a network 1108, such as a personal computer (PC), work station, dedicated terminal, personal data assistant (PDA), or other similar equipment. In at least one embodiment, clients 1102, 1104, and 1106 may or may not be located in a same geographical area.

In at least one embodiment, a plurality of servers 1110, 1112, and 1114 are connected to a network 1108 to serve clients that are in communication with a network 1108. In at least one embodiment, each server is typically a powerful computer or device that manages network resources and responds to client commands. In at least one embodiment, servers include computer readable data storage media such as hard disk drives and RAM memory that store program instructions and data. In at least one embodiment, servers 1110, 1112, 1114 run application programs that respond to client commands. In at least one embodiment, server 1110 may run a web server application for responding to client requests for HTML pages and may also run a mail server application for receiving and routing electronic mail. In at least one embodiment, other application programs, such as an FTP server or a media server for streaming audio/video data to clients may also be running on a server 1110. In at least one embodiment, different servers may be dedicated to performing different tasks. In at least one embodiment, server 1110 may be a dedicated web server that manages resources relating to web sites for various users, whereas a server 1112 may be dedicated to provide electronic mail (email) management. In at least one embodiment, other servers may be dedicated for media (audio, video, etc.), file transfer protocol (FTP), or a combination of any two or more services that are typically available or provided over a network. In at least one embodiment, each server may be in a location that is the same as or different from that of other servers. In at least one embodiment, there may be multiple servers that perform mirrored tasks for users, thereby relieving congestion or minimizing traffic directed to and from a single server. In at least one embodiment, servers 1110, 1112, 1114 are under control of a web hosting provider in a business of maintaining and delivering third party content over a network 1108.

In at least one embodiment, web hosting providers deliver services to two different types of clients. In at least one embodiment, one type, which may be referred to as a browser, requests content from servers 1110, 1112, 1114 such as web pages, email messages, video clips, etc. In at least one embodiment, a second type, which may be referred to as a user, hires a web hosting provider to maintain a network resource such as a web site, and to make it available to browsers. In at least one embodiment, users contract with a web hosting provider to make memory space, processor capacity, and communication bandwidth available for their desired network resource in accordance with an amount of server resources a user desires to utilize.

In at least one embodiment, in order for a web hosting provider to provide services for both of these clients, application programs which manage a network resources hosted by servers must be properly configured. In at least one embodiment, program configuration process involves defining a set of parameters which control, at least in part, an application program's response to browser requests and which also define, at least in part, a server resources available to a particular user.

In one embodiment, an intranet server 1116 is in communication with a network 1108 via a communication link. In at least one embodiment, intranet server 1116 is in communication with a server manager 1118. In at least one embodiment, server manager 1118 comprises a database of an application program configuration parameters which are being utilized in servers 1110, 1112, 1114. In at least one embodiment, users modify a database 1120 via an intranet 1116, and a server manager 1118 interacts with servers 1110, 1112, 1114 to modify application program parameters so that they match a content of a database. In at least one embodiment, a user logs onto an intranet server 1116 by connecting to an intranet 1116 via computer 1102 and entering authentication information, such as a username and password.

In at least one embodiment, when a user wishes to sign up for new service or modify an existing service, an intranet server 1116 authenticates a user and provides a user with an interactive screen display/control panel that allows a user to access configuration parameters for a particular application program. In at least one embodiment, a user is presented with a number of modifiable text boxes that describe aspects of a configuration of a user's web site or other network resource. In at least one embodiment, if a user desires to increase memory space reserved on a server for its web site, a user is provided with a field in which a user specifies a desired memory space. In at least one embodiment, in response to receiving this information, an intranet server 1116 updates a database 1120. In at least one embodiment, server manager 1118 forwards this information to an appropriate server, and a new parameter is used during application program operation. In at least one embodiment, an intranet server 1116 is configured to provide users with access to configuration parameters of hosted network resources (e.g., web pages, email, FTP sites, media sites, etc.), for which a user has contracted with a web hosting service provider.

In at least one embodiment, one or more systems depicted in FIG. 11 are utilized to generate and/or perform one or more software containers with various algorithms, formulas, and processes such as those described in connection with FIG. 1. In at least one embodiment, one or more systems depicted in FIG. 11 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 12A:
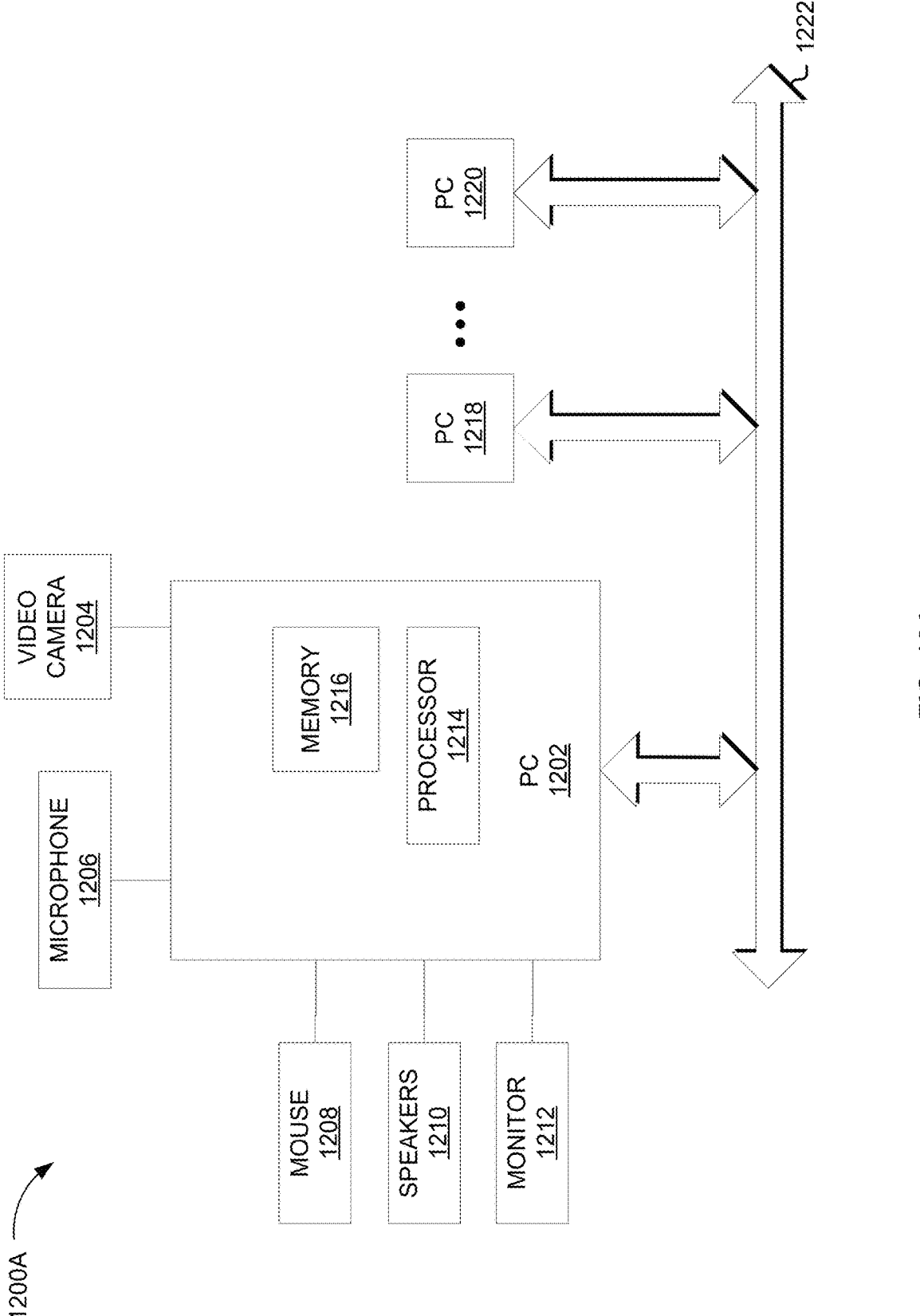
FIG. 12A illustrates a networked computer system, in accordance with at least one embodiment.

FIG. 12A illustrates a networked computer system 1200A, in accordance with at least one embodiment. In at least one embodiment, networked computer system 1200A comprises a plurality of nodes or personal computers ("PCs") 1202, 1218, 1220. In at least one embodiment, personal computer or node 1202 comprises a processor 1214, memory 1216, video camera 1204, microphone 1206, mouse 1208, speakers 1210, and monitor 1212. In at least one embodiment, PCs 1202, 1218, 1220 may each run one or more desktop servers of an internal network within a given company, for instance, or may be servers of a general network not limited to a specific environment. In at least one embodiment, there is one server per PC node of a network, so that each PC node of a network represents a particular network server, having a particular network URL address. In at least one embodiment, each server defaults to a default web page for that server's user, which may itself contain embedded URLs pointing to further subpages of that user on that server, or to other servers or pages on other servers on a network.

In at least one embodiment, nodes 1202, 1218, 1220 and other nodes of a network are interconnected via medium 1222. In at least one embodiment, medium 1222 may be, a communication channel such as an Integrated Services Digital Network ("ISDN"). In at least one embodiment, various nodes of a networked computer system may be connected through a variety of communication media, including local area networks ("LANs"), plain-old telephone lines ("POTS"), sometimes referred to as public switched telephone networks ("PSTN"), and/or variations thereof. In at least one embodiment, various nodes of a network may also constitute computer system users inter-connected via a network such as the Internet. In at least one embodiment, each server on a network (running from a particular node of a network at a given instance) has a unique address or identification within a network, which may be specifiable in terms of an URL.

In at least one embodiment, a plurality of multi-point conferencing units ("MCUs") may thus be utilized to transmit data to and from various nodes or "endpoints" of a conferencing system. In at least one embodiment, nodes and/or MCUs may be interconnected via an ISDN link or through a local area network ("LAN"), in addition to various other communications media such as nodes connected through the Internet. In at least one embodiment, nodes of a conferencing system may, in general, be connected directly to a communications medium such as a LAN or through an MCU, and that a conferencing system may comprise other nodes or elements such as routers, servers, and/or variations thereof.

In at least one embodiment, processor 1214 is a general-purpose programmable processor. In at least one embodiment, processors of nodes of networked computer system 1200A may also be special-purpose video processors. In at least one embodiment, various peripherals and components of a node such as those of node 1202 may vary from those of other nodes. In at least one embodiment, node 1218 and node 1220 may be configured identically to or differently than node 1202. In at least one embodiment, a node may be implemented on any suitable computer system in addition to PC systems.

In at least one embodiment, one or more systems depicted in FIG. 12A are utilized to generate and/or perform one or more software containers with various algorithms, formulas, and processes such as those described in connection with FIG. 1. In at least one embodiment, one or more systems depicted in FIG. 12A are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 12B:
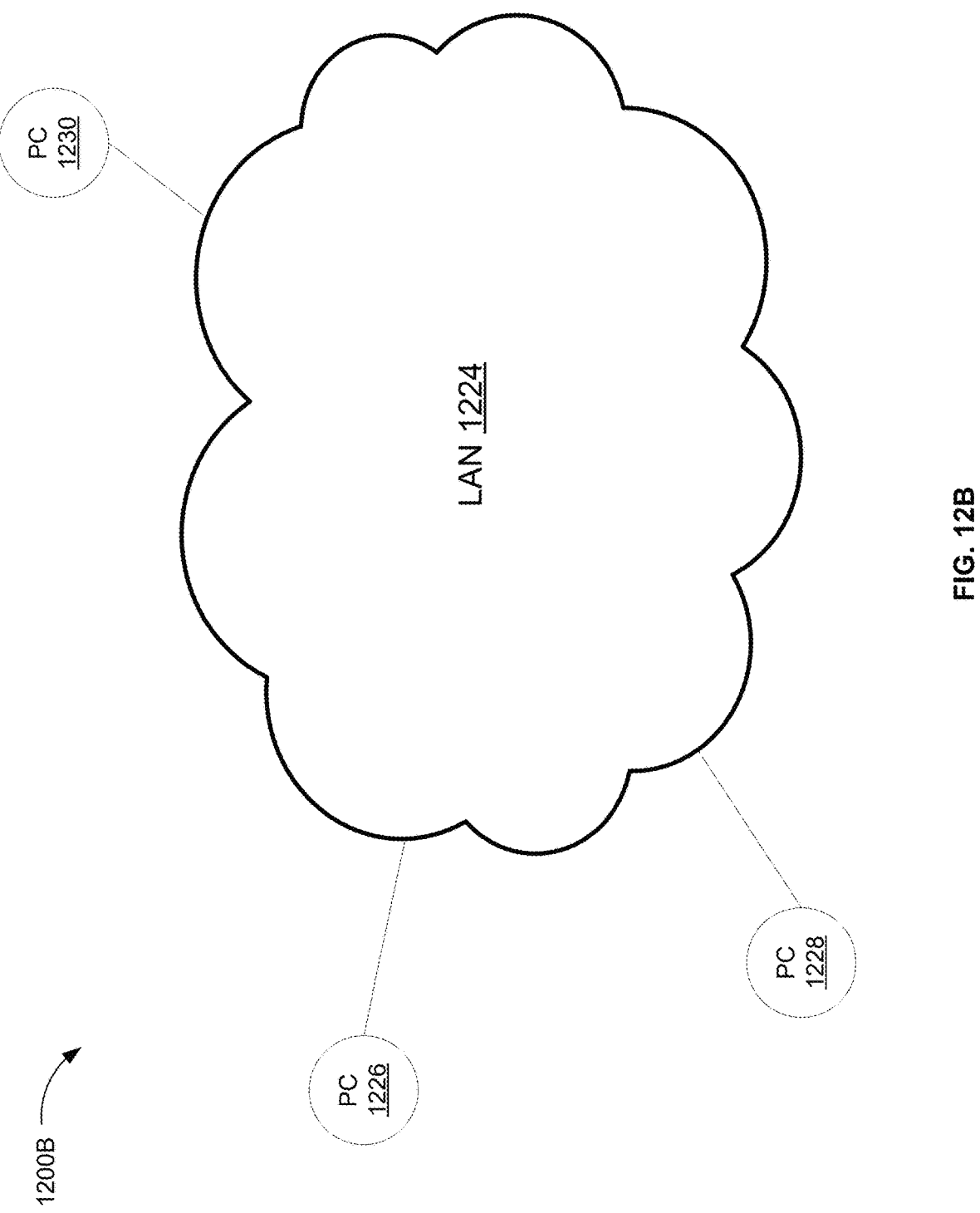
FIG. 12B illustrates a networked computer system, in accordance with at least one embodiment.

FIG. 12B illustrates a networked computer system 1200B, in accordance with at least one embodiment. In at least one embodiment, system 1200B illustrates a network such as LAN 1224, which may be used to interconnect a variety of nodes that may communicate with each other. In at least one embodiment, attached to LAN 1224 are a plurality of nodes such as PC nodes 1226, 1228, 1230. In at least one embodiment, a node may also be connected to the LAN via a network server or other means. In at least one embodiment, system 1200B comprises other types of nodes or elements, for example including routers, servers, and nodes.

Figure 12C:
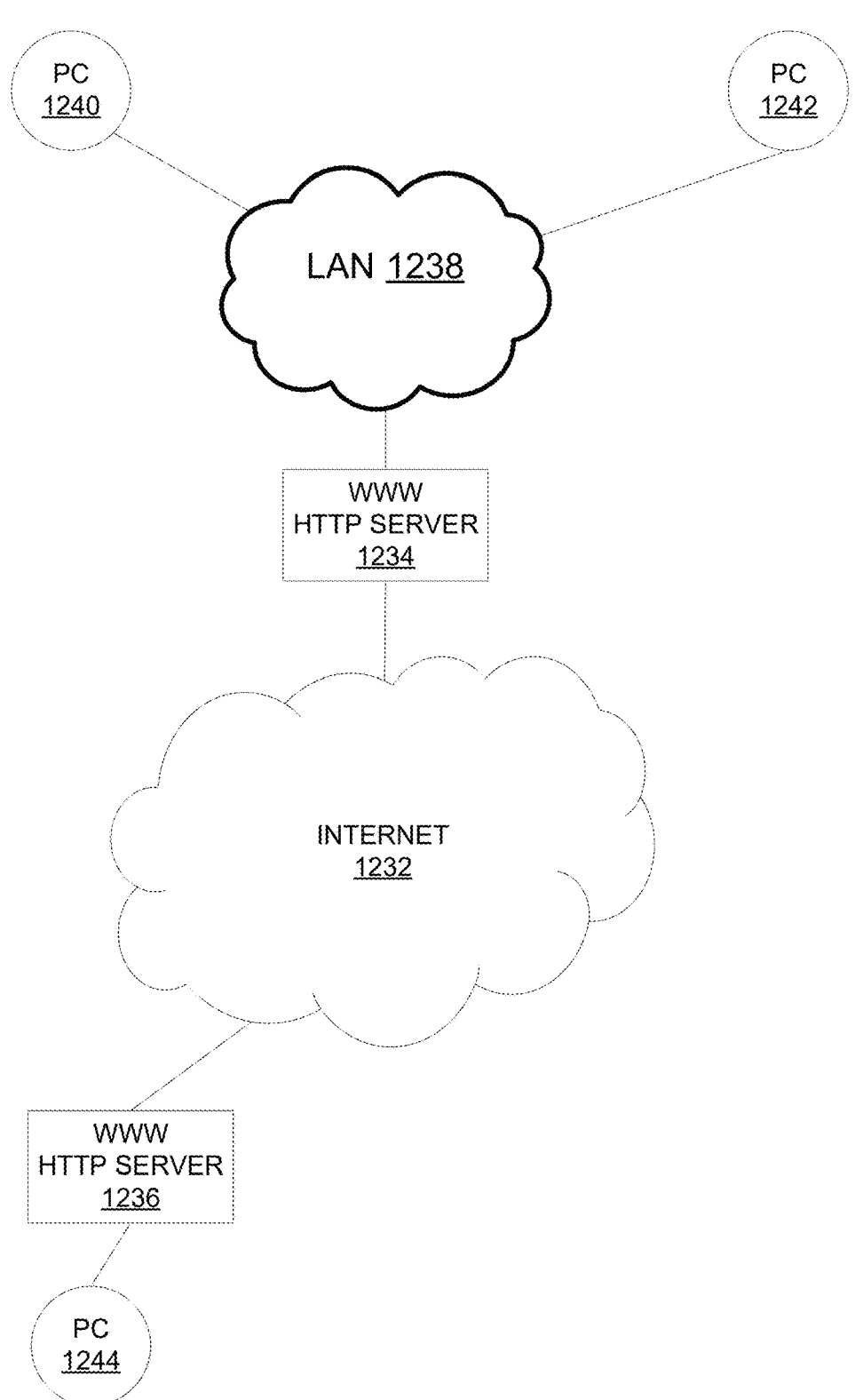
FIG. 12C illustrates a networked computer system, in accordance with at least one embodiment.

FIG. 12C illustrates a networked computer system 1200C, in accordance with at least one embodiment. In at least one embodiment, system 1200C illustrates a WWW system having communications across a backbone communications network such as Internet 1232, which may be used to interconnect a variety of nodes of a network. In at least one embodiment, WWW is a set of protocols operating on top of the Internet, and allows a graphical interface system to operate thereon for accessing information through the Internet. In at least one embodiment, attached to Internet 1232 in WWW are a plurality of nodes such as PCs 1240, 1242, 1244. In at least one embodiment, a node is interfaced to other nodes of WWW through a WWW HTTP server such as servers 1234, 1236. In at least one embodiment, PC 1244 may be a PC forming a node of network 1232 and itself running its server 1236, although PC 1244 and server 1236 are illustrated separately in FIG. 12C for illustrative purposes.

In at least one embodiment, WWW is a distributed type of application, characterized by WWW HTTP, WWW's protocol, which runs on top of the Internet's transmission control protocol/Internet protocol ("TCP/IP"). In at least one embodiment, WWW may thus be characterized by a set of protocols (i.e., HTTP) running on the Internet as its "backbone."

In at least one embodiment, a web browser is an application running on a node of a network that, in WWW-compatible type network systems, allows users of a particular server or node to view such information and thus allows a user to search graphical and text-based files that are linked together using hypertext links that are embedded in documents or files available from servers on a network that understand HTTP. In at least one embodiment, when a given web page of a first server associated with a first node is retrieved by a user using another server on a network such as the Internet, a document retrieved may have various hypertext links embedded therein and a local copy of a page is created local to a retrieving user. In at least one embodiment, when a user clicks on a hypertext link, locally-stored information related to a selected hypertext link is typically sufficient to allow a user's machine to open a connection across the Internet to a server indicated by a hypertext link.

In at least one embodiment, more than one user may be coupled to each HTTP server, for example through a LAN such as LAN 1238 as illustrated with respect to WWW HTTP server 1234. In at least one embodiment, system 1200C may also comprise other types of nodes or elements. In at least one embodiment, a WWW HTTP server is an application running on a machine, such as a PC. In at least one embodiment, each user may be considered to have a unique "server," as illustrated with respect to PC 1244. In at least one embodiment, a server may be considered to be a server such as WWW HTTP server 1234, which provides access to a network for a LAN or plurality of nodes or plurality of LANs. In at least one embodiment, there are a plurality of users, each having a desktop PC or node of a network, each desktop PC potentially establishing a server for a user thereof. In at least one embodiment, each server is associated with a particular network address or URL, which, when accessed, provides a default web page for that user. In at least one embodiment, a web page may contain further links (embedded URLs) pointing to further subpages of that user on that server, or to other servers on a network or to pages on other servers on a network.

Cloud Computing and Services

The following figures set forth, without limitation, exemplary cloud-based systems that can be used to implement at least one embodiment.

In at least one embodiment, cloud computing is a style of computing in which dynamically scalable and often virtualized resources are provided as a service over the Internet. In at least one embodiment, users need not have knowledge of, expertise in, or control over technology infrastructure, which can be referred to as "in the cloud," that supports them. In at least one embodiment, cloud computing incorporates infrastructure as a service, platform as a service, software as a service, and other variations that have a common theme of reliance on the Internet for satisfying computing needs of users. In at least one embodiment, a typical cloud deployment, such as in a private cloud (e.g., enterprise network), or a data center (DC) in a public cloud (e.g., Internet) can consist of thousands of servers (or alternatively, VMs), hundreds of Ethernet, Fiber Channel or Fiber Channel over Ethernet (FCoE) ports, switching and storage infrastructure, etc. In at least one embodiment, cloud can also consist of network services infrastructure like IPsec VPN hubs, firewalls, load balancers, wide area network (WAN) optimizers etc. In at least one embodiment, remote subscribers can access cloud applications and services securely by connecting via a VPN tunnel, such as an IPsec VPN tunnel.

In at least one embodiment, cloud computing is a model for enabling convenient, on-demand network access to a shared pool of configurable computing resources (e.g., networks, servers, storage, applications, and services) that can be rapidly provisioned and released with minimal management effort or service provider interaction.

In at least one embodiment, cloud computing is characterized by on-demand self-service, in which a consumer can unilaterally provision computing capabilities, such as server time and network storage, as needed automatically without requiring human inter-action with each service's provider. In at least one embodiment, cloud computing is characterized by broad network access, in which capabilities are available over a network and accessed through standard mechanisms that promote use by heterogeneous thin or thick client platforms (e.g., mobile phones, laptops, and PDAs). In at least one embodiment, cloud computing is characterized by resource pooling, in which a provider's computing resources are pooled to serve multiple consumers using a multi-tenant model, with different physical and virtual resources dynamically as-signed and reassigned according to consumer demand. In at least one embodiment, there is a sense of location independence in that a customer generally has no control or knowledge over an exact location of provided resources, but may be able to specify location at a higher level of abstraction (e.g., country, state, or datacenter). In at least one embodiment, examples of resources include storage, processing, memory, network bandwidth, and virtual machines. In at least one embodiment, cloud computing is characterized by rapid elasticity, in which capabilities can be rapidly and elastically provisioned, in some cases automatically, to quickly scale out and rapidly released to quickly scale in. In at least one embodiment, to a consumer, capabilities available for provisioning often appear to be unlimited and can be purchased in any quantity at any time. In at least one embodiment, cloud computing is characterized by measured service, in which cloud systems automatically control and optimize resource use by leveraging a metering capability at some level of abstraction appropriate to a type of service (e.g., storage, processing, bandwidth, and active user accounts). In at least one embodiment, resource usage can be monitored, controlled, and reported providing transparency for both a provider and consumer of a utilized service.

In at least one embodiment, cloud computing may be associated with various services. In at least one embodiment, cloud Software as a Service (SaaS) may refer to as service in which a capability provided to a consumer is to use a provider's applications running on a cloud infrastructure. In at least one embodiment, applications are accessible from various client devices through a thin client interface such as a web browser (e.g., web-based email). In at least one embodiment, consumer does not manage or control underlying cloud infrastructure including network, servers, operating systems, storage, or even individual application capabilities, with a possible exception of limited user-specific application configuration settings.

In at least one embodiment, cloud Platform as a Service (PaaS) may refer to a service in which a capability provided to a consumer is to deploy onto cloud infrastructure consumer-created or acquired applications created using programming languages and tools supported by a provider. In at least one embodiment, consumer does not manage or control underlying cloud infrastructure including networks, servers, operating systems, or storage, but has control over deployed applications and possibly application hosting environment configurations.

In at least one embodiment, cloud Infrastructure as a Service (IaaS) may refer to a service in which a capability provided to a consumer is to provision processing, storage, networks, and other fundamental computing resources where a consumer is able to deploy and run arbitrary software, which can include operating systems and applications. In at least one embodiment, consumer does not manage or control underlying cloud infrastructure, but has control over operating systems, storage, deployed applications, and possibly limited control of select networking components (e.g., host firewalls).

In at least one embodiment, cloud computing may be deployed in various ways. In at least one embodiment, a private cloud may refer to a cloud infrastructure that is operated solely for an organization. In at least one embodiment, a private cloud may be managed by an organization or a third party and may exist on-premises or off-premises. In at least one embodiment, a community cloud may refer to a cloud infrastructure that is shared by several organizations and supports a specific community that has shared concerns (e.g., mission, security requirements, policy, and compliance considerations). In at least one embodiment, a community cloud may be managed by organizations or a third party and may exist on-premises or off-premises. In at least one embodiment, a public cloud may refer to a cloud infrastructure that is made available to a general public or a large industry group and is owned by an organization providing cloud services. In at least one embodiment, a hybrid cloud may refer to a cloud infrastructure is a composition of two or more clouds (private, community, or public) that remain unique entities, but are bound together by standardized or proprietary technology that enables data and application portability (e.g., cloud bursting for load-balancing between clouds). In at least one embodiment, a cloud computing environment is service oriented with a focus on statelessness, low coupling, modularity, and semantic interoperability.

In at least one embodiment, one or more systems depicted in FIG. 12B-C are utilized to generate and/or perform one or more software containers with various algorithms, formulas, and processes such as those described in connection with FIG. 1. In at least one embodiment, one or more systems depicted in FIG. 12B-C are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 13:
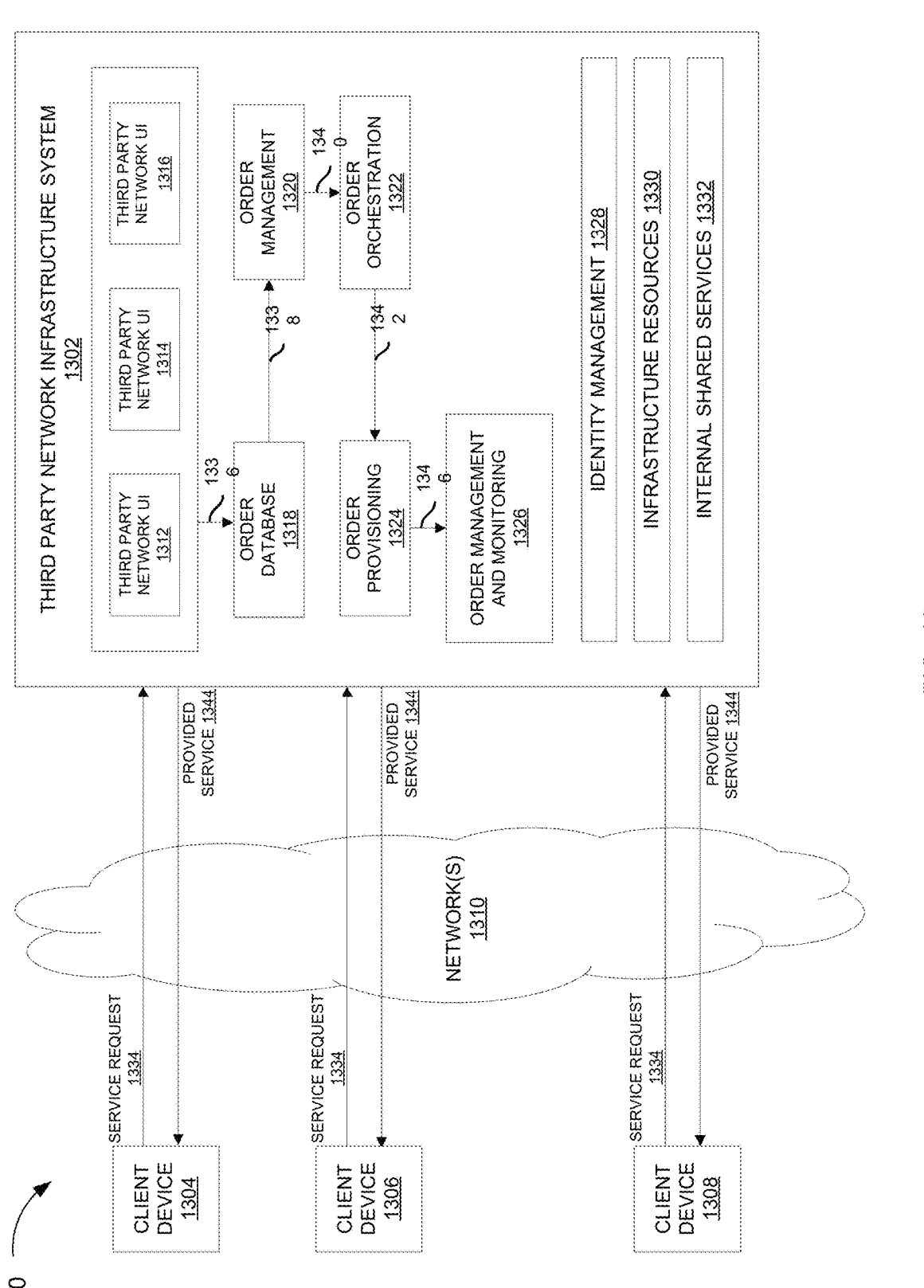
FIG. 13 illustrates one or more components of a system environment in which services may be offered as third party network services, in accordance with at least one embodiment.

FIG. 13 illustrates one or more components of a system environment 1300 in which services may be offered as third party network services, in accordance with at least one embodiment. In at least one embodiment, a third party network may be referred to as a cloud, cloud network, cloud computing network, and/or variations thereof. In at least one embodiment, system environment 1300 includes one or more client computing devices 1304, 1306, and 1308 that may be used by users to interact with a third party network infrastructure system 1302 that provides third party network services, which may be referred to as cloud computing services. In at least one embodiment, third party network infrastructure system 1302 may comprise one or more computers and/or servers.

It should be appreciated that third party network infrastructure system 1302 depicted in FIG. 13 may have other components than those depicted. Further, FIG. 13 depicts an embodiment of a third party network infrastructure system. In at least one embodiment, third party network infrastructure system 1302 may have more or fewer components than depicted in FIG. 13, may combine two or more components, or may have a different configuration or arrangement of components.

In at least one embodiment, client computing devices 1304, 1306, and 1308 may be configured to operate a client application such as a web browser, a proprietary client application, or some other application, which may be used by a user of a client computing device to interact with third party network infrastructure system 1302 to use services provided by third party network infrastructure system 1302. Although exemplary system environment 1300 is shown with three client computing devices, any number of client computing devices may be supported. In at least one embodiment, other devices such as devices with sensors, etc. may interact with third party network infrastructure system 1302. In at least one embodiment, network(s) 1310 may facilitate communications and exchange of data between client computing devices 1304, 1306, and 1308 and third party network infrastructure system 1302.

In at least one embodiment, services provided by third party network infrastructure system 1302 may include a host of services that are made available to users of a third party network infrastructure system on demand. In at least one embodiment, various services may also be offered including without limitation online data storage and backup solutions, Web-based e-mail services, hosted office suites and document collaboration services, database management and processing, managed technical support services, and/or variations thereof. In at least one embodiment, services provided by a third party network infrastructure system can dynamically scale to meet needs of its users.

In at least one embodiment, a specific instantiation of a service provided by third party network infrastructure system 1302 may be referred to as a "service instance." In at least one embodiment, in general, any service made available to a user via a communication network, such as the Internet, from a third party network service provider's system is referred to as a "third party network service." In at least one embodiment, in a public third party network environment, servers and systems that make up a third party network service provider's system are different from a customer's own on-premises servers and systems. In at least one embodiment, a third party network service provider's system may host an application, and a user may, via a communication network such as the Internet, on demand, order and use an application.

In at least one embodiment, a service in a computer network third party network infrastructure may include protected computer network access to storage, a hosted database, a hosted web server, a software application, or other service provided by a third party network vendor to a user. In at least one embodiment, a service can include password-protected access to remote storage on a third party network through the Internet. In at least one embodiment, a service can include a web service-based hosted relational database and a script-language middleware engine for private use by a networked developer. In at least one embodiment, a service can include access to an email software application hosted on a third party network vendor's web site.

In at least one embodiment, third party network infrastructure system 1302 may include a suite of applications, middleware, and database service offerings that are delivered to a customer in a self-service, subscription-based, elastically scalable, reliable, highly available, and secure manner. In at least one embodiment, third party network infrastructure system 1302 may also provide "big data" related computation and analysis services. In at least one embodiment, term "big data" is generally used to refer to extremely large data sets that can be stored and manipulated by analysts and researchers to visualize large amounts of data, detect trends, and/or otherwise interact with data. In at least one embodiment, big data and related applications can be hosted and/or manipulated by an infrastructure system on many levels and at different scales. In at least one embodiment, tens, hundreds, or thousands of processors linked in parallel can act upon such data in order to present it or simulate external forces on data or what it represents. In at least one embodiment, these data sets can involve structured data, such as that organized in a database or otherwise according to a structured model, and/or unstructured data (e.g., emails, images, data blobs (binary large objects), web pages, complex event processing). In at least one embodiment, by leveraging an ability of an embodiment to relatively quickly focus more (or fewer) computing resources upon an objective, a third party network infrastructure system may be better available to carry out tasks on large data sets based on demand from a business, government agency, research organization, private individual, group of like-minded individuals or organizations, or other entity.

In at least one embodiment, third party network infrastructure system 1302 may be adapted to automatically provision, manage and track a customer's subscription to services offered by third party network infrastructure system 1302. In at least one embodiment, third party network infrastructure system 1302 may provide third party network services via different deployment models. In at least one embodiment, services may be provided under a public third party network model in which third party network infrastructure system 1302 is owned by an organization selling third party network services and services are made available to a general public or different industry enterprises. In at least one embodiment, services may be provided under a private third party network model in which third party network infrastructure system 1302 is operated solely for a single organization and may provide services for one or more entities within an organization. In at least one embodiment, third party network services may also be provided under a community third party network model in which third party network infrastructure system 1302 and services provided by third party network infrastructure system 1302 are shared by several organizations in a related community. In at least one embodiment, third party network services may also be provided under a hybrid third party network model, which is a combination of two or more different models.

In at least one embodiment, services provided by third party network infrastructure system 1302 may include one or more services provided under Software as a Service (Saas) category, Platform as a Service (PaaS) category, Infrastructure as a Service (IaaS) category, or other categories of services including hybrid services. In at least one embodiment, a customer, via a subscription order, may order one or more services provided by third party network infrastructure system 1302. In at least one embodiment, third party network infrastructure system 1302 then performs processing to provide services in a customer's subscription order.

In at least one embodiment, services provided by third party network infrastructure system 1302 may include, without limitation, application services, platform services and infrastructure services. In at least one embodiment, application services may be provided by a third party network infrastructure system via a SaaS platform. In at least one embodiment, SaaS platform may be configured to provide third party network services that fall under a SaaS category. In at least one embodiment, SaaS platform may provide capabilities to build and deliver a suite of on-demand applications on an integrated development and deployment platform. In at least one embodiment, SaaS platform may manage and control underlying software and infrastructure for providing SaaS services. In at least one embodiment, by utilizing services provided by a SaaS platform, customers can utilize applications executing on a third party network infrastructure system. In at least one embodiment, customers can acquire an application services without a need for customers to purchase separate licenses and support. In at least one embodiment, various different SaaS services may be provided. In at least one embodiment, examples include, without limitation, services that provide solutions for sales performance management, enterprise integration, and business flexibility for large organizations.

In at least one embodiment, platform services may be provided by third party network infrastructure system 1302 via a PaaS platform. In at least one embodiment, PaaS platform may be configured to provide third party network services that fall under a PaaS category. In at least one embodiment, examples of platform services may include without limitation services that enable organizations to consolidate existing applications on a shared, common architecture, as well as an ability to build new applications that leverage shared services provided by a platform. In at least one embodiment, PaaS platform may manage and control underlying software and infrastructure for providing PaaS services. In at least one embodiment, customers can acquire PaaS services provided by third party network infrastructure system 1302 without a need for customers to purchase separate licenses and support.

In at least one embodiment, by utilizing services provided by a PaaS platform, customers can employ programming languages and tools supported by a third party network infrastructure system and also control deployed services. In at least one embodiment, platform services provided by a third party network infrastructure system may include database third party network services, middleware third party network services and third party network services. In at least one embodiment, database third party network services may support shared service deployment models that enable organizations to pool database resources and offer customers a Database as a Service in a form of a database third party network. In at least one embodiment, middleware third party network services may provide a platform for customers to develop and deploy various business applications, and third party network services may provide a platform for customers to deploy applications, in a third party network infrastructure system.

In at least one embodiment, various different infrastructure services may be provided by an IaaS platform in a third party network infrastructure system. In at least one embodiment, infrastructure services facilitate management and control of underlying computing resources, such as storage, networks, and other fundamental computing resources for customers utilizing services provided by a SaaS platform and a PaaS platform.

In at least one embodiment, third party network infrastructure system 1302 may also include infrastructure resources 1330 for providing resources used to provide various services to customers of a third party network infrastructure system. In at least one embodiment, infrastructure resources 1330 may include pre-integrated and optimized combinations of hardware, such as servers, storage, and networking resources to execute services provided by a PaaS platform and a SaaS platform, and other resources.

In at least one embodiment, resources in third party network infrastructure system 1302 may be shared by multiple users and dynamically re-allocated per demand. In at least one embodiment, resources may be allocated to users in different time zones. In at least one embodiment, third party network infrastructure system 1302 may enable a first set of users in a first time zone to utilize resources of a third party network infrastructure system for a specified number of hours and then enable a re-allocation of same resources to another set of users located in a different time zone, thereby maximizing utilization of resources.

In at least one embodiment, a number of internal shared services 1332 may be provided that are shared by different components or modules of third party network infrastructure system 1302 to enable provision of services by third party network infrastructure system 1302. In at least one embodiment, these internal shared services may include, without limitation, a security and identity service, an integration service, an enterprise repository service, an enterprise manager service, a virus scanning and white list service, a high availability, backup and recovery service, service for enabling third party network support, an email service, a notification service, a file transfer service, and/or variations thereof.

In at least one embodiment, third party network infrastructure system 1302 may provide comprehensive management of third party network services (e.g., SaaS, PaaS, and IaaS services) in a third party network infrastructure system. In at least one embodiment, third party network management functionality may include capabilities for provisioning, managing and tracking a customer's subscription received by third party network infrastructure system 1302, and/or variations thereof.

In at least one embodiment, as depicted in FIG. 13, third party network management functionality may be provided by one or more modules, such as an order management module 1320, an order orchestration module 1322, an order provisioning module 1324, an order management and monitoring module 1326, and an identity management module 1328. In at least one embodiment, these modules may include or be provided using one or more computers and/or servers, which may be general purpose computers, specialized server computers, server farms, server clusters, or any other appropriate arrangement and/or combination.

In at least one embodiment, at step 1334, a customer using a client device, such as client computing devices 1304, 1306 or 1308, may interact with third party network infrastructure system 1302 by requesting one or more services provided by third party network infrastructure system 1302 and placing an order for a subscription for one or more services offered by third party network infrastructure system 1302. In at least one embodiment, a customer may access a third party network User Interface (UI) such as third party network UI 1312, third party network UI 1314 and/or third party network UI 1316 and place a subscription order via these UIs.

In at least one embodiment, order information received by third party network infrastructure system 1302 in response to a customer placing an order may include information identifying a customer and one or more services offered by a third party network infrastructure system 1302 that a customer intends to subscribe to.

In at least one embodiment, at step 1336, an order information received from a customer may be stored in an order database 1318. In at least one embodiment, if this is a new order, a new record may be created for an order. In at least one embodiment, order database 1318 can be one of several databases operated by third party network infrastructure system 1318 and operated in conjunction with other system elements.

In at least one embodiment, at step 1338, an order information may be forwarded to an order management module 1320 that may be configured to perform billing and accounting functions related to an order, such as verifying an order, and upon verification, booking an order.

In at least one embodiment, at step 1340, information regarding an order may be communicated to an order orchestration module 1322 that is configured to orchestrate provisioning of services and resources for an order placed by a customer. In at least one embodiment, order orchestration module 1322 may use services of order provisioning module 1324 for provisioning. In at least one embodiment, order orchestration module 1322 enables management of business processes associated with each order and applies business logic to determine whether an order should proceed to provisioning.

In at least one embodiment, at step 1342, upon receiving an order for a new subscription, order orchestration module 1322 sends a request to order provisioning module 1324 to allocate resources and configure resources needed to fulfill a subscription order. In at least one embodiment, order provisioning module 1324 enables an allocation of resources for services ordered by a customer. In at least one embodiment, order provisioning module 1324 provides a level of abstraction between third party network services provided by third party network infrastructure system 1300 and a physical implementation layer that is used to provision resources for providing requested services. In at least one embodiment, this enables order orchestration module 1322 to be isolated from implementation details, such as whether or not services and resources are actually provisioned in real-time or pre-provisioned and only allocated/assigned upon request.

In at least one embodiment, at step 1344, once services and resources are provisioned, a notification may be sent to subscribing customers indicating that a requested service is now ready for use. In at least one embodiment, information (e.g. a link) may be sent to a customer that enables a customer to start using requested services.

In at least one embodiment, at step 1346, a customer's subscription order may be managed and tracked by an order management and monitoring module 1326. In at least one embodiment, order management and monitoring module 1326 may be configured to collect usage statistics regarding a customer use of subscribed services. In at least one embodiment, statistics may be collected for an amount of storage used, an amount data transferred, a number of users, and an amount of system up time and system down time, and/or variations thereof.

In at least one embodiment, third party network infrastructure system 1300 may include an identity management module 1328 that is configured to provide identity services, such as access management and authorization services in third party network infrastructure system 1300. In at least one embodiment, identity management module 1328 may control information about customers who wish to utilize services provided by third party network infrastructure system 1302. In at least one embodiment, such information can include information that authenticates identities of such customers and information that describes which actions those customers are authorized to perform relative to various system resources (e.g., files, directories, applications, communication ports, memory segments, etc.). In at least one embodiment, identity management module 1328 may also include management of descriptive information about each customer and about how and by whom that descriptive information can be accessed and modified.

In at least one embodiment, one or more systems depicted in FIG. 13 are utilized to generate and/or perform one or more software containers with various algorithms, formulas, and processes such as those described in connection with FIG. 1. In at least one embodiment, one or more systems depicted in FIG. 13 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 14:
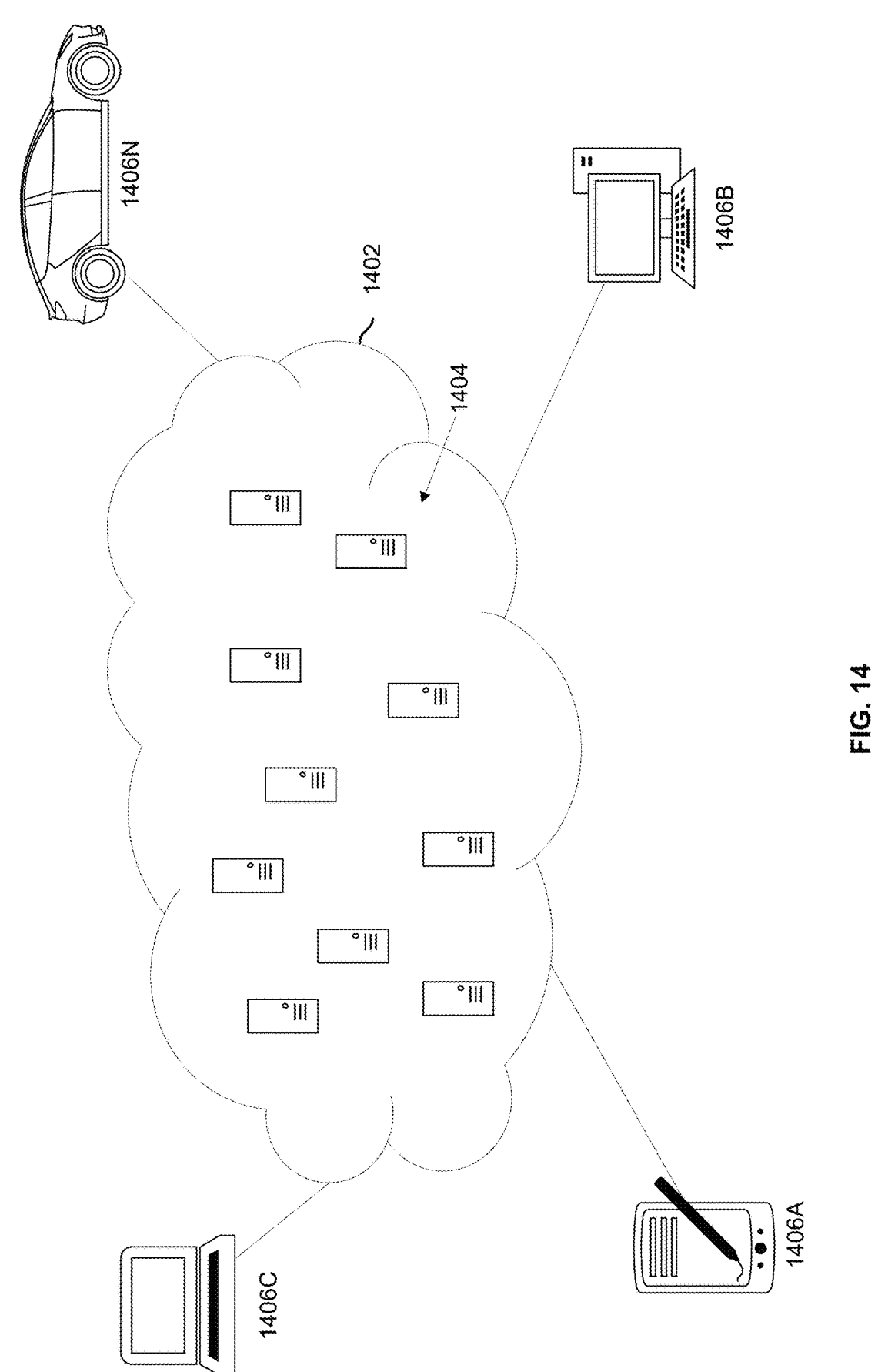
FIG. 14 illustrates a cloud computing environment, in accordance with at least one embodiment.

FIG. 14 illustrates a cloud computing environment 1402, in accordance with at least one embodiment. In at least one embodiment, cloud computing environment 1402 comprises one or more computer system/servers 1404 with which computing devices such as, personal digital assistant (PDA) or cellular telephone 1406A, desktop computer 1406B, laptop computer 1406C, and/or automobile computer system 1406N communicate. In at least one embodiment, this allows for infrastructure, platforms and/or software to be offered as services from cloud computing environment 1402, so as to not require each client to separately maintain such resources. It is understood that types of computing devices 1406A-N shown in FIG. 14 are intended to be illustrative only and that cloud computing environment 1402 can communicate with any type of computerized device over any type of network and/or network/addressable connection (e.g., using a web browser).

In at least one embodiment, a computer system/server 1404, which can be denoted as a cloud computing node, is operational with numerous other general purpose or special purpose computing system environments or configurations. In at least one embodiment, examples of computing systems, environments, and/or configurations that may be suitable for use with computer system/server 1404 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and/or variations thereof.

In at least one embodiment, computer system/server 1404 may be described in a general context of computer system-executable instructions, such as program modules, being executed by a computer system. In at least one embodiment, program modules include routines, programs, objects, components, logic, data structures, and so on, that perform particular tasks or implement particular abstract data types. In at least one embodiment, exemplary computer system/ server 1404 may be practiced in distributed loud computing environments where tasks are performed by remote processing devices that are linked through a communications network. In at least one embodiment, in a distributed cloud computing environment, program modules may be located in both local and remote computer system storage media including memory storage devices.

In at least one embodiment, one or more systems depicted in FIG. 14 are utilized to generate and/or perform one or more software containers with various algorithms, formulas, and processes such as those described in connection with FIG. 1. In at least one embodiment, one or more systems depicted in FIG. 14 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 15:
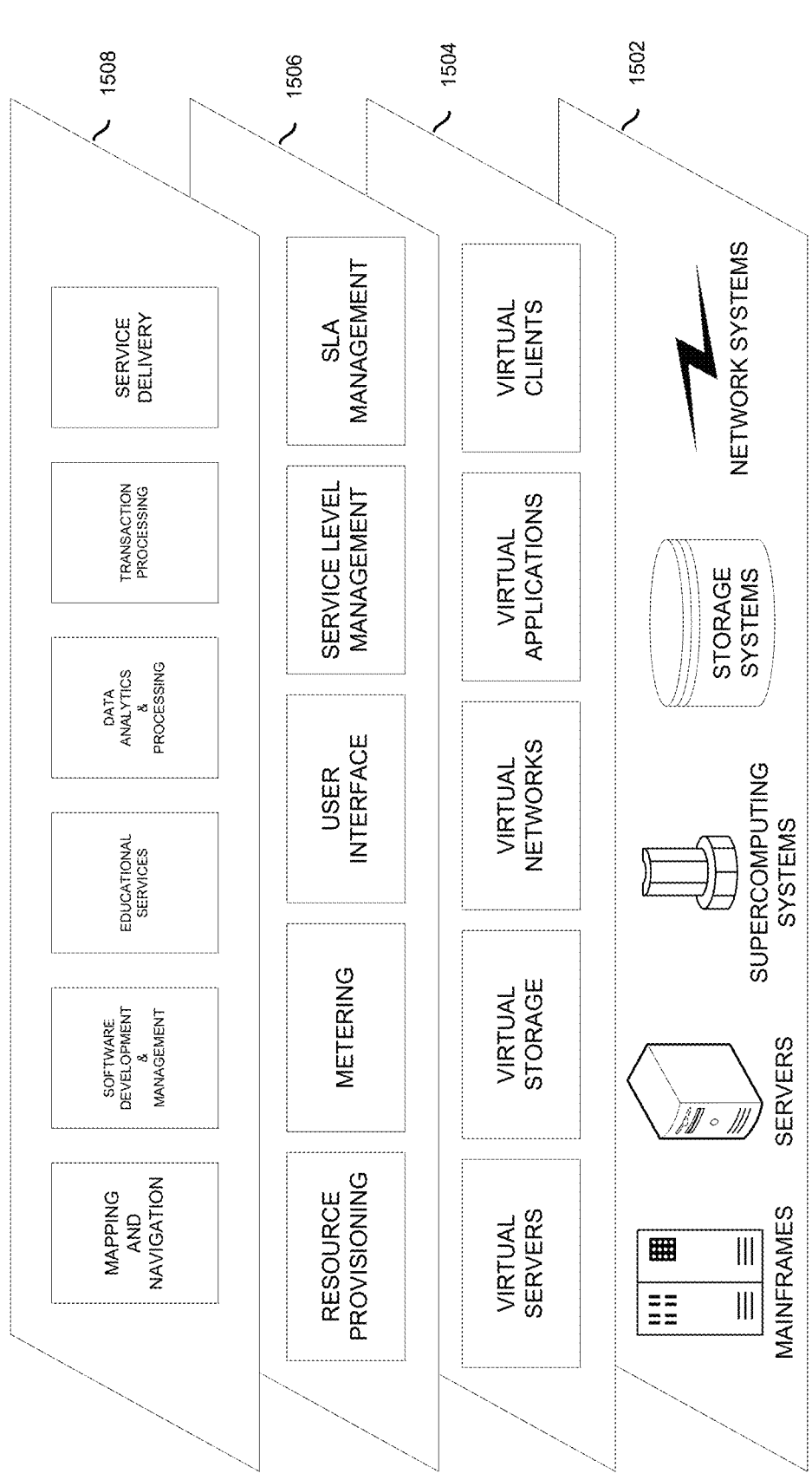
FIG. 15 illustrates a set of functional abstraction layers provided by a cloud computing environment, in accordance with at least one embodiment.

FIG. 15 illustrates a set of functional abstraction layers provided by cloud computing environment 1402 (FIG. 14), in accordance with at least one embodiment. It should be understood in advance that components, layers, and functions shown in FIG. 15 are intended to be illustrative only, and components, layers, and functions may vary.

In at least one embodiment, hardware and software layer 1502 includes hardware and software components. In at least one embodiment, examples of hardware components include mainframes, various RISC (Reduced Instruction Set Computer) architecture based servers, various computing systems, supercomputing systems, storage devices, networks, networking components, and/or variations thereof. In at least one embodiment, examples of software components include network application server software, various application server software, various database software, and/or variations thereof.

In at least one embodiment, virtualization layer 1504 provides an abstraction layer from which following exemplary virtual entities may be provided: virtual servers, virtual storage, virtual networks, including virtual private networks, virtual applications, virtual clients, and/or variations thereof.

In at least one embodiment, management layer 1506 provides various functions. In at least one embodiment, resource provisioning provides dynamic procurement of computing resources and other resources that are utilized to perform tasks within a cloud computing environment. In at least one embodiment, metering provides usage tracking as resources are utilized within a cloud computing environment, and billing or invoicing for consumption of these resources. In at least one embodiment, resources may comprise application software licenses. In at least one embodiment, security provides identity verification for users and tasks, as well as protection for data and other resources. In at least one embodiment, user interface provides access to a cloud computing environment for both users and system administrators. In at least one embodiment, service level management provides cloud computing resource allocation and management such that required service levels are met. In at least one embodiment, Service Level Agreement (SLA) management provides pre-arrangement for, and procurement of, cloud computing resources for which a future requirement is anticipated in accordance with an SLA.

In at least one embodiment, workloads layer 1508 provides functionality for which a cloud computing environment is utilized. In at least one embodiment, examples of workloads and functions which may be provided from this layer include: mapping and navigation, software development and management, educational services, data analytics and processing, transaction processing, and service delivery.

Supercomputing

The following figures set forth, without limitation, exemplary supercomputer-based systems that can be used to implement at least one embodiment.

In at least one embodiment, a supercomputer may refer to a hardware system exhibiting substantial parallelism and comprising at least one chip, where chips in a system are interconnected by a network and are placed in hierarchically organized enclosures. In at least one embodiment, a large hardware system filling a machine room, with several racks, each containing several boards/rack modules, each containing several chips, all interconnected by a scalable network, is one particular example of a supercomputer. In at least one embodiment, a single rack of such a large hardware system is another example of a supercomputer. In at least one embodiment, a single chip exhibiting substantial parallelism and containing several hardware components can equally be considered to be a supercomputer, since as feature sizes may decrease, an amount of hardware that can be incorporated in a single chip may also increase.

In at least one embodiment, one or more systems depicted in FIG. 15 are utilized to generate and/or perform one or more software containers with various algorithms, formulas, and processes such as those described in connection with FIG. 1. In at least one embodiment, one or more systems depicted in FIG. 15 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 16:
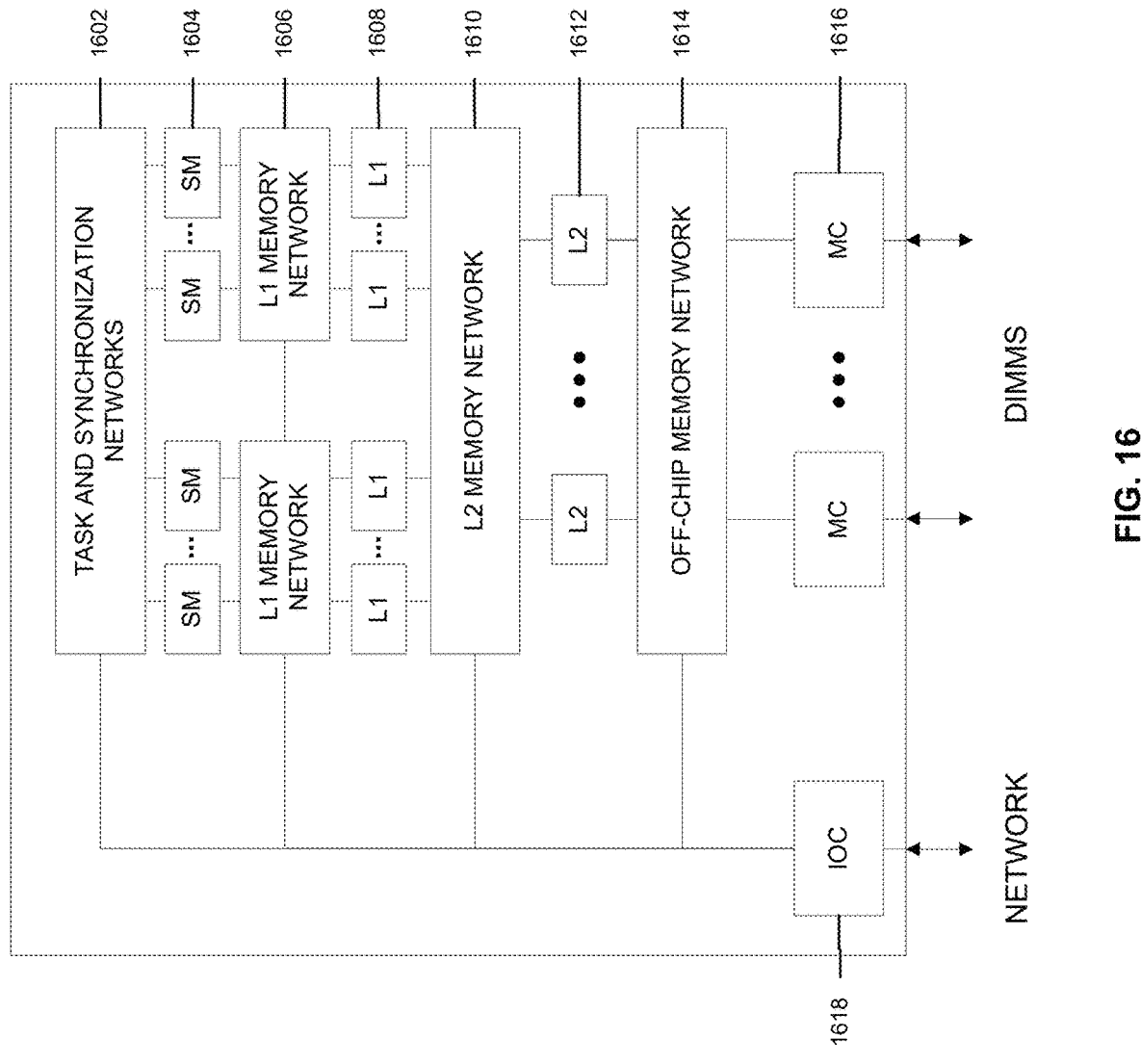
FIG. 16 illustrates a supercomputer at a chip level, in accordance with at least one embodiment.

FIG. 16 illustrates a supercomputer at a chip level, in accordance with at least one embodiment. In at least one embodiment, inside an FPGA or ASIC chip, main computation is performed within finite state machines (1604) called thread units. In at least one embodiment, task and synchronization networks (1602) connect finite state machines and are used to dispatch threads and execute operations in correct order. In at least one embodiment, a multi-level partitioned on-chip cache hierarchy (1608, 1612) is accessed using memory networks (1606, 1610). In at least one embodiment, off-chip memory is accessed using memory controllers (1616) and an off-chip memory network (1614). In at least one embodiment, I/O controller (1618) is used for cross-chip communication when a design does not fit in a single logic chip.

In at least one embodiment, one or more systems depicted in FIG. 16 are utilized to generate and/or perform one or more software containers with various algorithms, formulas, and processes such as those described in connection with FIG. 1. In at least one embodiment, one or more systems depicted in FIG. 16 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 17:
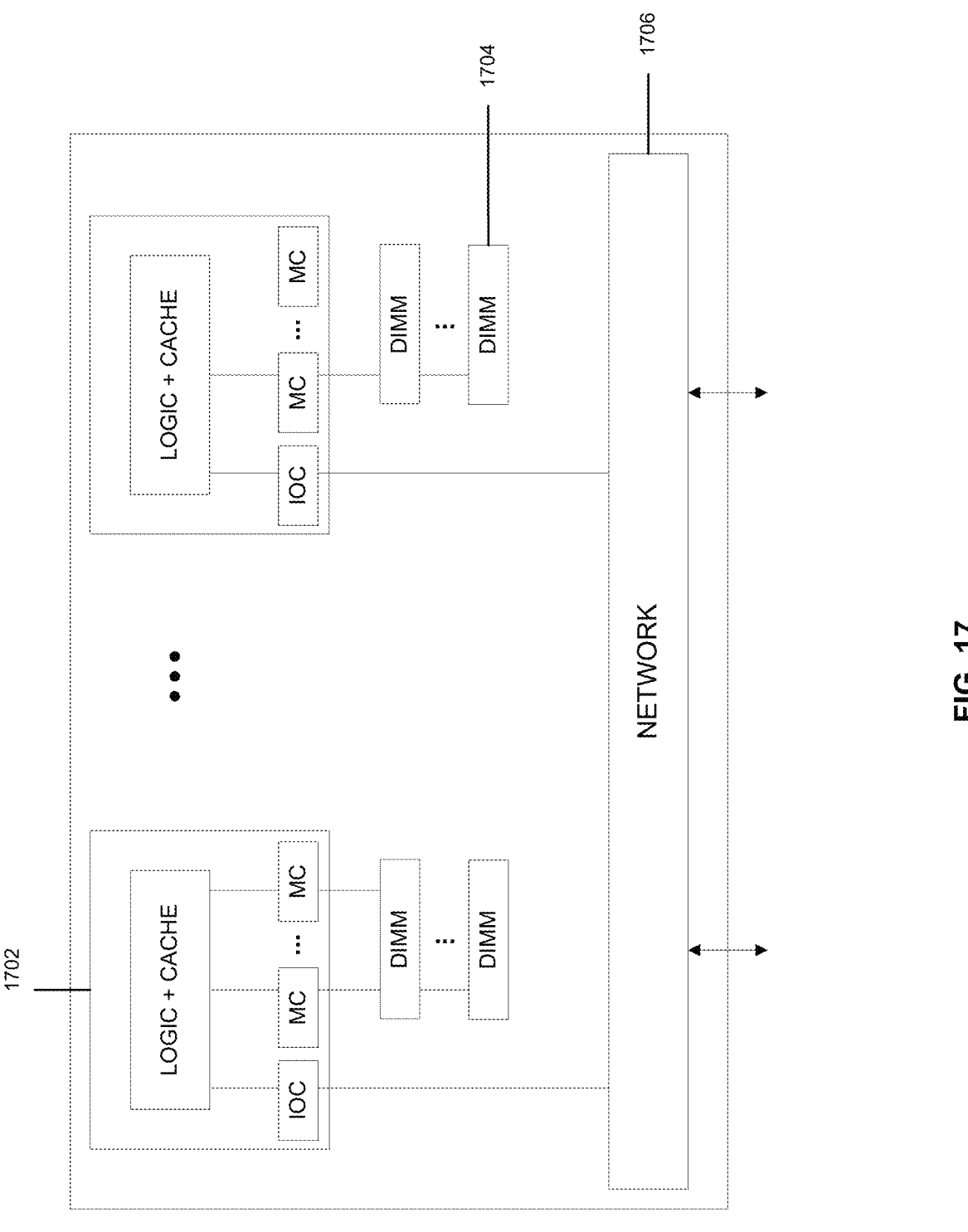
FIG. 17 illustrates a supercomputer at a rack module level, in accordance with at least one embodiment.

FIG. 17 illustrates a supercomputer at a rock module level, in accordance with at least one embodiment. In at least one embodiment, within a rack module, there are multiple FPGA or ASIC chips (1702) that are connected to one or more DRAM units (1704) which constitute main accelerator memory. In at least one embodiment, each FPGA/ASIC chip is connected to its neighbor FPGA/ASIC chip using wide busses on a board, with differential high speed signaling (1706). In at least one embodiment, each FPGA/ASIC chip is also connected to at least one high-speed serial communication cable.

In at least one embodiment, one or more systems depicted in FIG. 17 are utilized to generate and/or perform one or more software containers with various algorithms, formulas, and processes such as those described in connection with FIG. 1. In at least one embodiment, one or more systems depicted in FIG. 17 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 18:
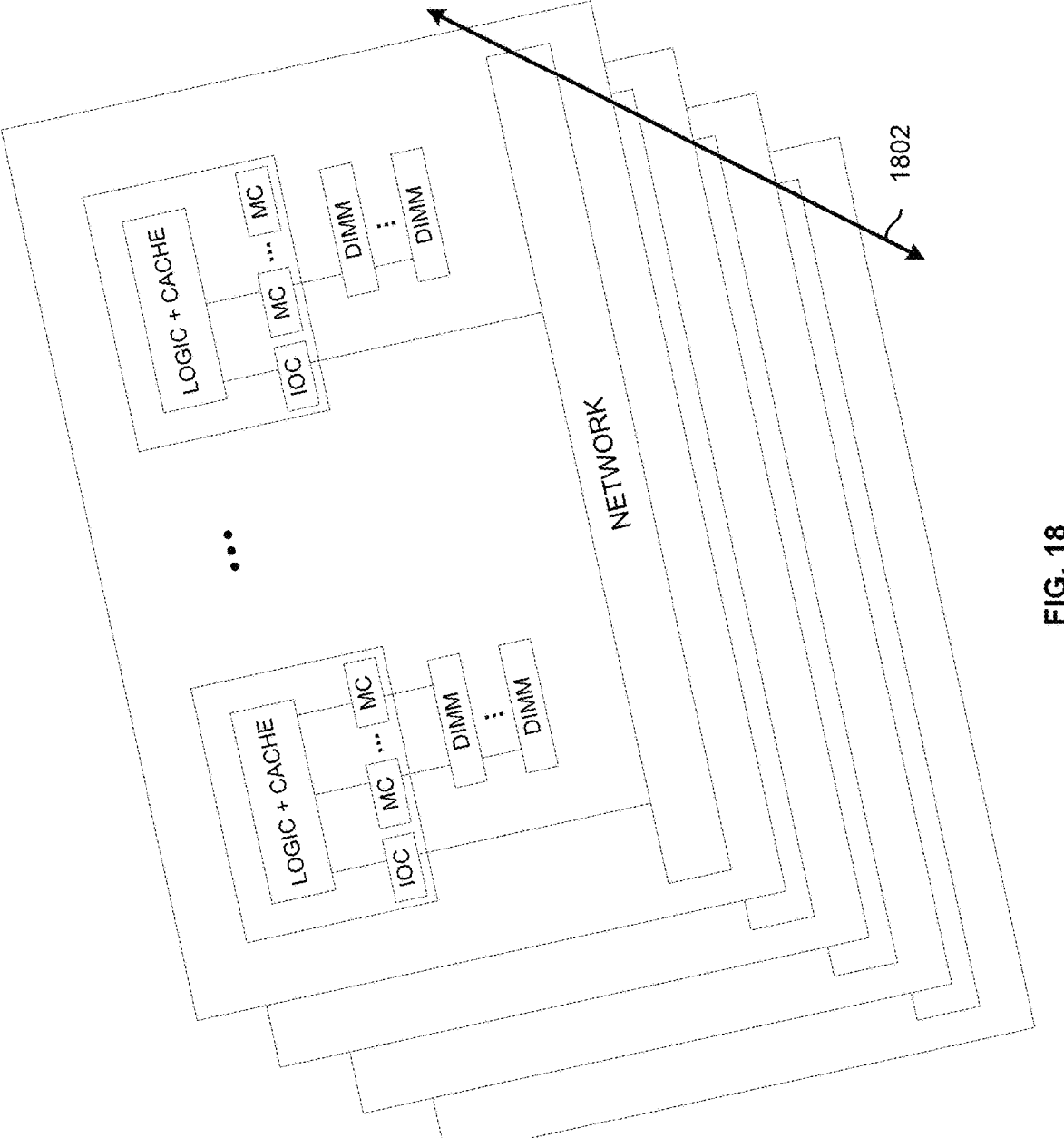
FIG. 18 illustrates a supercomputer at a rack level, in accordance with at least one embodiment.

FIG. 18 illustrates a supercomputer at a rack level, in accordance with at least one embodiment. In at least one embodiment, one or more systems depicted in FIG. 18 are utilized to generate and/or perform one or more software containers with various algorithms, formulas, and processes such as those described in connection with FIG. 1. In at least one embodiment, one or more systems depicted in FIG. 18 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 19:
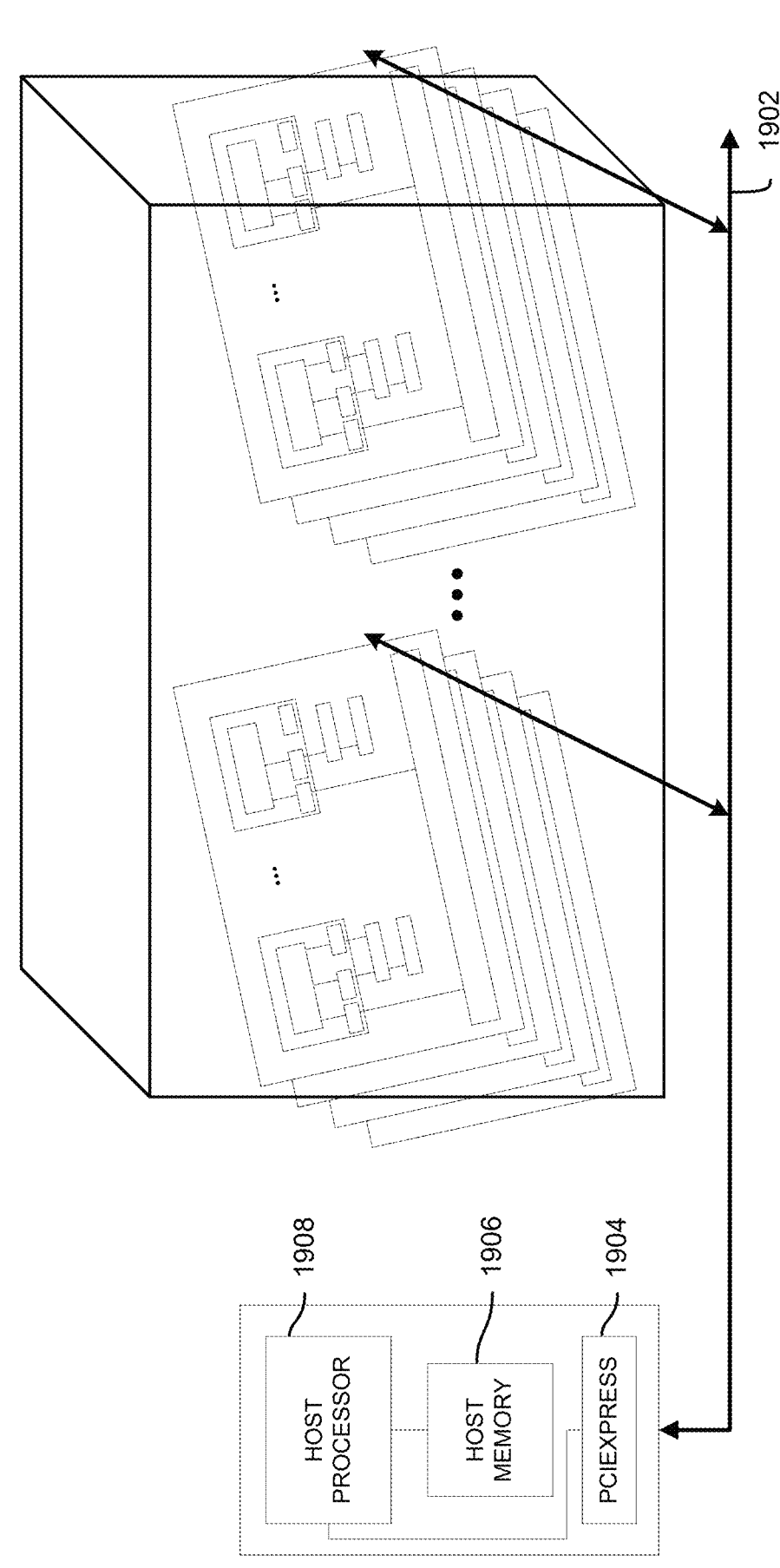
FIG. 19 illustrates a supercomputer at a whole system level, in accordance with at least one embodiment.

FIG. 19 illustrates a supercomputer at a whole system level, in accordance with at least one embodiment. In at least one embodiment, referring to FIG. 18 and FIG. 19, between rack modules in a rack and across racks throughout an entire system, high-speed serial optical or copper cables (1802, 1902) are used to realize a scalable, possibly incomplete hypercube network. In at least one embodiment, one of FPGA/ASIC chips of an accelerator is connected to a host system through a PCI-Express connection (1904). In at least one embodiment, host system comprises a host microprocessor (1908) that a software part of an application runs on and a memory consisting of one or more host memory DRAM units (1906) that is kept coherent with memory on an accelerator. In at least one embodiment, host system can be a separate module on one of racks, or can be integrated with one of a supercomputer's modules. In at least one embodiment, cube-connected cycles topology provide communication links to create a hypercube network for a large supercomputer. In at least one embodiment, a small group of FPGA/ASIC chips on a rack module can act as a single hypercube node, such that a total number of external links of each group is increased, compared to a single chip. In at least one embodiment, a group contains chips A, B, C and D on a rack module with internal wide differential busses connecting A, B, C and D in a torus organization. In at least one embodiment, there are 12 serial communication cables connecting a rack module to an outside world. In at least one embodiment, chip A on a rack module connects to serial communication cables 0, 1, 2. In at least one embodiment, chip B connects to cables 3, 4, 5. In at least one embodiment, chip C connects to 6, 7, 8. In at least one embodiment, chip D connects to 9, 10, 11. In at least one embodiment, an entire group {A, B, C, D} constituting a rack module can form a hypercube node within a supercomputer system, with up to $2^{12}=4096$ rack modules (16384 FPGA/ASIC chips). In at least one embodiment, for chip A to send a message out on link 4 of group {A, B, C, D}, a message has to be routed first to chip B with an on-board differential wide bus connection. In at least one embodiment, a message arriving into a group {A, B, C, D} on link 4 (i.e., arriving at B) destined to chip A, also has to be routed first to a correct destination chip (A) internally within a group {A, B, C, D}. In at least one embodiment, parallel supercomputer systems of other sizes may also be implemented.

In at least one embodiment, one or more systems depicted in FIG. 19 are utilized to generate and/or perform one or more software containers with various algorithms, formulas, and processes such as those described in connection with FIG. 1. In at least one embodiment, one or more systems depicted in FIG. 19 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Artificial Intelligence

The following figures set forth, without limitation, exemplary artificial intelligence-based systems that can be used to implement at least one embodiment.

Figure 20A:
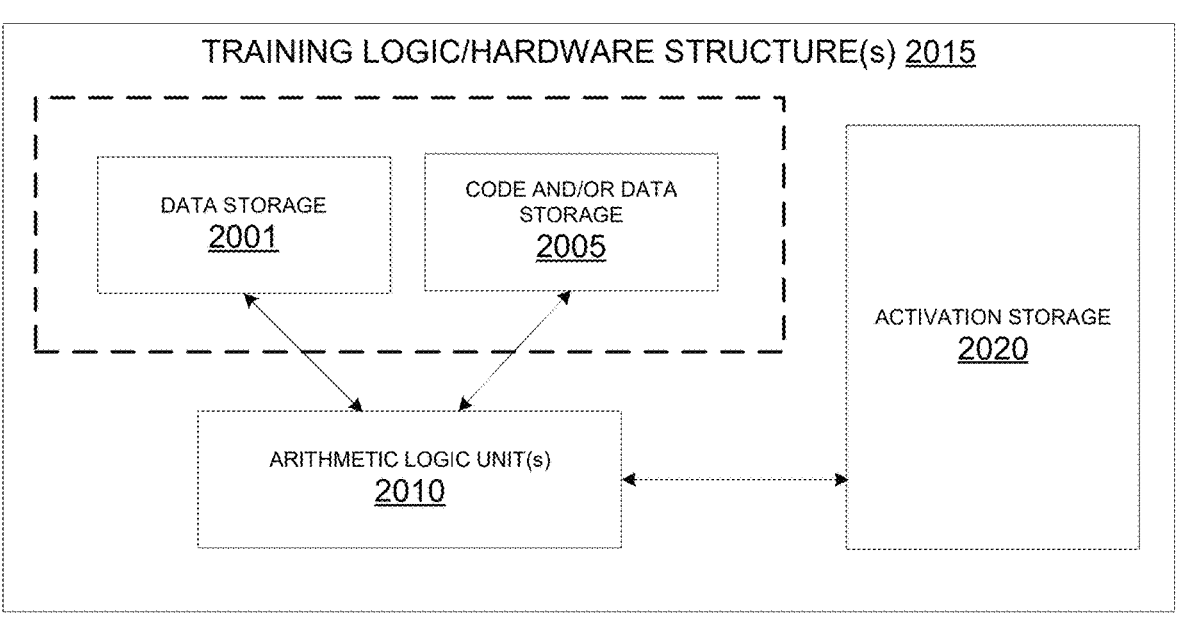
FIG. 20A illustrates inference and/or training logic, in accordance with at least one embodiment.

FIG. 20A illustrates inference and/or training logic 2015 used to perform inferencing and/or training operations associated with one or more embodiments. Details regarding inference and/or training logic 2015 are provided below in conjunction with FIGS. 20A and/or 20B.

In at least one embodiment, inference and/or training logic 2015 may include, without limitation, code and/or data storage 2001 to store forward and/or output weight and/or input/output data, and/or other parameters to configure neurons or layers of a neural network trained and/or used for inferencing in aspects of one or more embodiments. In at least one embodiment, training logic 2015 may include, or be coupled to code and/or data storage 2001 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which such code corresponds. In at least one embodiment code and/or data storage 2001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 2001 may be included with other on-chip or off-chip data storage, including a processor's L1, L2, or L3 cache or system memory.

In at least one embodiment, any portion of code and/or data storage 2001 may be internal or external to one or more processors or other hardware logic devices or circuits. In at least one embodiment, code and/or code and/or data storage 2001 may be cache memory, dynamic randomly addressable memory ("DRAM"), static randomly addressable memory ("SRAM"), non-volatile memory (e.g., flash memory), or other storage. In at least one embodiment, a choice of whether code and/or code and/or data storage 2001 is internal or external to a processor, for example, or comprising DRAM, SRAM, flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2015 may include, without limitation, a code and/or data storage 2005 to store backward and/or output weight and/or input/output data corresponding to neurons or layers of a neural network trained and/or used for inferencing in aspects of one or more embodiments. In at least one embodiment, code and/or data storage 2005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 2015 may include, or be coupled to code and/or data storage 2005 to store graph code or other software to control timing and/or order, in which weight and/or other parameter information is to be loaded to configure, logic, including integer and/or floating point units (collectively, arithmetic logic units (ALUs).

In at least one embodiment, code, such as graph code, causes loading of weight or other parameter information into processor ALUs based on an architecture of a neural network to which such code corresponds. In at least one embodiment, any portion of code and/or data storage 2005 may be included with other on-chip or off-chip data storage, including a processor's L1, L2, or L3 cache or system memory. In at least one embodiment, any portion of code and/or data storage 2005 may be internal or external to one or more processors or other hardware logic devices or circuits. In at least one embodiment, code and/or data storage 2005 may be cache memory, DRAM, SRAM, non-volatile memory (e.g., flash memory), or other storage. In at least one embodiment, a choice of whether code and/or data storage 2005 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 2001 and code and/or data storage 2005 may be separate storage structures. In at least one embodiment, code and/or data storage 2001 and code and/or data storage 2005 may be a combined storage structure. In at least one embodiment, code and/or data storage 2001 and code and/or data storage 2005 may be partially combined and partially separate. In at least one embodiment, any portion of code and/or data storage 2001 and code and/or data storage 2005 may be included with other on-chip or off-chip data storage, including a processor's L1, L2, or L3 cache or system memory.

In at least one embodiment, inference and/or training logic 2015 may include, without limitation, one or more arithmetic logic unit(s) ("ALU(s)") 2010, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 2020 that are functions of input/output and/or weight parameter data stored in code and/or data storage 2001 and/or code and/or data storage 2005. In at least one embodiment, activations stored in activation storage 2020 are generated according to linear algebraic and or matrix-based mathematics performed by ALU(s) 2010 in response to performing instructions or other code, wherein weight values stored in code and/or data storage 2005 and/or data storage 2001 are used as operands along with other values, such as bias values, gradient information, momentum values, or other parameters or hyperparameters, any or all of which may be stored in code and/or data storage 2005 or code and/or data storage 2001 or another storage on or off-chip.

In at least one embodiment, ALU(s) 2010 are included within one or more processors or other hardware logic devices or circuits, whereas in another embodiment, ALU(s) 2010 may be external to a processor or other hardware logic device or circuit that uses them (e.g., a co-processor). In at least one embodiment, ALUs 2010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 2001, code and/or data storage 2005, and activation storage 2020 may share a processor or other hardware logic device or circuit, whereas in another embodiment, they may be in different processors or other hardware logic devices or circuits, or some combination of same and different processors or other hardware logic devices or circuits. In at least one embodiment, any portion of activation storage 2020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 2020 may be cache memory, DRAM, SRAM, non-volatile memory (e.g., flash memory), or other storage. In at least one embodiment, activation storage 2020 may be completely or partially within or external to one or more processors or other logical circuits. In at least one embodiment, a choice of whether activation storage 2020 is internal or external to a processor, for example, or comprising DRAM, SRAM, flash memory or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 2015 illustrated in FIG. 20A may be used in conjunction with an application-specific integrated circuit ("ASIC"), such as a TensorFlow® Processing Unit from Google, an inference processing unit (IPU) from Graphcore™, or a Nervana® (e.g., "Lake Crest") processor from Intel Corp. In at least one embodiment, inference and/or training logic 2015 illustrated in FIG. 20A may be used in conjunction with central processing unit ("CPU") hardware, graphics processing unit ("GPU") hardware or other hardware, such as field programmable gate arrays ("FPGAs").

In at least one embodiment, one or more systems depicted in FIG. 20A are utilized to generate and/or perform one or more software containers with various algorithms, formulas, and processes such as those described in connection with FIG. 1. In at least one embodiment, one or more systems depicted in FIG. 20A are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 20B:
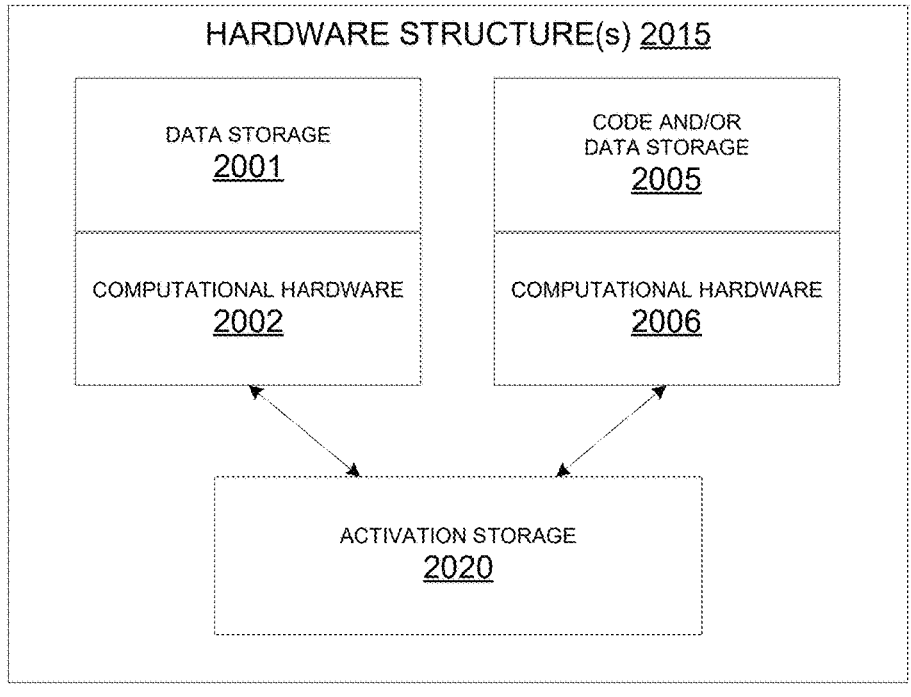
FIG. 20B illustrates inference and/or training logic, in accordance with at least one embodiment.

FIG. 20B illustrates inference and/or training logic 2015, according to at least one embodiment. In at least one embodiment, inference and/or training logic 2015 may include, without limitation, hardware logic in which computational resources are dedicated or otherwise exclusively used in conjunction with weight values or other information corresponding to one or more layers of neurons within a neural network. In at least one embodiment, inference and/or training logic 2015 illustrated in FIG. 20B may be used in conjunction with an application-specific integrated circuit (ASIC), such as TensorFlow® Processing Unit from Google, an inference processing unit (IPU) from Graphcore™, or a Nervana® (e.g., "Lake Crest") processor from Intel Corp. In at least one embodiment, inference and/or training logic 2015 illustrated in FIG. 20B may be used in conjunction with central processing unit (CPU) hardware, graphics processing unit (GPU) hardware or other hardware, such as field programmable gate arrays (FPGAs). In at least one embodiment, inference and/or training logic 2015 includes, without limitation, code and/or data storage 2001 and code and/or data storage 2005, which may be used to store code (e.g., graph code), weight values and/or other information, including bias values, gradient information, momentum values, and/or other parameter or hyperparameter information. In at least one embodiment illustrated in FIG. 20B, each of code and/or data storage 2001 and code and/or data storage 2005 is associated with a dedicated computational resource, such as computational hardware 2002 and computational hardware 2006, respectively. In at least one embodiment, each of computational hardware 2002 and computational hardware 2006 comprises one or more ALUs that perform mathematical functions, such as linear algebraic functions, only on information stored in code and/or data storage 2001 and code and/or data storage 2005, respectively, result of which is stored in activation storage 2020.

In at least one embodiment, each of code and/or data storage 2001 and 2005 and corresponding computational hardware 2002 and 2006, respectively, correspond to different layers of a neural network, such that resulting activation from one storage/computational pair 2001/2002 of code and/or data storage 2001 and computational hardware 2002 is provided as an input to a next storage/computational pair 2005/2006 of code and/or data storage 2005 and computational hardware 2006, in order to mirror a conceptual organization of a neural network. In at least one embodiment, each of storage/computational pairs 2001/2002 and 2005/2006 may correspond to more than one neural network layer. In at least one embodiment, additional storage/computation pairs (not shown) subsequent to or in parallel with storage/computation pairs 2001/2002 and 2005/2006 may be included in inference and/or training logic 2015.

In at least one embodiment, one or more systems depicted in FIG. 20B are utilized to generate and/or perform one or more software containers with various algorithms, formulas, and processes such as those described in connection with FIG. 1. In at least one embodiment, one or more systems depicted in FIG. 20B are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 21:
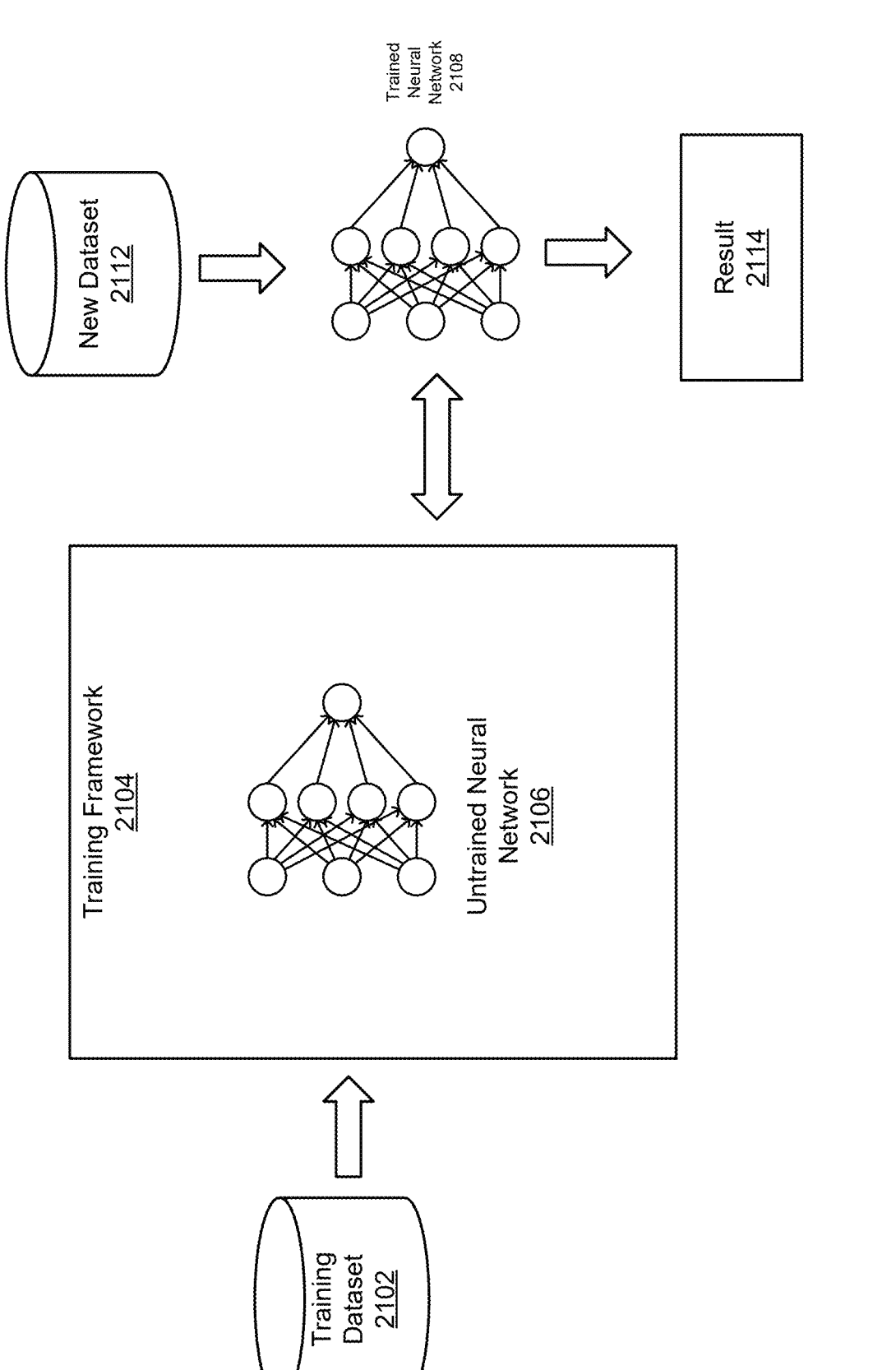
FIG. 21 illustrates training and deployment of a neural network, in accordance with at least one embodiment.

FIG. 21 illustrates training and deployment of a deep neural network, according to at least one embodiment. In at least one embodiment, untrained neural network 2106 is trained using a training dataset 2102. In at least one embodiment, training framework 2104 is a PyTorch framework, whereas in other embodiments, training framework 2104 is a TensorFlow, Boost, Caffe, Microsoft Cognitive Toolkit/CNTK, MXNet, Chainer, Keras, Deeplearning4j, or other training framework. In at least one embodiment, training framework 2104 trains an untrained neural network 2106 and enables it to be trained using processing resources described herein to generate a trained neural network 2108. In at least one embodiment, weights may be chosen randomly or by pre-training using a deep belief network. In at least one embodiment, training may be performed in either a supervised, partially supervised, or unsupervised manner.

In at least one embodiment, untrained neural network 2106 is trained using supervised learning, wherein training dataset 2102 includes an input paired with a desired output for an input, or where training dataset 2102 includes input having a known output and an output of neural network 2106 is manually graded. In at least one embodiment, untrained neural network 2106 is trained in a supervised manner and processes inputs from training dataset 2102 and compares resulting outputs against a set of expected or desired outputs. In at least one embodiment, errors are then propagated back through untrained neural network 2106. In at least one embodiment, training framework 2104 adjusts weights that control untrained neural network 2106. In at least one embodiment, training framework 2104 includes tools to monitor how well untrained neural network 2106 is converging towards a model, such as trained neural network 2108, suitable to generating correct answers, such as in result 2114, based on input data such as a new dataset 2112. In at least one embodiment, training framework 2104 trains untrained neural network 2106 repeatedly while adjust weights to refine an output of untrained neural network 2106 using a loss function and adjustment algorithm, such as stochastic gradient descent. In at least one embodiment, training framework 2104 trains untrained neural network 2106 until untrained neural network 2106 achieves a desired accuracy. In at least one embodiment, trained neural network 2108 can then be deployed to implement any number of machine learning operations.

In at least one embodiment, untrained neural network 2106 is trained using unsupervised learning, wherein untrained neural network 2106 attempts to train itself using unlabeled data. In at least one embodiment, unsupervised learning training dataset 2102 will include input data without any associated output data or "ground truth" data. In at least one embodiment, untrained neural network 2106 can learn groupings within training dataset 2102 and can determine how individual inputs are related to untrained dataset 2102. In at least one embodiment, unsupervised training can be used to generate a self-organizing map in trained neural network 2108 capable of performing operations useful in reducing dimensionality of new dataset 2112. In at least one embodiment, unsupervised training can also be used to perform anomaly detection, which allows identification of data points in new dataset 2112 that deviate from normal patterns of new dataset 2112.

In at least one embodiment, semi-supervised learning may be used, which is a technique in which in training dataset 2102 includes a mix of labeled and unlabeled data. In at least one embodiment, training framework 2104 may be used to perform incremental learning, such as through transferred learning techniques. In at least one embodiment, incremental learning enables trained neural network 2108 to adapt to new dataset 2112 without forgetting knowledge instilled within trained neural network 2108 during initial training.

In at least one embodiment, one or more systems depicted in FIG. 21 are utilized to generate and/or perform one or more software containers with various algorithms, formulas, and processes such as those described in connection with FIG. 1. In at least one embodiment, one or more systems depicted in FIG. 21 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

The following figures set forth, without limitation, exemplary 5G network-based systems that can be used to implement at least one embodiment.

Figure 22:
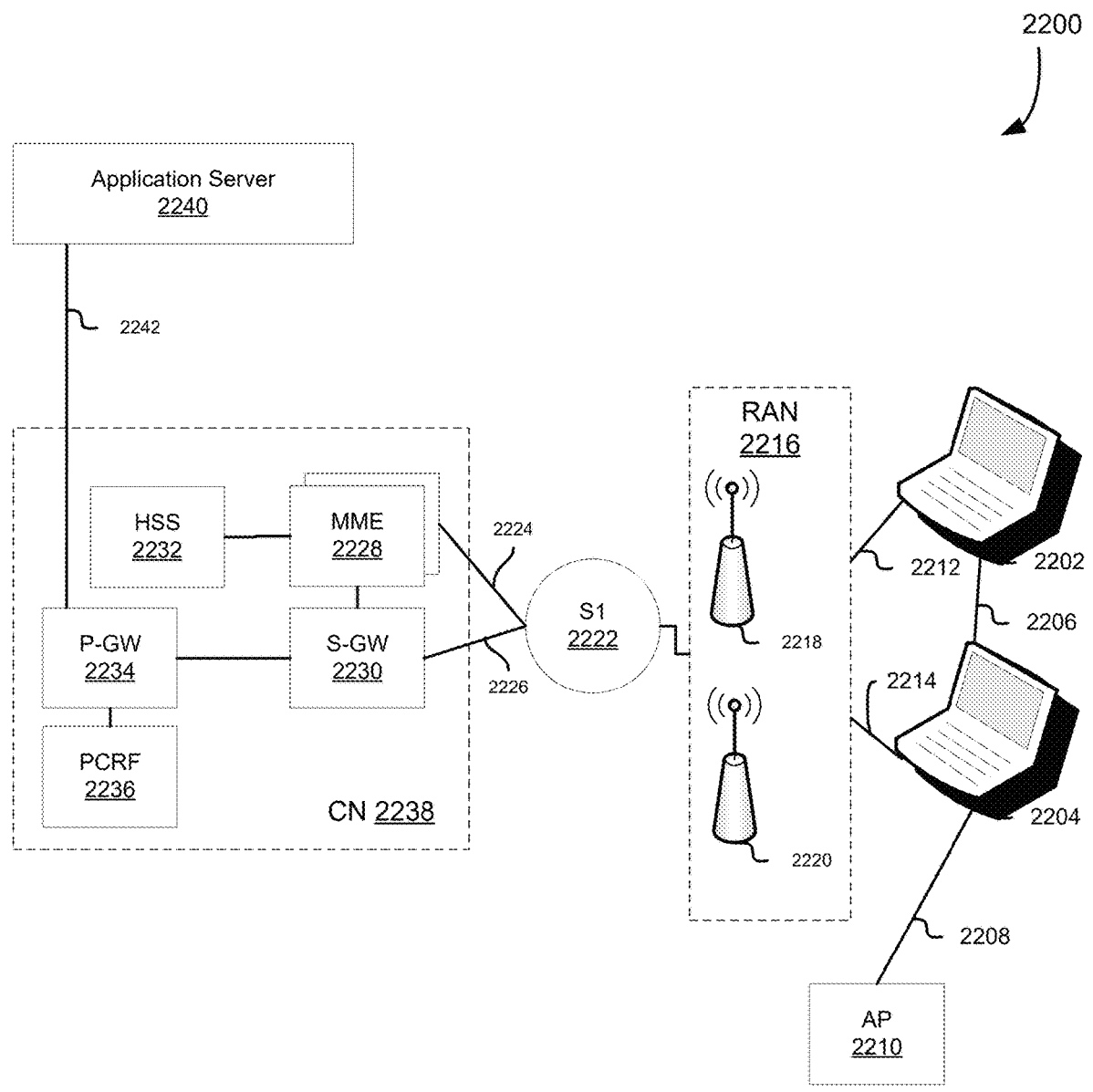
FIG. 22 illustrates an architecture of a system of a network, in accordance with at least one embodiment.

FIG. 22 illustrates an architecture of a system 2200 of a network, in accordance with at least one embodiment. In at least one embodiment, system 2200 is shown to include a user equipment (UE) 2202 and a UE 2204. In at least one embodiment, UEs 2202 and 2204 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In at least one embodiment, any of UEs 2202 and 2204 can comprise an Internet of Things (IoT) UE, which can comprise a network access layer designed for low-power IoT applications utilizing short-lived UE connections. In at least one embodiment, an IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. In at least one embodiment, a M2M or MTC exchange of data may be a machine-initiated exchange of data. In at least one embodiment, an IoT network describes interconnecting IoT UEs, which may include uniquely identifiable embedded computing devices (within Internet infrastructure), with short-lived connections. In at least one embodiment, an IoT UEs may execute background applications (e.g., keep alive messages, status updates, etc.) to facilitate connections of an IoT network.

In at least one embodiment, UEs 2202 and 2204 may be configured to connect, e.g., communicatively couple, with a radio access network (RAN) 2216. In at least one embodiment, RAN 2216 may be, for example, an Evolved Universal Mobile Telecommunications System (UMTS) Terrestrial Radio Access Network (E-UTRAN), a NextGen RAN (NG RAN), or some other type of RAN. In at least one embodiment, UEs 2202 and 2204 utilize connections 2212 and 2214, respectively, each of which comprises a physical communications interface or layer. In at least one embodiment, connections 2212 and 2214 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and variations thereof.

In at least one embodiment, UEs 2202 and 2204 may further directly exchange communication data via a ProSe interface 2206. In at least one embodiment, ProSe interface 2206 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

In at least one embodiment, UE 2204 is shown to be configured to access an access point (AP) 2210 via connection 2208. In at least one embodiment, connection 2208 can comprise a local wireless connection, such as a connection consistent with any IEEE 802.11 protocol, wherein AP 2210 would comprise a wireless fidelity (WiFi®) router. In at least one embodiment, AP 2210 is shown to be connected to an Internet without connecting to a core network of a wireless system.

In at least one embodiment, RAN 2216 can include one or more access nodes that enable connections 2212 and 2214. In at least one embodiment, these access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). In at least one embodiment, RAN 2216 may include one or more RAN nodes for providing macrocells, e.g., macro RAN node 2218, and one or more RAN nodes for providing femtocells or picocells (e.g., cells having smaller coverage areas, smaller user capacity, or higher bandwidth compared to macrocells), e.g., low power (LP) RAN node 2220.

In at least one embodiment, any of RAN nodes 2218 and 2220 can terminate an air interface protocol and can be a first point of contact for UEs 2202 and 2204. In at least one embodiment, any of RAN nodes 2218 and 2220 can fulfill various logical functions for RAN 2216 including, but not limited to, radio network controller (RNC) functions such as radio bearer management, uplink and downlink dynamic radio resource management and data packet scheduling, and mobility management.

In at least one embodiment, UEs 2202 and 2204 can be configured to communicate using Orthogonal Frequency-Division Multiplexing (OFDM) communication signals with each other or with any of RAN nodes 2218 and 2220 over a multi-carrier communication channel in accordance various communication techniques, such as, but not limited to, an Orthogonal Frequency Division Multiple Access (OFDMA) communication technique (e.g., for downlink communications) or a Single Carrier Frequency Division Multiple Access (SC-FDMA) communication technique (e.g., for uplink and ProSe or sidelink communications), and/or variations thereof. In at least one embodiment, OFDM signals can comprise a plurality of orthogonal subcarriers.

In at least one embodiment, a downlink resource grid can be used for downlink transmissions from any of RAN nodes 2218 and 2220 to UEs 2202 and 2204, while uplink transmissions can utilize similar techniques. In at least one embodiment, a grid can be a time frequency grid, called a resource grid or time-frequency resource grid, which is a physical resource in a downlink in each slot. In at least one embodiment, such a time frequency plane representation is a common practice for OFDM systems, which makes it intuitive for radio resource allocation. In at least one embodiment, each column and each row of a resource grid corresponds to one OFDM symbol and one OFDM subcarrier, respectively. In at least one embodiment, a duration of a resource grid in a time domain corresponds to one slot in a radio frame. In at least one embodiment, a smallest time-frequency unit in a resource grid is denoted as a resource element. In at least one embodiment, each resource grid comprises a number of resource blocks, which describe a mapping of certain physical channels to resource elements. In at least one embodiment, each resource block comprises a collection of resource elements. In at least one embodiment, in a frequency domain, this may represent a smallest quantity of resources that currently can be allocated. In at least one embodiment, there are several different physical downlink channels that are conveyed using such resource blocks.

In at least one embodiment, a physical downlink shared channel (PDSCH) may carry user data and higher-layer signaling to UEs 2202 and 2204. In at least one embodiment, a physical downlink control channel (PDCCH) may carry information about a transport format and resource allocations related to PDSCH channel, among other things. In at least one embodiment, it may also inform UEs 2202 and 2204 about a transport format, resource allocation, and HARQ (Hybrid Automatic Repeat Request) information related to an uplink shared channel. In at least one embodiment, typically, downlink scheduling (assigning control and shared channel resource blocks to UE 2202 within a cell) may be performed at any of RAN nodes 2218 and 2220 based on channel quality information fed back from any of UEs 2202 and 2204. In at least one embodiment, downlink resource assignment information may be sent on a PDCCH used for (e.g., assigned to) each of UEs 2202 and 2204.

In at least one embodiment, a PDCCH may use control channel elements (CCEs) to convey control information. In at least one embodiment, before being mapped to resource elements, PDCCH complex valued symbols may first be organized into quadruplets, which may then be permuted using a sub-block interleaver for rate matching. In at least one embodiment, each PDCCH may be transmitted using one or more of these CCEs, where each CCE may correspond to nine sets of four physical resource elements known as resource element groups (REGs). In at least one embodiment, four Quadrature Phase Shift Keying (QPSK) symbols may be mapped to each REG. In at least one embodiment, PDCCH can be transmitted using one or more CCEs, depending on a size of a downlink control information (DCI) and a channel condition. In at least one embodiment, there can be four or more different PDCCH formats defined in LTE with different numbers of CCEs (e.g., aggregation level, L=1, 2, 4, or 8).

In at least one embodiment, an enhanced physical downlink control channel (EPDCCH) that uses PDSCH resources may be utilized for control information transmission. In at least one embodiment, EPDCCH may be transmitted using one or more enhanced control channel elements (ECCEs). In at least one embodiment, each ECCE may correspond to nine sets of four physical resource elements known as an enhanced resource element groups (EREGs). In at least one embodiment, an ECCE may have other numbers of EREGs in some situations.

In at least one embodiment, RAN 2216 is shown to be communicatively coupled to a core network (CN) 2238 via an S1 interface 2222. In at least one embodiment, CN 2238 may be an evolved packet core (EPC) network, a NextGen Packet Core (NPC) network, or some other type of CN. In at least one embodiment, S1 interface 2222 is split into two parts: S1-U interface 2226, which carries traffic data between RAN nodes 2218 and 2220 and serving gateway (S-GW) 2230, and a S1-mobility management entity (MME) interface 2224, which is a signaling interface between RAN nodes 2218 and 2220 and MMEs 2228.

In at least one embodiment, CN 2238 comprises MMEs 2228, S-GW 2230, Packet Data Network (PDN) Gateway (P-GW) 2234, and a home subscriber server (HSS) 2232. In at least one embodiment, MMEs 2228 may be similar in function to a control plane of legacy Serving General Packet Radio Service (GPRS) Support Nodes (SGSN). In at least one embodiment, MMEs 2228 may manage mobility aspects in access such as gateway selection and tracking area list management. In at least one embodiment, HSS 2232 may comprise a database for network users, including subscription related information to support a network entities' handling of communication sessions. In at least one embodiment, CN 2238 may comprise one or several HSSs 2232, depending on a number of mobile subscribers, on a capacity of an equipment, on an organization of a network, etc. In at least one embodiment, HSS 2232 can provide support for routing/roaming, authentication, authorization, naming/addressing resolution, location dependencies, etc.

In at least one embodiment, S-GW 2230 may terminate a S1 interface 2222 towards RAN 2216, and routes data packets between RAN 2216 and CN 2238. In at least one embodiment, S-GW 2230 may be a local mobility anchor point for inter-RAN node handovers and also may provide an anchor for inter-3GPP mobility. In at least one embodiment, other responsibilities may include lawful intercept, charging, and some policy enforcement.

In at least one embodiment, P-GW 2234 may terminate an SGi interface toward a PDN. In at least one embodiment, P-GW 2234 may route data packets between an EPC network 2238 and external networks such as a network including application server 2240 (alternatively referred to as application function (AF)) via an Internet Protocol (IP) interface 2242. In at least one embodiment, application server 2240 may be an element offering applications that use IP bearer resources with a core network (e.g., UMTS Packet Services (PS) domain, LTE PS data services, etc.). In at least one embodiment, P-GW 2234 is shown to be communicatively coupled to an application server 2240 via an IP communications interface 2242. In at least one embodiment, application server 2240 can also be configured to support one or more communication services (e.g., Voice-over-Internet Protocol (VoIP) sessions, PTT sessions, group communication sessions, social networking services, etc.) for UEs 2202 and 2204 via CN 2238.

In at least one embodiment, P-GW 2234 may further be a node for policy enforcement and charging data collection. In at least one embodiment, policy and Charging Enforcement Function (PCRF) 2236 is a policy and charging control element of CN 2238. In at least one embodiment, in a non-roaming scenario, there may be a single PCRF in a Home Public Land Mobile Network (HPLMN) associated with a UE's Internet Protocol Connectivity Access Network (IP-CAN) session. In at least one embodiment, in a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). In at least one embodiment, PCRF 2236 may be communicatively coupled to application server 2240 via P-GW 2234. In at least one embodiment, application server 2240 may signal PCRF 2236 to indicate a new service flow and select an appropriate Quality of Service (QoS) and charging parameters. In at least one embodiment, PCRF 2236 may provision this rule into a Policy and Charging Enforcement Function (PCEF) (not shown) with an appropriate traffic flow template (TFT) and QoS class of identifier (QCI), which commences a QoS and charging as specified by application server 2240.

In at least one embodiment, one or more systems depicted in FIG. 22 are utilized to generate and/or perform one or more software containers with various algorithms, formulas, and processes such as those described in connection with FIG. 1. In at least one embodiment, one or more systems depicted in FIG. 22 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

FIG. 23 illustrates an architecture of a system 2300 of a network in accordance with some embodiments. In at least one embodiment, system 2300 is shown to include a UE 2302, a 5G access node or RAN node (shown as (R)AN node 2308), a User Plane Function (shown as UPF 2304), a Data Network (DN 2306), which may be, for example, operator services, Internet access or 3rd party services, and a 5G Core Network (5GC) (shown as CN 2310).

In at least one embodiment, CN 2310 includes an Authentication Server Function (AUSF 2314); a Core Access and Mobility Management Function (AMF 2312); a Session Management Function (SMF 2318); a Network Exposure Function (NEF 2316); a Policy Control Function (PCF 2322); a Network Function (NF) Repository Function (NRF 2320); a Unified Data Management (UDM 2324); and an Application Function (AF 2326). In at least one embodiment, CN 2310 may also include other elements that are not shown, such as a Structured Data Storage network function (SDSF), an Unstructured Data Storage network function (UDSF), and variations thereof.

In at least one embodiment, UPF 2304 may act as an anchor point for intra-RAT and inter-RAT mobility, an external PDU session point of interconnect to DN 2306, and a branching point to support multi-homed PDU session. In at least one embodiment, UPF 2304 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in uplink and downlink, and downlink packet buffering and downlink data notification triggering. In at least one embodiment, UPF 2304 may include an uplink classifier to support routing traffic flows to a data network. In at least one embodiment, DN 2306 may represent various network operator services, Internet access, or third party services.

In at least one embodiment, AUSF 2314 may store data for authentication of UE 2302 and handle authentication related functionality. In at least one embodiment, AUSF 2314 may facilitate a common authentication framework for various access types.

In at least one embodiment, AMF 2312 may be responsible for registration management (e.g., for registering UE 2302, etc.), connection management, reachability management, mobility management, and lawful interception of AMF-related events, and access authentication and authorization. In at least one embodiment, AMF 2312 may provide transport for SM messages for SMF 2318, and act as a transparent proxy for routing SM messages. In at least one embodiment, AMF 2312 may also provide transport for short message service (SMS) messages between UE 2302 and an SMS function (SMSF) (not shown by FIG. 23). In at least one embodiment, AMF 2312 may act as Security Anchor Function (SEA), which may include interaction with AUSF 2314 and UE 2302 and receipt of an intermediate key that was established as a result of UE 2302 authentication process. In at least one embodiment, where USIM based authentication is used, AMF 2312 may retrieve security material from AUSF 2314. In at least one embodiment, AMF 2312 may also include a Security Context Management (SCM) function, which receives a key from SEA that it uses to derive access-network specific keys. In at least one embodiment, furthermore, AMF 2312 may be a termination point of RAN CP interface (N2 reference point), a termination point of NAS (NI) signaling, and perform NAS ciphering and integrity protection.

In at least one embodiment, AMF 2312 may also support NAS signaling with a UE 2302 over an N3 interworking-function (IWF) interface. In at least one embodiment, N3IWF may be used to provide access to untrusted entities. In at least one embodiment, N3IWF may be a termination point for N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in uplink, and enforce QoS corresponding to N3 packet marking taking into account QoS requirements associated to such marking received over N2. In at least one embodiment, N3IWF may also relay uplink and downlink control-plane NAS (NI) signaling between UE 2302 and AMF 2312, and relay uplink and downlink user-plane packets between UE 2302 and UPF 2304. In at least one embodiment, N3IWF also provides mechanisms for IPsec tunnel establishment with UE 2302.

In at least one embodiment, SMF 2318 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. In at least one embodiment, SMF 2318 may include following roaming functionality: handle local enforcement to apply QoS SLAB (VPLMN); charging data collection and charging interface (VPLMN);

lawful intercept (in VPLMN for SM events and interface to LI System); support for interaction with external DN for transport of signaling for PDU session authorization/authentication by external DN.

In at least one embodiment, NEF 2316 may provide means for securely exposing services and capabilities provided by 3GPP network functions for third party, internal exposure/re-exposure, Application Functions (e.g., AF 2326), edge computing or fog computing systems, etc. In at least one embodiment, NEF 2316 may authenticate, authorize, and/or throttle AFs. In at least one embodiment, NEF 2316 may also translate information exchanged with AF 2326 and information exchanged with internal network functions. In at least one embodiment, NEF 2316 may translate between an AF-Service-Identifier and an internal 5GC information. In at least one embodiment, NEF 2316 may also receive information from other network functions (NFs) based on exposed capabilities of other network functions. In at least one embodiment, this information may be stored at NEF 2316 as structured data, or at a data storage NF using a standardized interfaces. In at least one embodiment, stored information can then be re-exposed by NEF 2316 to other NFs and AFs, and/or used for other purposes such as analytics.

In at least one embodiment, NRF 2320 may support service discovery functions, receive NF Discovery Requests from NF instances, and provide information of discovered NF instances to NF instances. In at least one embodiment, NRF 2320 also maintains information of available NF instances and their supported services.

In at least one embodiment, PCF 2322 may provide policy rules to control plane function(s) to enforce them, and may also support unified policy framework to govern network behavior. In at least one embodiment, PCF 2322 may also implement a front end (FE) to access subscription information relevant for policy decisions in a UDR of UDM 2324.

In at least one embodiment, UDM 2324 may handle subscription-related information to support a network entities' handling of communication sessions, and may store subscription data of UE 2302. In at least one embodiment, UDM 2324 may include two parts, an application FE and a User Data Repository (UDR). In at least one embodiment, UDM may include a UDM FE, which is in charge of processing of credentials, location management, subscription management and so on. In at least one embodiment, several different front ends may serve a same user in different transactions. In at least one embodiment, UDM-FE accesses subscription information stored in an UDR and performs authentication credential processing; user identification handling; access authorization; registration/mobility management; and subscription management. In at least one embodiment, UDR may interact with PCF 2322. In at least one embodiment, UDM 2324 may also support SMS management, wherein an SMS-FE implements a similar application logic as discussed previously.

In at least one embodiment, AF 2326 may provide application influence on traffic routing, access to a Network Capability Exposure (NCE), and interact with a policy framework for policy control. In at least one embodiment, NCE may be a mechanism that allows a 5GC and AF 2326 to provide information to each other via NEF 2316, which may be used for edge computing implementations. In at least one embodiment, network operator and third party services may be hosted close to UE 2302 access point of attachment to achieve an efficient service delivery through a reduced end-to-end latency and load on a transport network. In at least one embodiment, for edge computing implementations, 5GC may select a UPF 2304 close to UE 2302 and execute traffic steering from UPF 2304 to DN 2306 via N6 interface. In at least one embodiment, this may be based on UE subscription data, UE location, and information provided by AF 2326. In at least one embodiment, AF 2326 may influence UPF (re)selection and traffic routing. In at least one embodiment, based on operator deployment, when AF 2326 is considered to be a trusted entity, a network operator may permit AF 2326 to interact directly with relevant NFs.

In at least one embodiment, CN 2310 may include an SMSF, which may be responsible for SMS subscription checking and verification, and relaying SM messages to/from UE 2302 to/from other entities, such as an SMS-GMSC/IWMSC/SMS-router. In at least one embodiment, SMS may also interact with AMF 2312 and UDM 2324 for notification procedure that UE 2302 is available for SMS transfer (e.g., set a UE not reachable flag, and notifying UDM 2324 when UE 2302 is available for SMS).

In at least one embodiment, system 2300 may include following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

In at least one embodiment, system 2300 may include following reference points: N1: Reference point between UE and AMF; N2: Reference point between (R)AN and AMF; N3: Reference point between (R)AN and UPF; N4: Reference point between SMF and UPF; and N6: Reference point between UPF and a Data Network. In at least one embodiment, there may be many more reference points and/or service-based interfaces between a NF services in NFs, however, these interfaces and reference points have been omitted for clarity. In at least one embodiment, an NS reference point may be between a PCF and AF; an N7 reference point may be between PCF and SMF; an N11 reference point between AMF and SMF; etc. In at least one embodiment, CN 2310 may include an Nx interface, which is an inter-CN interface between MME and AMF 2312 in order to enable interworking between CN 2310 and CN 7223.

In at least one embodiment, system 2300 may include multiple RAN nodes (such as (R)AN node 2308) wherein an Xn interface is defined between two or more (R)AN node 2308 (e.g., gNBs) that connecting to 5GC 410, between a (R)AN node 2308 (e.g., gNB) connecting to CN 2310 and an eNB (e.g., a macro RAN node), and/or between two eNBs connecting to CN 2310.

In at least one embodiment, Xn interface may include an Xn user plane (Xn-U) interface and an Xn control plane (Xn-C) interface. In at least one embodiment, Xn-U may provide non-guaranteed delivery of user plane PDUs and support/provide data forwarding and flow control functionality. In at least one embodiment, Xn-C may provide management and error handling functionality, functionality to manage a Xn-C inter face; mobility support for UE 2302 in a connected mode (e.g., CM-CONNECTED) including functionality to manage UE mobility for connected mode between one or more (R)AN node 2308. In at least one embodiment, mobility support may include context transfer from an old (source) serving (R)AN node 2308 to new (target) serving (R)AN node 2308; and control of user plane tunnels between old (source) serving (R)AN node 2308 to new (target) serving (R)AN node 2308.

In at least one embodiment, a protocol stack of a Xn-U may include a transport network layer built on Internet Protocol (IP) transport layer, and a GTP-U layer on top of a UDP and/or IP layer(s) to carry user plane PDUs. In at least one embodiment, Xn-C protocol stack may include an application layer signaling protocol (referred to as Xn Application Protocol (Xn-AP)) and a transport network layer that is built on an SCTP layer. In at least one embodiment, SCTP layer may be on top of an IP layer. In at least one embodiment, SCTP layer provides a guaranteed delivery of application layer messages. In at least one embodiment, in a transport IP layer point-to-point transmission is used to deliver signaling PDUs. In at least one embodiment, Xn-U protocol stack and/or a Xn-C protocol stack may be same or similar to an user plane and/or control plane protocol stack(s) shown and described herein.

In at least one embodiment, one or more systems depicted in FIG. 23 are utilized to generate and/or perform one or more software containers with various algorithms, formulas, and processes such as those described in connection with FIG. 1. In at least one embodiment, one or more systems depicted in FIG. 23 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 24:
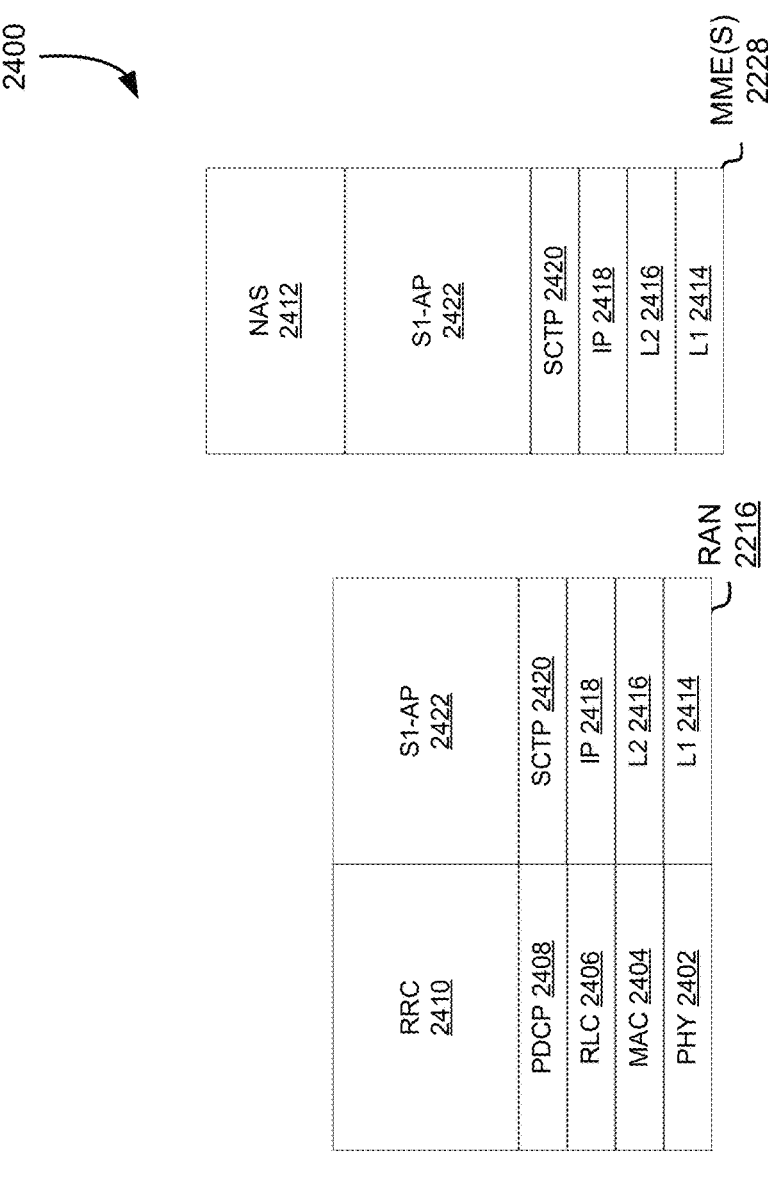
FIG. 24 illustrates a control plane protocol stack, in accordance with at least one embodiment.

FIG. 24 is an illustration of a control plane protocol stack in accordance with some embodiments. In at least one embodiment, a control plane 2400 is shown as a communications protocol stack between UE 2202 (or alternatively, UE 2204), RAN 2216, and MME(s) 2228.

In at least one embodiment, PHY layer 2402 may transmit or receive information used by MAC layer 2404 over one or more air interfaces. In at least one embodiment, PHY layer 2402 may further perform link adaptation or adaptive modulation and coding (AMC), power control, cell search (e.g., for initial synchronization and handover purposes), and other measurements used by higher layers, such as an RRC layer 2410. In at least one embodiment, PHY layer 2402 may still further perform error detection on transport channels, forward error correction (FEC) coding/de-coding of transport channels, modulation/demodulation of physical channels, interleaving, rate matching, mapping onto physical channels, and Multiple Input Multiple Output (MIMO) antenna processing.

In at least one embodiment, MAC layer 2404 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from PHY via transport channels, multiplexing MAC SDUs onto TBs, scheduling information reporting, error correction through hybrid automatic repeat request (HARD), and logical channel prioritization.

In at least one embodiment, RLC layer 2406 may operate in a plurality of modes of operation, including: Transparent Mode (TM), Unacknowledged Mode (UM), and Acknowledged Mode (AM). In at least one embodiment, RLC layer 2406 may execute transfer of upper layer protocol data units (PDUs), error correction through automatic repeat request (ARQ) for AM data transfers, and concatenation, segmentation and reassembly of RLC SDUs for UM and AM data transfers. In at least one embodiment, RLC layer 2406 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

In at least one embodiment, PDCP layer 2408 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

In at least one embodiment, main services and functions of a RRC layer 2410 may include broadcast of system information (e.g., included in Master Information Blocks (MIBs) or System Information Blocks (SIBs) related to a non-access stratum (NAS)), broadcast of system information related to an access stratum (AS), paging, establishment, maintenance and release of an RRC connection between an UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. In at least one embodiment, said MIBs and SIBs may comprise one or more information elements (IEs), which may each comprise individual data fields or data structures.

In at least one embodiment, UE 2202 and RAN 2216 may utilize a Uu interface (e.g., an LTE-Uu interface) to exchange control plane data via a protocol stack comprising PHY layer 2402, MAC layer 2404, RLC layer 2406, PDCP layer 2408, and RRC layer 2410.

In at least one embodiment, non-access stratum (NAS) protocols (NAS protocols 2412) form a highest stratum of a control plane between UE 2202 and MME(s) 2228. In at least one embodiment, NAS protocols 2412 support mobility of UE 2202 and session management procedures to establish and maintain IP connectivity between UE 2202 and P-GW 2234.

In at least one embodiment, Si Application Protocol (S1-AP) layer (Si-AP layer 2422) may support functions of a Si interface and comprise Elementary Procedures (EPs). In at least one embodiment, an EP is a unit of interaction between RAN 2216 and CN 2228. In at least one embodiment, S1-AP layer services may comprise two groups: UE-associated services and non UE-associated services. In at least one embodiment, these services perform functions including, but not limited to: E-UTRAN Radio Access Bearer (E-RAB) management, UE capability indication, mobility, NAS signaling transport, RAN Information Management (RIM), and configuration transfer.

In at least one embodiment, Stream Control Transmission Protocol (SCTP) layer (alternatively referred to as a stream control transmission protocol/internet protocol (SCTP/IP) layer) (SCTP layer 2420) may ensure reliable delivery of signaling messages between RAN 2216 and MME(s) 2228 based, in part, on an IP protocol, supported by an IP layer 2418. In at least one embodiment, L2 layer 2416 and an L1 layer 2414 may refer to communication links (e.g., wired or wireless) used by a RAN node and MME to exchange information.

In at least one embodiment, RAN 2216 and MME(s) 2228 may utilize an S1-MME interface to exchange control plane data via a protocol stack comprising a L1 layer 2414, L2 layer 2416, IP layer 2418, SCTP layer 2420, and Si-AP layer 2422.

In at least one embodiment, one or more systems depicted in FIG. 24 are utilized to generate and/or perform one or more software containers with various algorithms, formulas, and processes such as those described in connection with FIG. 1. In at least one embodiment, one or more systems depicted in FIG. 24 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 25:
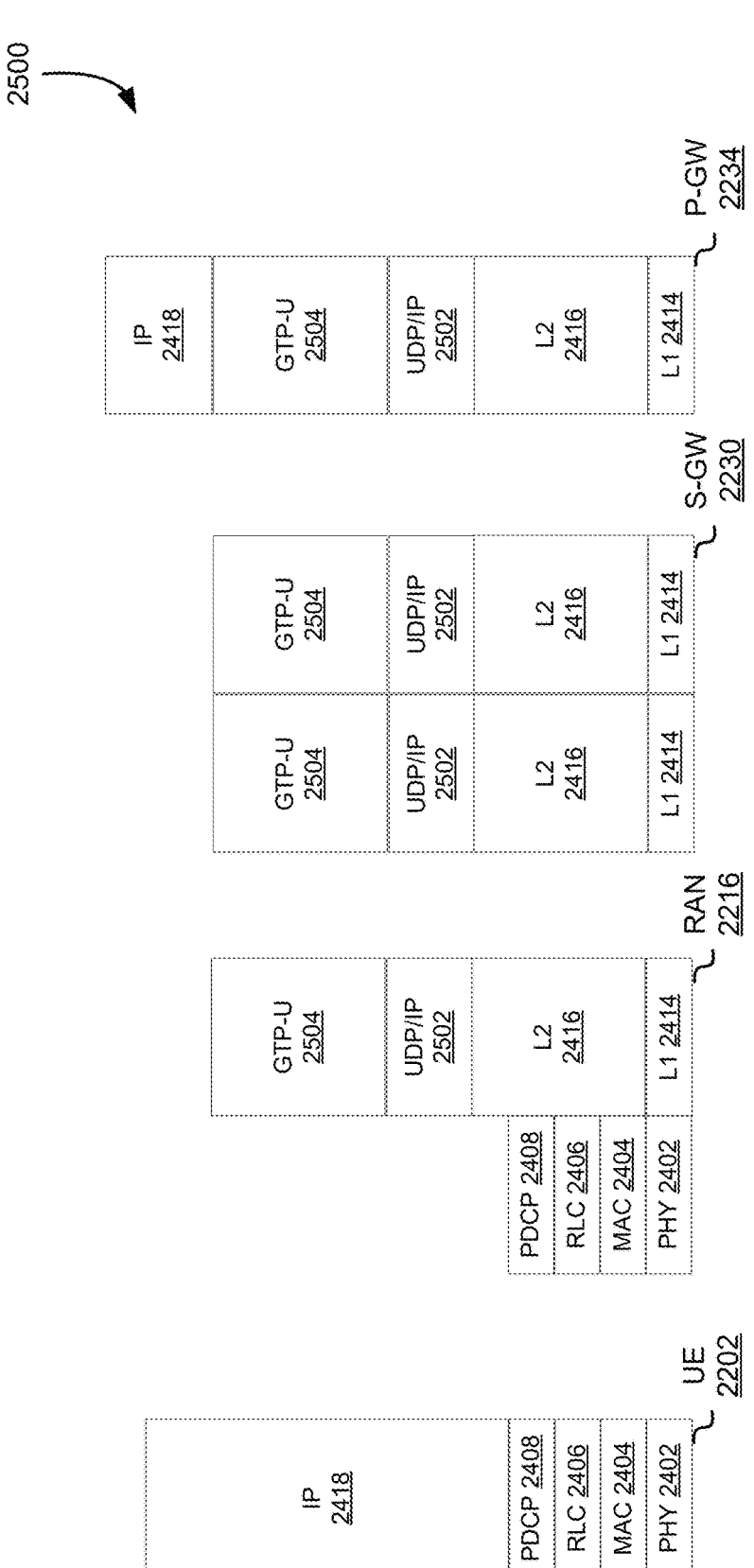
FIG. 25 illustrates a user plane protocol stack, in accordance with at least one embodiment.

FIG. 25 is an illustration of a user plane protocol stack in accordance with at least one embodiment. In at least one embodiment, a user plane 2500 is shown as a communications protocol stack between a UE 2202, RAN 2216, S-GW 2230, and P-GW 2234. In at least one embodiment, user plane 2500 may utilize a same protocol layers as control plane 2400. In at least one embodiment, for example, UE 2202 and RAN 2216 may utilize a Uu interface (e.g., an LTE-Uu interface) to exchange user plane data via a protocol stack comprising PHY layer 2402, MAC layer 2404, RLC layer 2406, PDCP layer 2408.

In at least one embodiment, General Packet Radio Service (GPRS) Tunneling Protocol for a user plane (GTP-U) layer (GTP-U layer 2504) may be used for carrying user data within a GPRS core network and between a radio access network and a core network. In at least one embodiment, user data transported can be packets in any of IPV4, IPV6, or PPP formats, for example. In at least one embodiment, UDP and IP security (UDP/IP) layer (UDP/IP layer 2502) may provide checksums for data integrity, port numbers for addressing different functions at a source and destination, and encryption and authentication on selected data flows. In at least one embodiment, RAN 2216 and S-GW 2230 may utilize an S1-U interface to exchange user plane data via a protocol stack comprising L1 layer 2414, L2 layer 2416, UDP/IP layer 2502, and GTP-U layer 2504. In at least one embodiment, S-GW 2230 and P-GW 2234 may utilize an S5/S8a interface to exchange user plane data via a protocol stack comprising L1 layer 2414, L2 layer 2416, UDP/IP layer 2502, and GTP-U layer 2504. In at least one embodiment, as discussed above with respect to FIG. 24, NAS protocols support a mobility of UE 2202 and session management procedures to establish and maintain IP connectivity between UE 2202 and P-GW 2234.

In at least one embodiment, one or more systems depicted in FIG. 25 are utilized to generate and/or perform one or more software containers with various algorithms, formulas, and processes such as those described in connection with FIG. 1. In at least one embodiment, one or more systems depicted in FIG. 25 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

FIG. 26 illustrates components 2600 of a core network in accordance with at least one embodiment. In at least one embodiment, components of CN 2238 may be implemented in one physical node or separate physical nodes including components to read and execute instructions from a machine-readable or computer-readable medium (e.g., a non-transitory machine-readable storage medium). In at least one embodiment, Network Functions Virtualization (NFV) is utilized to virtualize any or all of above described network node functions via executable instructions stored in one or more computer readable storage mediums (described in further detail below). In at least one embodiment, a logical instantiation of CN 2238 may be referred to as a network slice 2602 (e.g., network slice 2602 is shown to include HSS 2232, MME(s) 2228, and S-GW 2230). In at least one embodiment, a logical instantiation of a portion of CN 2238 may be referred to as a network sub-slice 2604 (e.g., network sub-slice 2604 is shown to include P-GW 2234 and PCRF 2236).

In at least one embodiment, NFV architectures and infrastructures may be used to virtualize one or more network functions, alternatively performed by proprietary hardware, onto physical resources comprising a combination of industry-standard server hardware, storage hardware, or switches. In at least one embodiment, NFV systems can be used to execute virtual or reconfigurable implementations of one or more EPC components/functions.

In at least one embodiment, one or more systems depicted in FIG. 26 are utilized to generate and/or perform one or more software containers with various algorithms, formulas, and processes such as those described in connection with FIG. 1. In at least one embodiment, one or more systems depicted in FIG. 26 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

FIG. 27 is a block diagram illustrating components, according to at least one embodiment, of a system 2700 to support network function virtualization (NFV). In at least one embodiment, system 2700 is illustrated as including a virtualized infrastructure manager (shown as VIM 2702), a network function virtualization infrastructure (shown as NFVI 2704), a VNF manager (shown as VNFM 2706), virtualized network functions (shown as VNF 2708), an element manager (shown as EM 2710), an NFV Orchestrator (shown as NFVO 2712), and a network manager (shown as NM 2714).

In at least one embodiment, VIM 2702 manages resources of NFVI 2704. In at least one embodiment, NFVI 2704 can include physical or virtual resources and applications (including hypervisors) used to execute system 2700. In at least one embodiment, VIM 2702 may manage a life cycle of virtual resources with NFVI 2704 (e.g., creation, maintenance, and tear down of virtual machines (VMs) associated with one or more physical resources), track VM instances, track performance, fault and security of VM instances and associated physical resources, and expose VM instances and associated physical resources to other management systems.

In at least one embodiment, VNFM 2706 may manage VNF 2708. In at least one embodiment, VNF 2708 may be used to execute EPC components/functions. In at least one embodiment, VNFM 2706 may manage a life cycle of VNF 2708 and track performance, fault and security of virtual aspects of VNF 2708. In at least one embodiment, EM 2710 may track performance, fault and security of functional aspects of VNF 2708. In at least one embodiment, tracking data from VNFM 2706 and EM 2710 may comprise, for example, performance measurement (PM) data used by VIM 2702 or NFVI 2704. In at least one embodiment, both VNFM 2706 and EM 2710 can scale up/down a quantity of VNFs of system 2700.

In at least one embodiment, NFVO 2712 may coordinate, authorize, release and engage resources of NFVI 2704 in order to provide a requested service (e.g., to execute an EPC function, component, or slice). In at least one embodiment, NM 2714 may provide a package of end-user functions with responsibility for a management of a network, which may include network elements with VNFs, non-virtualized network functions, or both (management of VNFs may occur via an EM 2710).

In at least one embodiment, one or more systems depicted in FIG. 27 are utilized to generate and/or perform one or more software containers with various algorithms, formulas, and processes such as those described in connection with FIG. 1. In at least one embodiment, one or more systems depicted in FIG. 27 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Computer-Based Systems

The following figures set forth, without limitation, exemplary computer-based systems that can be used to implement at least one embodiment.

Figure 28:
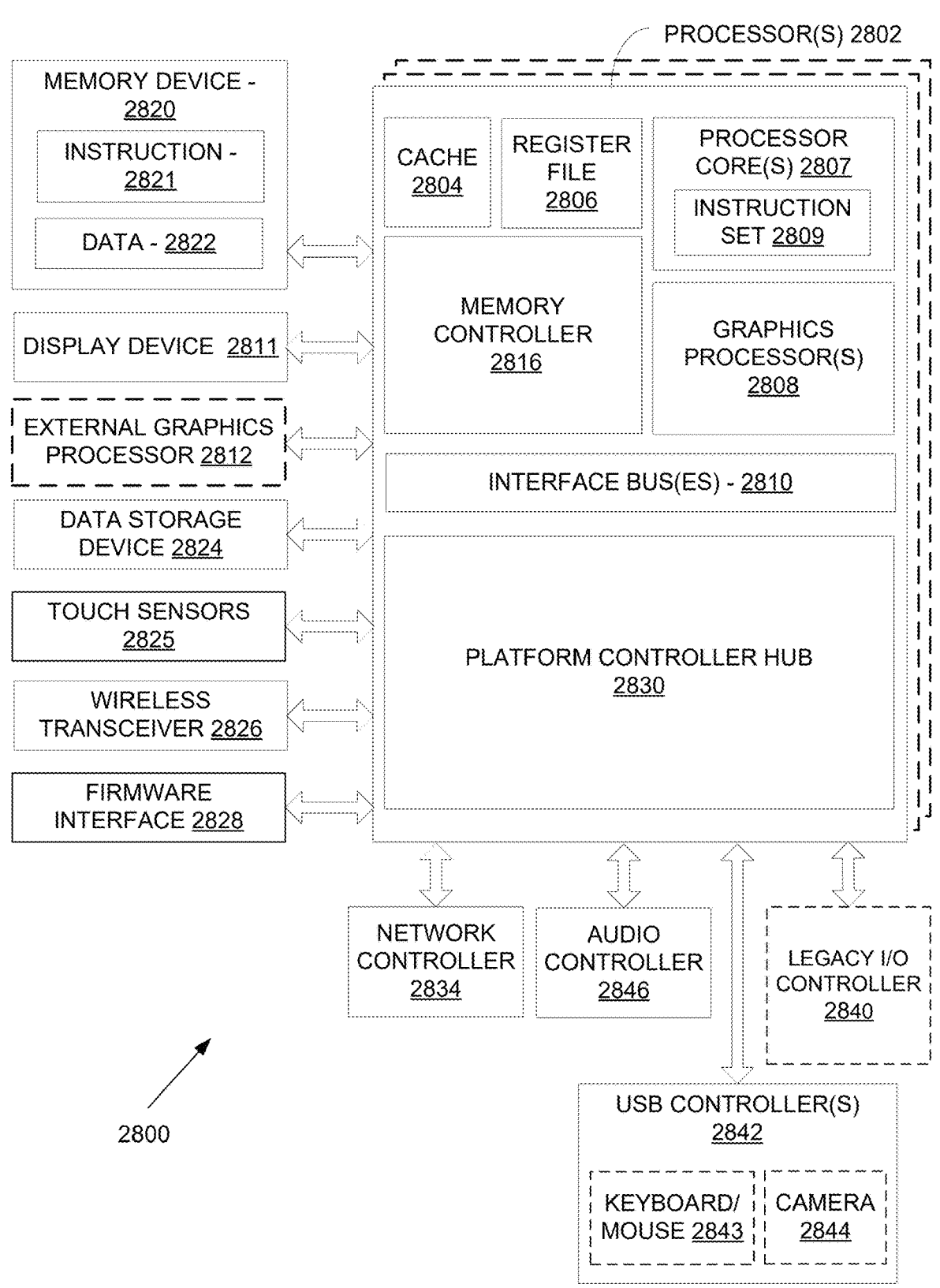
FIG. 28 illustrates a processing system, in accordance with at least one embodiment.

FIG. 28 illustrates a processing system 2800, in accordance with at least one embodiment. In at least one embodiment, processing system 2800 includes one or more processors 2802 and one or more graphics processors 2808, and may be a single processor desktop system, a multiprocessor workstation system, or a server system having a large number of processors 2802 or processor cores 2807. In at least one embodiment, processing system 2800 is a processing platform incorporated within a system-on-a-chip ("SoC") integrated circuit for use in mobile, handheld, or embedded devices.

In at least one embodiment, processing system 2800 can include, or be incorporated within a server-based gaming platform, a game console, a media console, a mobile gaming console, a handheld game console, or an online game console. In at least one embodiment, processing system 2800 is a mobile phone, smart phone, tablet computing device or mobile Internet device. In at least one embodiment, processing system 2800 can also include, couple with, or be integrated within a wearable device, such as a smart watch wearable device, smart eyewear device, augmented reality device, or virtual reality device. In at least one embodiment, processing system 2800 is a television or set top box device having one or more processors 2802 and a graphical interface generated by one or more graphics processors 2808.

In at least one embodiment, one or more processors 2802 each include one or more processor cores 2807 to process instructions which, when executed, perform operations for system and user software. In at least one embodiment, each of one or more processor cores 2807 is configured to process a specific instruction set 2809. In at least one embodiment, instruction set 2809 may facilitate Complex Instruction Set Computing ("CISC"), Reduced Instruction Set Computing ("RISC"), or computing via a Very Long Instruction Word ("VLIW"). In at least one embodiment, processor cores 2807 may each process a different instruction set 2809, which may include instructions to facilitate emulation of other instruction sets. In at least one embodiment, processor core 2807 may also include other processing devices, such as a digital signal processor ("DSP").

In at least one embodiment, processor 2802 includes cache memory ('cache") 2804. In at least one embodiment, processor 2802 can have a single internal cache or multiple levels of internal cache. In at least one embodiment, cache memory is shared among various components of processor 2802. In at least one embodiment, processor 2802 also uses an external cache (e.g., a Level 3 ("L3") cache or Last Level Cache ("LLC")) (not shown), which may be shared among processor cores 2807 using known cache coherency techniques. In at least one embodiment, register file 2806 is additionally included in processor 2802 which may include different types of registers for storing different types of data (e.g., integer registers, floating point registers, status registers, and an instruction pointer register). In at least one embodiment, register file 2806 may include general-purpose registers or other registers.

In at least one embodiment, one or more processor(s) 2802 are coupled with one or more interface bus(es) 2810 to transmit communication signals such as address, data, or control signals between processor 2802 and other components in processing system 2800. In at least one embodiment interface bus 2810, in one embodiment, can be a processor bus, such as a version of a Direct Media Interface ("DMI") bus. In at least one embodiment, interface bus 2810 is not limited to a DMI bus, and may include one or more Peripheral Component Interconnect buses (e.g., "PCI," PCI Express ("PCIe")), memory buses, or other types of interface buses. In at least one embodiment processor(s) 2802 include an integrated memory controller 2816 and a platform controller hub 2830. In at least one embodiment, memory controller 2816 facilitates communication between a memory device and other components of processing system 2800, while platform controller hub ("PCH") 2830 provides connections to Input/Output ("I/O") devices via a local I/O bus.

In at least one embodiment, memory device 2820 can be a dynamic random access memory ("DRAM") device, a static random access memory ("SRAM") device, flash memory device, phase-change memory device, or some other memory device having suitable performance to serve as processor memory. In at least one embodiment memory device 2820 can operate as system memory for processing system 2800, to store data 2822 and instructions 2821 for use when one or more processors 2802 executes an application or process. In at least one embodiment, memory controller 2816 also couples with an optional external graphics processor 2812, which may communicate with one or more graphics processors 2808 in processors 2802 to perform graphics and media operations. In at least one embodiment, a display device 2811 can connect to processor(s) 2802. In at least one embodiment display device 2811 can include one or more of an internal display device, as in a mobile electronic device or a laptop device or an external display device attached via a display interface (e.g., DisplayPort, etc.). In at least one embodiment, display device 2811 can include a head mounted display ("HMD") such as a stereoscopic display device for use in virtual reality ("VR") applications or augmented reality ("AR") applications.

In at least one embodiment, platform controller hub 2830 enables peripherals to connect to memory device 2820 and processor 2802 via a high-speed I/O bus. In at least one embodiment, I/O peripherals include, but are not limited to, an audio controller 2846, a network controller 2834, a firmware interface 2828, a wireless transceiver 2826, touch sensors 2825, a data storage device 2824 (e.g., hard disk drive, flash memory, etc.). In at least one embodiment, data storage device 2824 can connect via a storage interface (e.g., SATA) or via a peripheral bus, such as PCI, or PCIe. In at least one embodiment, touch sensors 2825 can include touch screen sensors, pressure sensors, or fingerprint sensors. In at least one embodiment, wireless transceiver 2826 can be a Wi-Fi transceiver, a Bluetooth transceiver, or a mobile network transceiver such as a 3G, 4G, or Long Term Evolution ("LTE") transceiver. In at least one embodiment, firmware interface 2828 enables communication with system firmware, and can be, for example, a unified extensible firmware interface ("UEFI"). In at least one embodiment, network controller 2834 can enable a network connection to a wired network. In at least one embodiment, a high-performance network controller (not shown) couples with interface bus 2810. In at least one embodiment, audio controller 2846 is a multi-channel high definition audio controller. In at least one embodiment, processing system 2800 includes an optional legacy I/O controller 2840 for coupling legacy (e.g., Personal System 2 ("PS/2")) devices to processing system 2800. In at least one embodiment, platform controller hub 2830 can also connect to one or more Universal Serial Bus ("USB") controllers 2842 connect input devices, such as keyboard and mouse 2843 combinations, a camera 2844, or other USB input devices.

In at least one embodiment, an instance of memory controller 2816 and platform controller hub 2830 may be integrated into a discreet external graphics processor, such as external graphics processor 2812. In at least one embodiment, platform controller hub 2830 and/or memory controller 2816 may be external to one or more processor(s) 2802. For example, in at least one embodiment, processing system 2800 can include an external memory controller 2816 and platform controller hub 2830, which may be configured as a memory controller hub and peripheral controller hub within a system chipset that is in communication with processor(s) 2802.

In at least one embodiment, one or more systems depicted in FIG. 28 are utilized to generate and/or perform one or more software containers with various algorithms, formulas, and processes such as those described in connection with FIG. 1. In at least one embodiment, one or more systems depicted in FIG. 28 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 29:
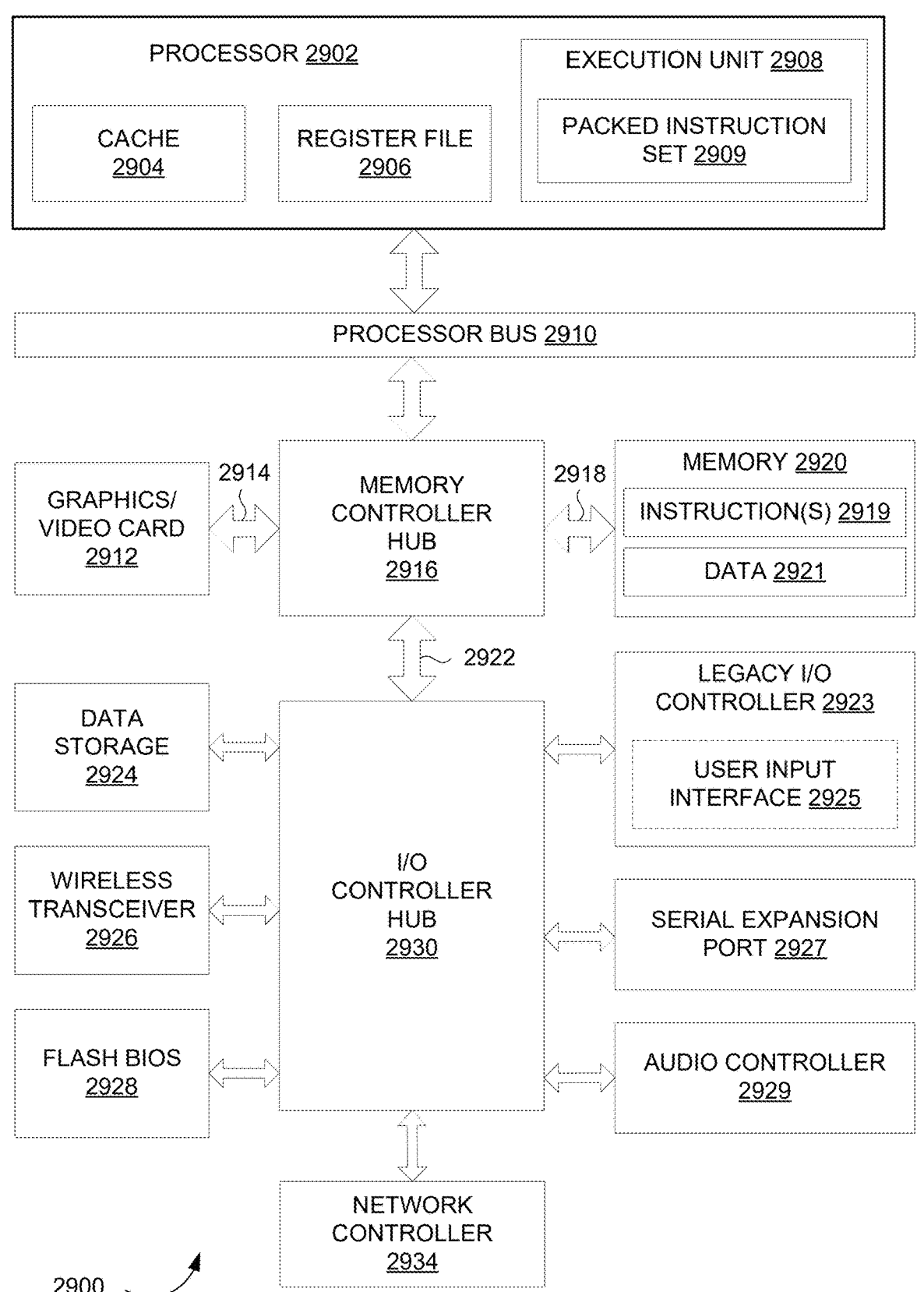
FIG. 29 illustrates a computer system, in accordance with at least one embodiment.

FIG. 29 illustrates a computer system 2900, in accordance with at least one embodiment. In at least one embodiment, computer system 2900 may be a system with interconnected devices and components, an SOC, or some combination. In at least on embodiment, computer system 2900 is formed with a processor 2902 that may include execution units to execute an instruction. In at least one embodiment, computer system 2900 may include, without limitation, a component, such as processor 2902 to employ execution units including logic to perform algorithms for processing data. In at least one embodiment, computer system 2900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 2900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 2900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), an SoC, network computers ("NetPCs"), set-top boxes, network hubs, wide area network ("WAN") switches, or any other system that may perform one or more instructions.

In at least one embodiment, computer system 2900 may include, without limitation, processor 2902 that may include, without limitation, one or more execution units 2908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 2900 is a single processor desktop or server system. In at least one embodiment, computer system 2900 may be a multiprocessor system. In at least one embodiment, processor 2902 may include, without limitation, a CISC microprocessor, a RISC microprocessor, a VLIW microprocessor, a processor implementing a combination of instruction sets, or any other processor device, such as a digital signal processor, for example. In at least one embodiment, processor 2902 may be coupled to a processor bus 2910 that may transmit data signals between processor 2902 and other components in computer system 2900.

In at least one embodiment, processor 2902 may include, without limitation, a Level 1 ("L1") internal cache memory ("cache") 2904. In at least one embodiment, processor 2902 may have a single internal cache or multiple levels of internal cache. In at least one embodiment, cache memory may reside external to processor 2902. In at least one embodiment, processor 2902 may also include a combination of both internal and external caches. In at least one embodiment, a register file 2906 may store different types of data in various registers including, without limitation, integer registers, floating point registers, status registers, and instruction pointer register.

In at least one embodiment, execution unit 2908, including, without limitation, logic to perform integer and floating point operations, also resides in processor 2902. Processor 2902 may also include a microcode ("ucode") read only memory ("ROM") that stores microcode for certain macro instructions. In at least one embodiment, execution unit 2908 may include logic to handle a packed instruction set 2909. In at least one embodiment, by including packed instruction set 2909 in an instruction set of a general-purpose processor 2902, along with associated circuitry to execute instructions, operations used by many multimedia applications may be performed using packed data in a general-purpose processor 2902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 2908 may also be used in microcontrollers, embedded processors, graphics devices, DSPs, and other types of logic circuits. In at least one embodiment, computer system 2900 may include, without limitation, a memory 2920. In at least one embodiment, memory 2920 may be implemented as a DRAM device, an SRAM device, flash memory device, or other memory device. Memory 2920 may store instruction(s) 2919 and/or data 2921 represented by data signals that may be executed by processor 2902.

In at least one embodiment, a system logic chip may be coupled to processor bus 2910 and memory 2920. In at least one embodiment, a system logic chip may include, without limitation, a memory controller hub ("MCH") 2916, and processor 2902 may communicate with MCH 2916 via processor bus 2910. In at least one embodiment, MCH 2916 may provide a high bandwidth memory path 2918 to memory 2920 for instruction and data storage and for storage of graphics commands, data and textures. In at least one embodiment, MCH 2916 may direct data signals between processor 2902, memory 2920, and other components in computer system 2900 and to bridge data signals between processor bus 2910, memory 2920, and a system I/O 2922. In at least one embodiment, system logic chip may provide a graphics port for coupling to a graphics controller. In at least one embodiment, MCH 2916 may be coupled to memory 2920 through high bandwidth memory path 2918 and graphics/video card 2912 may be coupled to MCH 2916 through an Accelerated Graphics Port ("AGP") interconnect 2914.

In at least one embodiment, computer system 2900 may use system I/O 2922 that is a proprietary hub interface bus to couple MCH 2916 to I/O controller hub ("ICH") 2930. In at least one embodiment, ICH 2930 may provide direct connections to some I/O devices via a local I/O bus. In at least one embodiment, local I/O bus may include, without limitation, a high-speed I/O bus for connecting peripherals to memory 2920, a chipset, and processor 2902. Examples may include, without limitation, an audio controller 2929, a firmware hub ("flash BIOS") 2928, a wireless transceiver 2926, a data storage 2924, a legacy I/O controller 2923 containing a user input interface 2925 and a keyboard interface, a serial expansion port 2927, such as a USB, and a network controller 2934. Data storage 2924 may comprise a hard disk drive, a floppy disk drive, a CD-ROM device, a flash memory device, or other mass storage device.

In at least one embodiment, FIG. 29 illustrates a system, which includes interconnected hardware devices or "chips." In at least one embodiment, FIG. 29 may illustrate an exemplary SoC. In at least one embodiment, devices illustrated in FIG. 29 may be interconnected with proprietary interconnects, standardized interconnects (e.g., PCIe), or some combination thereof. In at least one embodiment, one or more components of system 2900 are interconnected using compute express link ("CXL") interconnects.

In at least one embodiment, one or more systems depicted in FIG. 29 are utilized to generate and/or perform one or more software containers with various algorithms, formulas, and processes such as those described in connection with FIG. 1. In at least one embodiment, one or more systems depicted in FIG. 29 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 30:
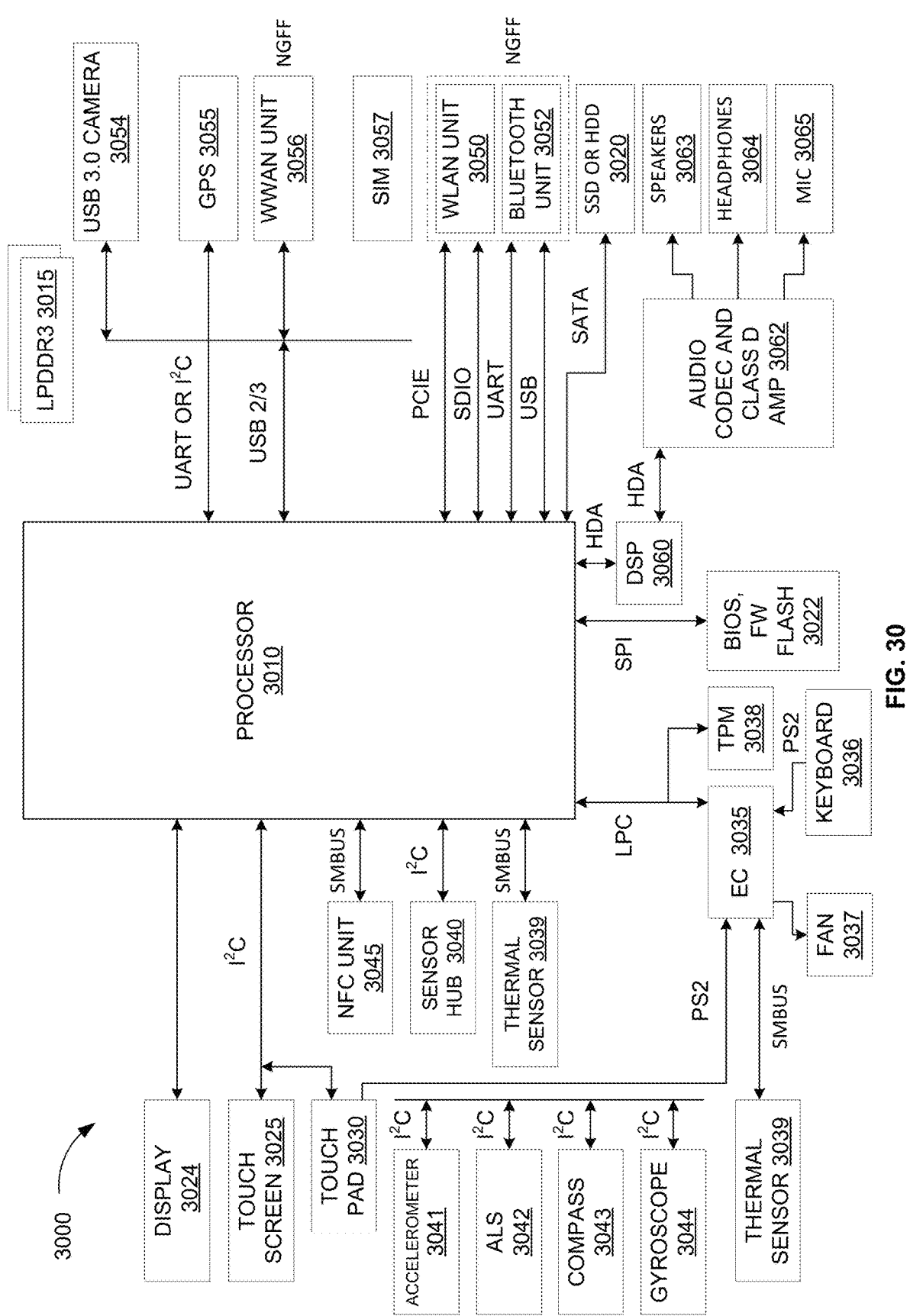
FIG. 30 illustrates a system, in accordance with at least one embodiment.

FIG. 30 illustrates a system 3000, in accordance with at least one embodiment. In at least one embodiment, system 3000 is an electronic device that utilizes a processor 3010. In at least one embodiment, system 3000 may be, for example and without limitation, a notebook, a tower server, a rack server, a blade server, a laptop, a desktop, a tablet, a mobile device, a phone, an embedded computer, or any other suitable electronic device.

In at least one embodiment, system 3000 may include, without limitation, processor 3010 communicatively coupled to any suitable number or kind of components, peripherals, modules, or devices. In at least one embodiment, processor 3010 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 30 illustrates a system which includes interconnected hardware devices or "chips." In at least one embodiment, FIG. 30 may illustrate an exemplary SoC. In at least one embodiment, devices illustrated in FIG. 30 may be interconnected with proprietary interconnects, standardized interconnects (e.g., PCIe) or some combination thereof. In at least one embodiment, one or more components of FIG. 30 are interconnected using CXL interconnects.

In at least one embodiment, FIG. 30 may include a display 3024, a touch screen 3025, a touch pad 3030, a Near Field Communications unit ("NFC") 3045, a sensor hub 3040, a thermal sensor 3046, an Express Chipset ("EC") 3035, a Trusted Platform Module ("TPM") 3038, BIOS/firmware/flash memory ("BIOS, FW Flash") 3022, a DSP 3060, a Solid State Disk ("SSD") or Hard Disk Drive ("HDD") 3020, a wireless local area network unit ("WLAN") 3050, a Bluetooth unit 3052, a Wireless Wide Area Network unit ("WWAN") 3056, a Global Positioning System ("GPS") 3055, a camera ("USB 3.0 camera") 3054 such as a USB 3.0 camera, or a Low Power Double Data Rate ("LPDDR") memory unit ("LPDDR3") 3015 implemented in, for example, LPDDR3 standard. These components may each be implemented in any suitable manner.

In at least one embodiment, other components may be communicatively coupled to processor 3010 through components discussed above. In at least one embodiment, an accelerometer 3041, an Ambient Light Sensor ("ALS") 3042, a compass 3043, and a gyroscope 3044 may be communicatively coupled to sensor hub 3040. In at least one embodiment, a thermal sensor 3039, a fan 3037, a keyboard 3046, and a touch pad 3030 may be communicatively coupled to EC 3035. In at least one embodiment, a speaker 3063, a headphones 3064, and a microphone ("mic") 3065 may be communicatively coupled to an audio unit ("audio codec and class d amp") 3064, which may in turn be communicatively coupled to DSP 3060. In at least one embodiment, audio unit 3064 may include, for example and without limitation, an audio coder/decoder ("codec") and a class D amplifier. In at least one embodiment, a SIM card ("SIM") 3057 may be communicatively coupled to WWAN unit 3056. In at least one embodiment, components such as WLAN unit 3050 and Bluetooth unit 3052, as well as WWAN unit 3056 may be implemented in a Next Generation Form Factor ("NGFF").

In at least one embodiment, one or more systems depicted in FIG. 30 are utilized to generate and/or perform one or more software containers with various algorithms, formulas, and processes such as those described in connection with FIG. 1. In at least one embodiment, one or more systems depicted in FIG. 30 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 31:
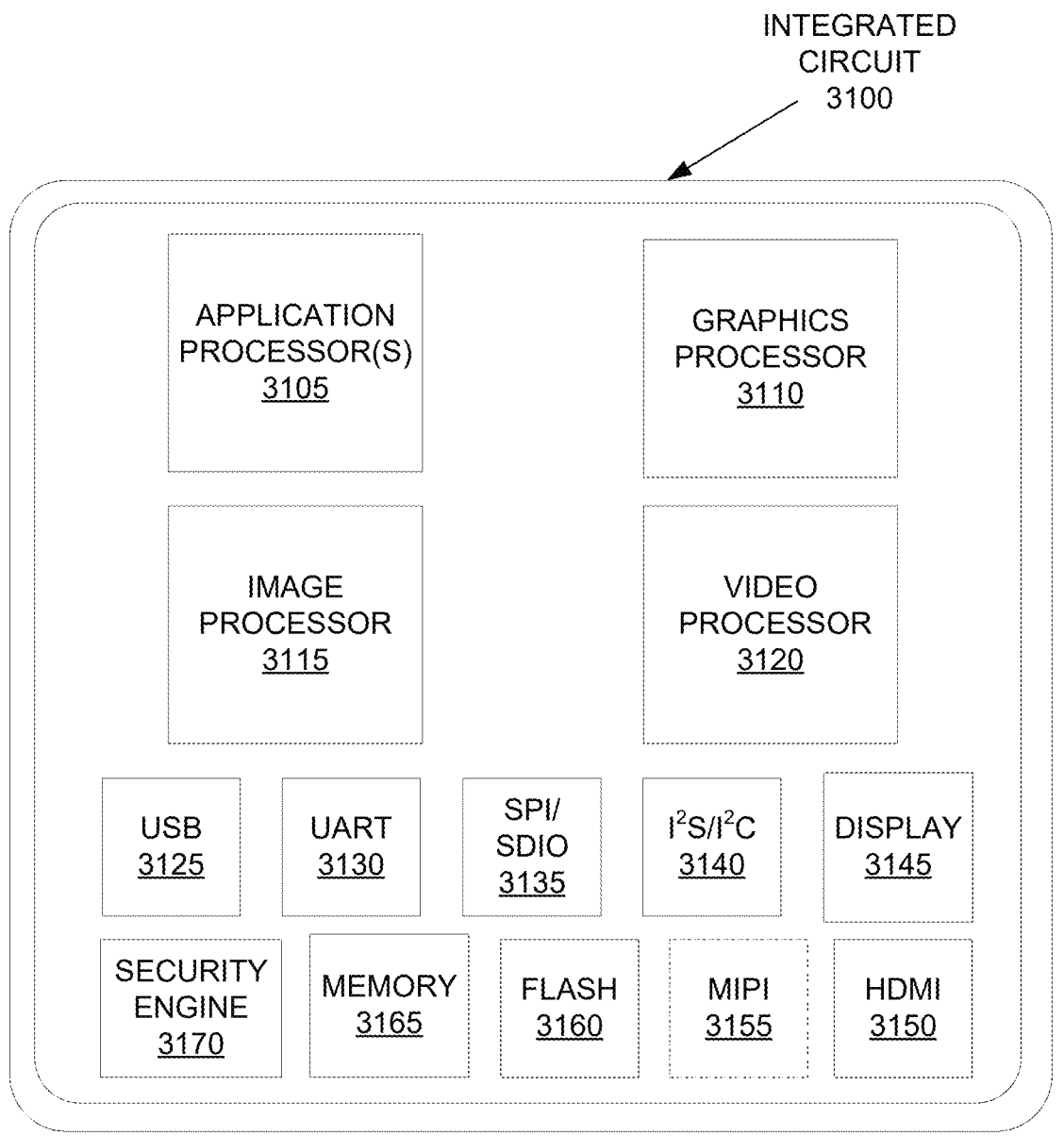
FIG. 31 illustrates an exemplary integrated circuit, in accordance with at least one embodiment.

FIG. 31 illustrates an exemplary integrated circuit 3100, in accordance with at least one embodiment. In at least one embodiment, exemplary integrated circuit 3100 is an SoC that may be fabricated using one or more IP cores. In at least one embodiment, integrated circuit 3100 includes one or more application processor(s) 3105 (e.g., CPUs), at least one graphics processor 3110, and may additionally include an image processor 3115 and/or a video processor 3120, any of which may be a modular IP core. In at least one embodiment, integrated circuit 3100 includes peripheral or bus logic including a USB controller 3125, a UART controller 3130, an SPI/SDIO controller 3135, and an I²S/I²C controller 3140. In at least one embodiment, integrated circuit 3100 can include a display device 3145 coupled to one or more of a high-definition multimedia interface ("HDMI") controller 3150 and a mobile industry processor interface ("MIPI") display interface 3155. In at least one embodiment, storage may be provided by a flash memory subsystem 3160 including flash memory and a flash memory controller. In at least one embodiment, a memory interface may be provided via a memory controller 3165 for access to SDRAM or SRAM memory devices. In at least one embodiment, some integrated circuits additionally include an embedded security engine 3170.

In at least one embodiment, one or more systems depicted in FIG. 31 are utilized to generate and/or perform one or more software containers with various algorithms, formulas, and processes such as those described in connection with FIG. 1. In at least one embodiment, one or more systems depicted in FIG. 31 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 32:
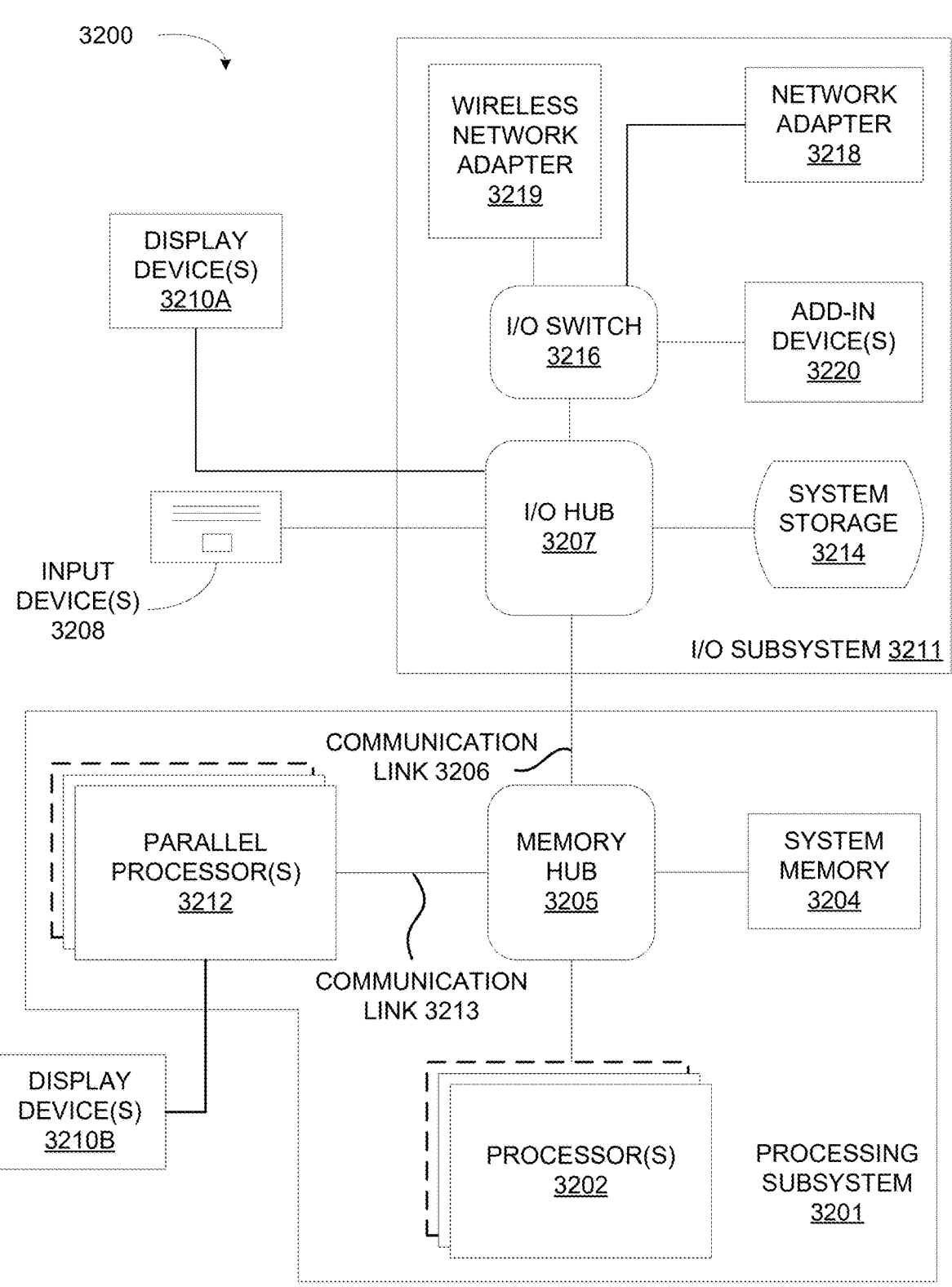
FIG. 32 illustrates a computing system, according to at least one embodiment.

FIG. 32 illustrates a computing system 3200, according to at least one embodiment; In at least one embodiment, computing system 3200 includes a processing subsystem 3201 having one or more processor(s) 3202 and a system memory 3204 communicating via an interconnection path that may include a memory hub 3205. In at least one embodiment, memory hub 3205 may be a separate component within a chipset component or may be integrated within one or more processor(s) 3202. In at least one embodiment, memory hub 3205 couples with an I/O subsystem 3211 via a communication link 3206. In at least one embodiment, I/O subsystem 3211 includes an I/O hub 3207 that can enable computing system 3200 to receive input from one or more input device(s) 3208. In at least one embodiment, I/O hub 3207 can enable a display controller, which may be included in one or more processor(s) 3202, to provide outputs to one or more display device(s) 3210A. In at least one embodiment, one or more display device(s) 3210A coupled with I/O hub 3207 can include a local, internal, or embedded display device.

In at least one embodiment, processing subsystem 3201 includes one or more parallel processor(s) 3212 coupled to memory hub 3205 via a bus or other communication link 3213. In at least one embodiment, communication link 3213 may be one of any number of standards based communication link technologies or protocols, such as, but not limited to PCIe, or may be a vendor specific communications interface or communications fabric. In at least one embodiment, one or more parallel processor(s) 3212 form a computationally focused parallel or vector processing system that can include a large number of processing cores and/or processing clusters, such as a many integrated core processor. In at least one embodiment, one or more parallel processor(s) 3212 form a graphics processing subsystem that can output pixels to one of one or more display device(s) 3210A coupled via I/O Hub 3207. In at least one embodiment, one or more parallel processor(s) 3212 can also include a display controller and display interface (not shown) to enable a direct connection to one or more display device(s) 3210B.

In at least one embodiment, a system storage unit 3214 can connect to I/O hub 3207 to provide a storage mechanism for computing system 3200. In at least one embodiment, an I/O switch 3216 can be used to provide an interface mechanism to enable connections between I/O hub 3207 and other components, such as a network adapter 3218 and/or wireless network adapter 3219 that may be integrated into a platform, and various other devices that can be added via one or more add-in device(s) 3220. In at least one embodiment, network adapter 3218 can be an Ethernet adapter or another wired network adapter. In at least one embodiment, wireless network adapter 3219 can include one or more of a Wi-Fi, Bluetooth, NFC, or other network device that includes one or more wireless radios.

In at least one embodiment, computing system 3200 can include other components not explicitly shown, including USB or other port connections, optical storage drives, video capture devices, and/or variations thereof, that may also be connected to I/O hub 3207. In at least one embodiment, communication paths interconnecting various components in FIG. 32 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 3212 incorporate circuitry optimized for graphics and video processing, including, for example, video output circuitry, and constitutes a graphics processing unit ("GPU"). In at least one embodiment, one or more parallel processor(s) 3212 incorporate circuitry optimized for general purpose processing. In at least embodiment, components of computing system 3200 may be integrated with one or more other system elements on a single integrated circuit. For example, in at least one embodiment, one or more parallel processor(s) 3212, memory hub 3205, processor(s) 3202, and I/O hub 3207 can be integrated into a SoC integrated circuit. In at least one embodiment, components of computing system 3200 can be integrated into a single package to form a system in package ("SIP") configuration. In at least one embodiment, at least a portion of components of computing system 3200 can be integrated into a multi-chip module ("MCM"), which can be interconnected with other multi-chip modules into a modular computing system. In at least one embodiment, I/O subsystem 3211 and display devices 3210B are omitted from computing system 3200.

In at least one embodiment, one or more systems depicted in FIG. 32 are utilized to generate and/or perform one or more software containers with various algorithms, formulas, and processes such as those described in connection with FIG. 1. In at least one embodiment, one or more systems depicted in FIG. 32 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Processing Systems

The following figures set forth, without limitation, exemplary processing systems that can be used to implement at least one embodiment.

Figure 33:
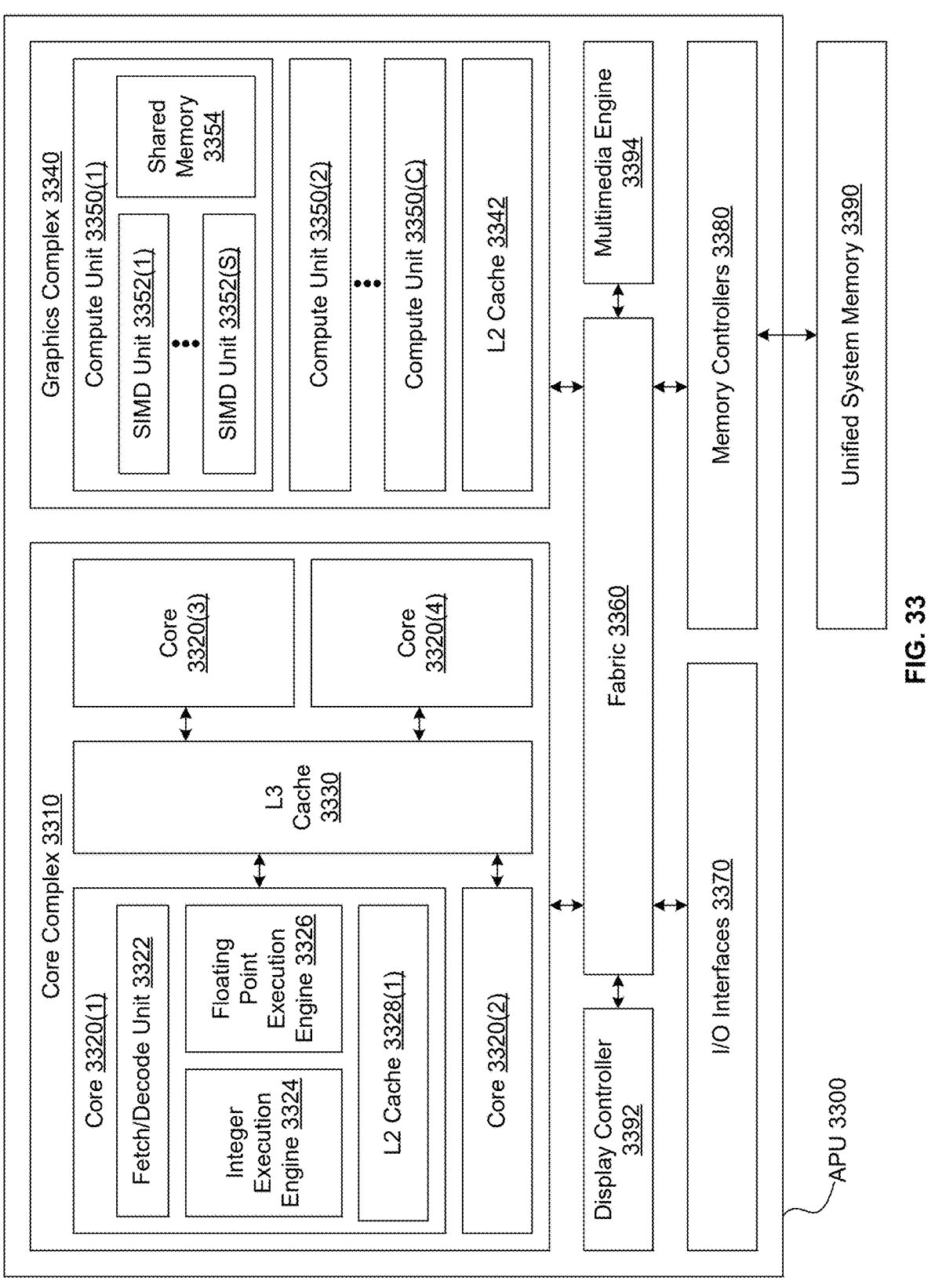
FIG. 33 illustrates an APU, in accordance with at least one embodiment.

FIG. 33 illustrates an accelerated processing unit ("APU") 3300, in accordance with at least one embodiment. In at least one embodiment, APU 3300 is developed by AMD Corporation of Santa Clara, CA. In at least one embodiment, APU 3300 can be configured to execute an application program, such as a CUDA program. In at least one embodiment, APU 3300 includes, without limitation, a core complex 3310, a graphics complex 3340, fabric 3360, I/O interfaces 3370, memory controllers 3380, a display controller 3392, and a multimedia engine 3394. In at least one embodiment, APU 3300 may include, without limitation, any number of core complexes 3310, any number of graphics complexes 3340, any number of display controllers 3392, and any number of multimedia engines 3394 in any combination. For explanatory purposes, multiple instances of like objects are denoted herein with reference numbers identifying an object and parenthetical numbers identifying an instance where needed.

In at least one embodiment, core complex 3310 is a CPU, graphics complex 3340 is a GPU, and APU 3300 is a processing unit that integrates, without limitation, 3310 and 3340 onto a single chip. In at least one embodiment, some tasks may be assigned to core complex 3310 and other tasks may be assigned to graphics complex 3340. In at least one embodiment, core complex 3310 is configured to execute main control software associated with APU 3300, such as an operating system. In at least one embodiment, core complex 3310 is a master processor of APU 3300, controlling and coordinating operations of other processors. In at least one embodiment, core complex 3310 issues commands that control an operation of graphics complex 3340. In at least one embodiment, core complex 3310 can be configured to execute host executable code derived from CUDA source code, and graphics complex 3340 can be configured to execute device executable code derived from CUDA source code.

In at least one embodiment, core complex 3310 includes, without limitation, cores 3320(1)-3320(4) and an L3 cache 3330. In at least one embodiment, core complex 3310 may include, without limitation, any number of cores 3320 and any number and type of caches in any combination. In at least one embodiment, cores 3320 are configured to execute instructions of a particular instruction set architecture ("ISA"). In at least one embodiment, each core 3320 is a CPU core.

In at least one embodiment, each core 3320 includes, without limitation, a fetch/decode unit 3322, an integer execution engine 3324, a floating point execution engine 3326, and an L2 cache 3328. In at least one embodiment, fetch/decode unit 3322 fetches instructions, decodes such instructions, generates micro-operations, and dispatches separate micro-instructions to integer execution engine 3324 and floating point execution engine 3326. In at least one embodiment, fetch/decode unit 3322 can concurrently dispatch one micro-instruction to integer execution engine 3324 and another micro-instruction to floating point execution engine 3326. In at least one embodiment, integer execution engine 3324 executes, without limitation, integer and memory operations. In at least one embodiment, floating point engine 3326 executes, without limitation, floating point and vector operations. In at least one embodiment, fetch-decode unit 3322 dispatches micro-instructions to a single execution engine that replaces both integer execution engine 3324 and floating point execution engine 3326.

In at least one embodiment, each core 3320($i$), where i is an integer representing a particular instance of core 3320, may access L2 cache 3328($i$) included in core 3320($i$). In at least one embodiment, each core 3320 included in core complex 3310($j$), where j is an integer representing a particular instance of core complex 3310, is connected to other cores 3320 included in core complex 3310($j$) via L3 cache 3330($j$) included in core complex 3310($j$). In at least one embodiment, cores 3320 included in core complex 3310($j$), where j is an integer representing a particular instance of core complex 3310, can access all of L3 cache 3330($j$) included in core complex 3310($j$). In at least one embodiment, L3 cache 3330 may include, without limitation, any number of slices.

In at least one embodiment, graphics complex 3340 can be configured to perform compute operations in a highly-parallel fashion. In at least one embodiment, graphics complex 3340 is configured to execute graphics pipeline operations such as draw commands, pixel operations, geometric computations, and other operations associated with rendering an image to a display. In at least one embodiment, graphics complex 3340 is configured to execute operations unrelated to graphics. In at least one embodiment, graphics complex 3340 is configured to execute both operations related to graphics and operations unrelated to graphics.

In at least one embodiment, graphics complex 3340 includes, without limitation, any number of compute units 3350 and an L2 cache 3342. In at least one embodiment, compute units 3350 share L2 cache 3342. In at least one embodiment, L2 cache 3342 is partitioned. In at least one embodiment, graphics complex 3340 includes, without limitation, any number of compute units 3350 and any number (including zero) and type of caches. In at least one embodiment, graphics complex 3340 includes, without limitation, any amount of dedicated graphics hardware.

In at least one embodiment, each compute unit 3350 includes, without limitation, any number of SIMD units 3352 and a shared memory 3354. In at least one embodiment, each SIMD unit 3352 implements a SIMD architecture and is configured to perform operations in parallel. In at least one embodiment, each compute unit 3350 may execute any number of thread blocks, but each thread block executes on a single compute unit 3350. In at least one embodiment, a thread block includes, without limitation, any number of threads of execution. In at least one embodiment, a work-group is a thread block. In at least one embodiment, each SIMD unit 3352 executes a different warp. In at least one embodiment, a warp is a group of threads (e.g., 16 threads), where each thread in a warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3354.

In at least one embodiment, fabric 3360 is a system interconnect that facilitates data and control transmissions across core complex 3310, graphics complex 3340, I/O interfaces 3370, memory controllers 3380, display controller 3392, and multimedia engine 3394. In at least one embodiment, APU 3300 may include, without limitation, any amount and type of system interconnect in addition to or instead of fabric 3360 that facilitates data and control transmissions across any number and type of directly or indirectly linked components that may be internal or external to APU 3300. In at least one embodiment, I/O interfaces 3370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 3370 In at least one embodiment, peripheral devices that are coupled to I/O interfaces 3370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 3394 includes, without limitation, any amount and type of circuitry that is related to multimedia, such as a video decoder, a video encoder, an image signal processor, etc. In at least one embodiment, memory controllers 3380 facilitate data transfers between APU 3300 and a unified system memory 3390. In at least one embodiment, core complex 3310 and graphics complex 3340 share unified system memory 3390.

In at least one embodiment, APU 3300 implements a memory subsystem that includes, without limitation, any amount and type of memory controllers 3380 and memory devices (e.g., shared memory 3354) that may be dedicated to one component or shared among multiple components. In at least one embodiment, APU 3300 implements a cache subsystem that includes, without limitation, one or more cache memories (e.g., L2 caches 3428, L3 cache 3330, and L2 cache 3342) that may each be private to or shared between any number of components (e.g., cores 3320, core complex 3310, SIMD units 3352, compute units 3350, and graphics complex 3340).

In at least one embodiment, one or more systems depicted in FIG. 33 are utilized to generate and/or perform one or more software containers with various algorithms, formulas, and processes such as those described in connection with FIG. 1. In at least one embodiment, one or more systems depicted in FIG. 33 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 34:
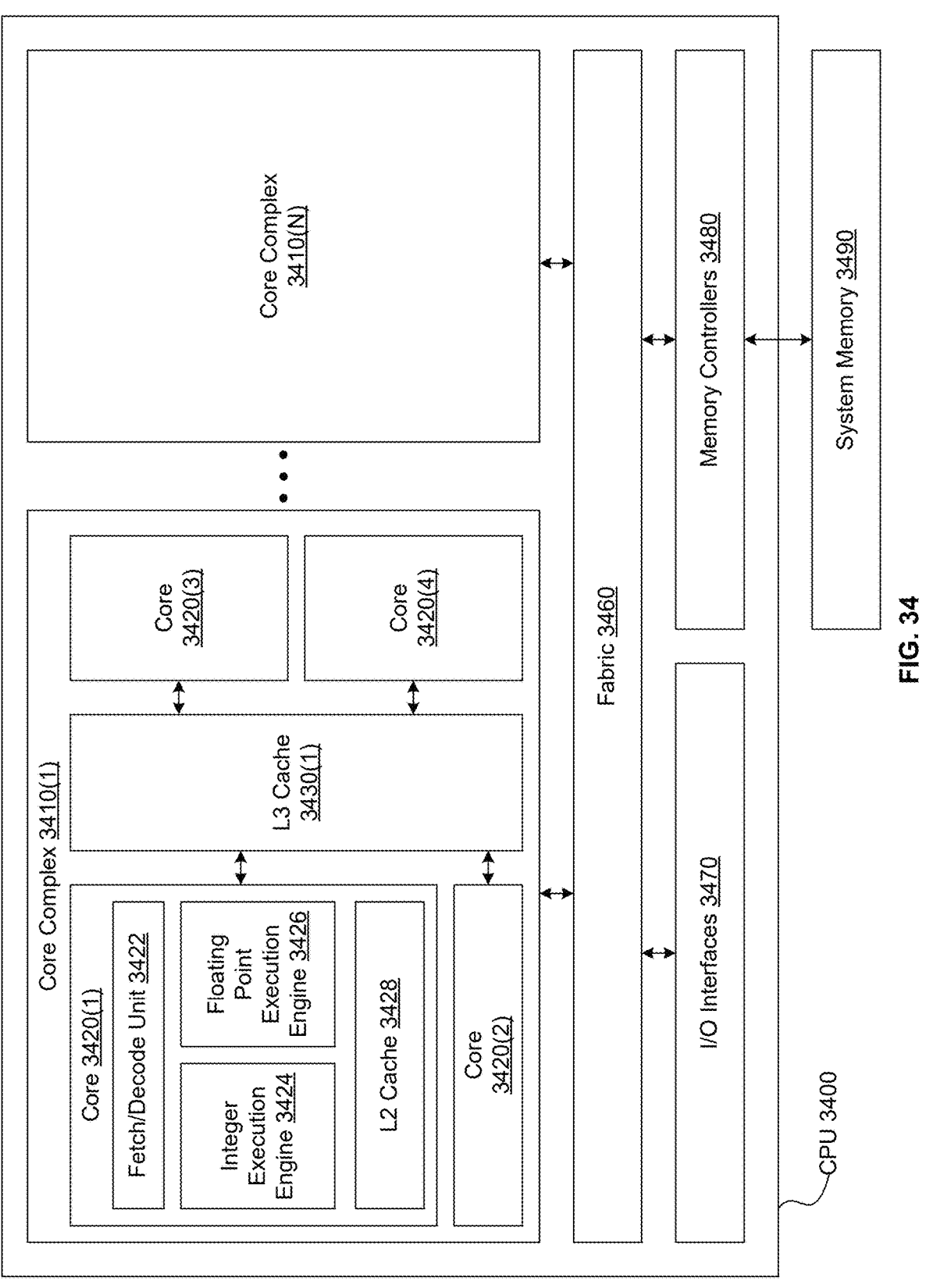
FIG. 34 illustrates a CPU, in accordance with at least one embodiment.

FIG. 34 illustrates a CPU 3400, in accordance with at least one embodiment. In at least one embodiment, CPU 3400 is developed by AMD Corporation of Santa Clara, CA. In at least one embodiment, CPU 3400 can be configured to execute an application program. In at least one embodiment, CPU 3400 is configured to execute main control software, such as an operating system. In at least one embodiment, CPU 3400 issues commands that control an operation of an external GPU (not shown). In at least one embodiment, CPU 3400 can be configured to execute host executable code derived from CUDA source code, and an external GPU can be configured to execute device executable code derived from such CUDA source code. In at least one embodiment, CPU 3400 includes, without limitation, any number of core complexes 3410, fabric 3460, I/O interfaces 3470, and memory controllers 3480.

In at least one embodiment, core complex 3410 includes, without limitation, cores 3420(1)-3420(4) and an L3 cache 3430. In at least one embodiment, core complex 3410 may include, without limitation, any number of cores 3420 and any number and type of caches in any combination. In at least one embodiment, cores 3420 are configured to execute instructions of a particular ISA. In at least one embodiment, each core 3420 is a CPU core.

In at least one embodiment, each core 3420 includes, without limitation, a fetch/decode unit 3422, an integer execution engine 3424, a floating point execution engine 3426, and an L2 cache 3428. In at least one embodiment, fetch/decode unit 3422 fetches instructions, decodes such instructions, generates micro-operations, and dispatches separate micro-instructions to integer execution engine 3424 and floating point execution engine 3426. In at least one embodiment, fetch/decode unit 3422 can concurrently dispatch one micro-instruction to integer execution engine 3424 and another micro-instruction to floating point execution engine 3426. In at least one embodiment, integer execution engine 3424 executes, without limitation, integer and memory operations. In at least one embodiment, floating point engine 3426 executes, without limitation, floating point and vector operations. In at least one embodiment, fetch-decode unit 3422 dispatches micro-instructions to a single execution engine that replaces both integer execution engine 3424 and floating point execution engine 3426.

In at least one embodiment, each core 3420($i$), where i is an integer representing a particular instance of core 3420, may access L2 cache 3428($i$) included in core 3420($i$). In at least one embodiment, each core 3420 included in core complex 3410($j$), where j is an integer representing a particular instance of core complex 3410, is connected to other cores 3420 in core complex 3410($j$) via L3 cache 3430($j$) included in core complex 3410($j$). In at least one embodiment, cores 3420 included in core complex 3410($j$), where j is an integer representing a particular instance of core complex 3410, can access all of L3 cache 3430($j$) included in core complex 3410($j$). In at least one embodiment, L3 cache 3430 may include, without limitation, any number of slices.

In at least one embodiment, fabric 3460 is a system interconnect that facilitates data and control transmissions across core complexes 3410(1)-3410(N) (where N is an integer greater than zero), I/O interfaces 3470, and memory controllers 3480. In at least one embodiment, CPU 3400 may include, without limitation, any amount and type of system interconnect in addition to or instead of fabric 3460 that facilitates data and control transmissions across any number and type of directly or indirectly linked components that may be internal or external to CPU 3400. In at least one embodiment, I/O interfaces 3470 are representative of any number and type of I/O interfaces (e.g., PCI, PCI-X, PCIe, GBE, USB, etc.). In at least one embodiment, various types of peripheral devices are coupled to I/O interfaces 3470 In at least one embodiment, peripheral devices that are coupled to I/O interfaces 3470 may include, without limitation, displays, keyboards, mice, printers, scanners, joysticks or other types of game controllers, media recording devices, external storage devices, network interface cards, and so forth.

In at least one embodiment, memory controllers 3480 facilitate data transfers between CPU 3400 and a system memory 3490. In at least one embodiment, core complex 3410 and graphics complex 3440 share system memory 3490. In at least one embodiment, CPU 3400 implements a memory subsystem that includes, without limitation, any amount and type of memory controllers 3480 and memory devices that may be dedicated to one component or shared among multiple components. In at least one embodiment, CPU 3400 implements a cache subsystem that includes, without limitation, one or more cache memories (e.g., L2 caches 3428 and L3 caches 3430) that may each be private to or shared between any number of components (e.g., cores 3420 and core complexes 3410).

In at least one embodiment, one or more systems depicted in FIG. 34 are utilized to generate and/or perform one or more software containers with various algorithms, formulas, and processes such as those described in connection with FIG. 1. In at least one embodiment, one or more systems depicted in FIG. 34 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 35:
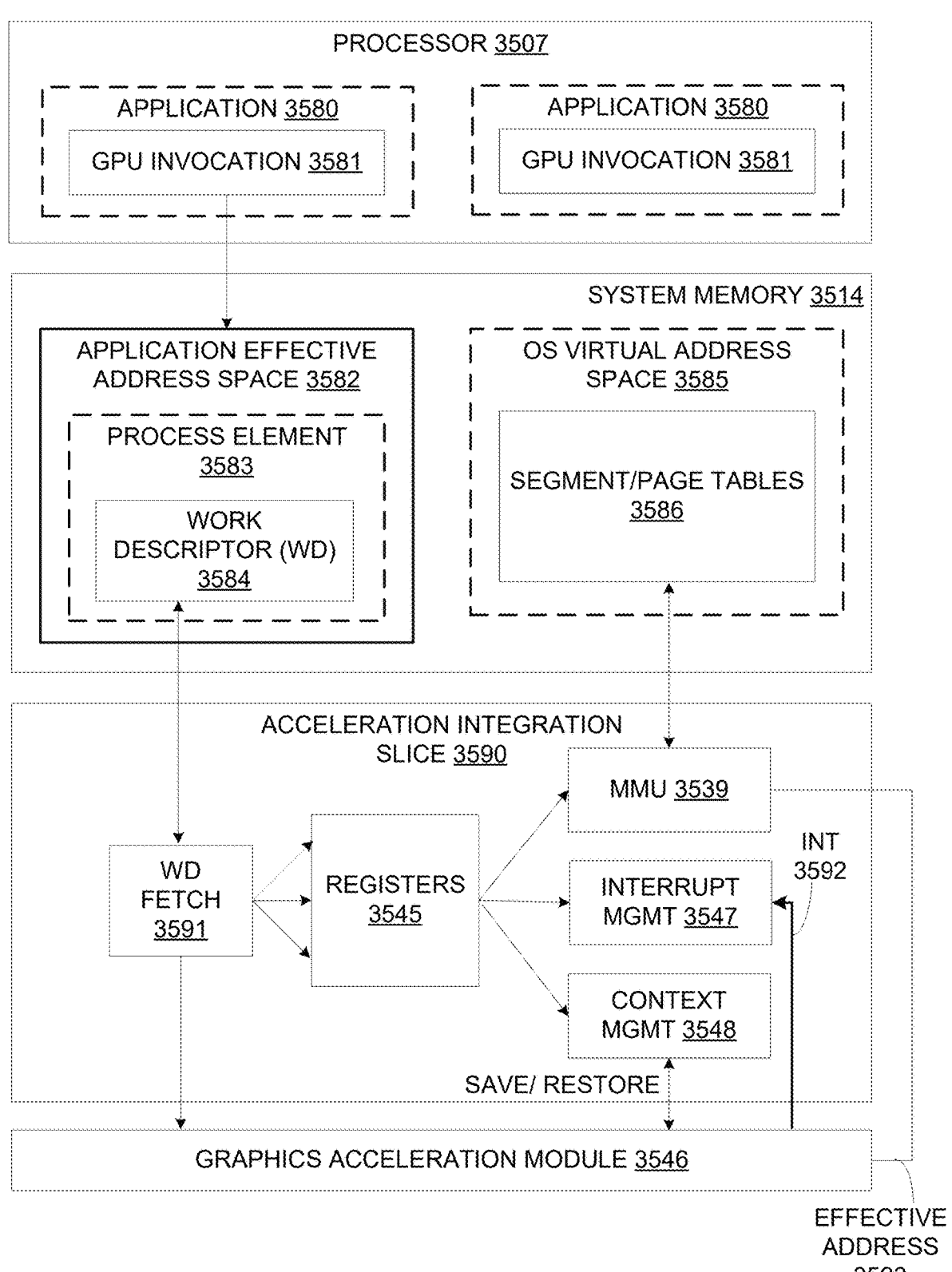
FIG. 35 illustrates an exemplary accelerator integration slice, in accordance with at least one embodiment.

FIG. 35 illustrates an exemplary accelerator integration slice 3590, in accordance with at least one embodiment. As used herein, a "slice" comprises a specified portion of processing resources of an accelerator integration circuit. In at least one embodiment, an accelerator integration circuit provides cache management, memory access, context management, and interrupt management services on behalf of multiple graphics processing engines included in a graphics acceleration module. Graphics processing engines may each comprise a separate GPU. Alternatively, graphics processing engines may comprise different types of graphics processing engines within a GPU such as graphics execution units, media processing engines (e.g., video encoders/decoders), samplers, and blit engines. In at least one embodiment, a graphics acceleration module may be a GPU with multiple graphics processing engines. In at least one embodiment, graphics processing engines may be individual GPUs integrated on a common package, line card, or chip.

An application effective address space 3582 within system memory 3514 stores process elements 3583. In one embodiment, process elements 3583 are stored in response to GPU invocations 3581 from applications 3580 executed on processor 3507. A process element 3583 contains process state for corresponding application 3580. A work descriptor ("WD") 3584 contained in process element 3583 can be a single job requested by an application or may contain a pointer to a queue of jobs. In at least one embodiment, WD 3584 is a pointer to a job request queue in application effective address space 3582.

Graphics acceleration module 3546 and/or individual graphics processing engines can be shared by all or a subset of processes in a system. In at least one embodiment, an infrastructure for setting up process state and sending WD 3584 to graphics acceleration module 3546 to start a job in a virtualized environment may be included.

In at least one embodiment, a dedicated-process programming model is implementation-specific. In this model, a single process owns graphics acceleration module 3546 or an individual graphics processing engine. Because graphics acceleration module 3546 is owned by a single process, a hypervisor initializes an accelerator integration circuit for an owning partition and an operating system initializes accelerator integration circuit for an owning process when graphics acceleration module 3546 is assigned.

In operation, a WD fetch unit 3591 in accelerator integration slice 3590 fetches next WD 3584 which includes an indication of work to be done by one or more graphics processing engines of graphics acceleration module 3546. Data from WD 3584 may be stored in registers 3545 and used by a memory management unit ("MMU") 3539, interrupt management circuit 3547 and/or context management circuit 3548 as illustrated. For example, one embodiment of MMU 3539 includes segment/page walk circuitry for accessing segment/page tables 3586 within OS virtual address space 3585. Interrupt management circuit 3547 may process interrupt events ("INT") 3592 received from graphics acceleration module 3546. When performing graphics operations, an effective address 3593 generated by a graphics processing engine is translated to a real address by MMU 3539.

In one embodiment, a same set of registers 3545 are duplicated for each graphics processing engine and/or graphics acceleration module 3546 and may be initialized by a hypervisor or operating system. Each of these duplicated registers may be included in accelerator integration slice 3590. Exemplary registers that may be initialized by a hypervisor are shown in Table 1.

TABLE 1

| Hypervisor Initialized Registers |
| --- |
| 1 Slice Control Register |
| 2 Real Address (RA) Scheduled Processes Area Pointer |
| 3 Authority Mask Override Register |
| 4 Interrupt Vector Table Entry Offset |
| 5 Interrupt Vector Table Entry Limit |
| 6 State Register |
| 7 Logical Partition ID |
| 8 Real address (RA) Hypervisor Accelerator Utilization Record Pointer |
| 9 Storage Description Register |

Exemplary registers that may be initialized by an operating system are shown in Table 2.

TABLE 2

| Operating System Initialized Registers |
| --- |
| 1 Process and Thread Identification |
| 2 Effective Address (EA) Context Save/Restore Pointer |

TABLE 2-continued

| Operating System Initialized Registers |
| --- |
| 3 Virtual Address (VA) Accelerator Utilization Record Pointer |
| 4 Virtual Address (VA) Storage Segment Table Pointer |
| 5 Authority Mask |
| 6 Work descriptor |

In one embodiment, each WD 3584 is specific to a particular graphics acceleration module 3546 and/or a particular graphics processing engine. It contains all information required by a graphics processing engine to do work or it can be a pointer to a memory location where an application has set up a command queue of work to be completed.

Figure 36A:
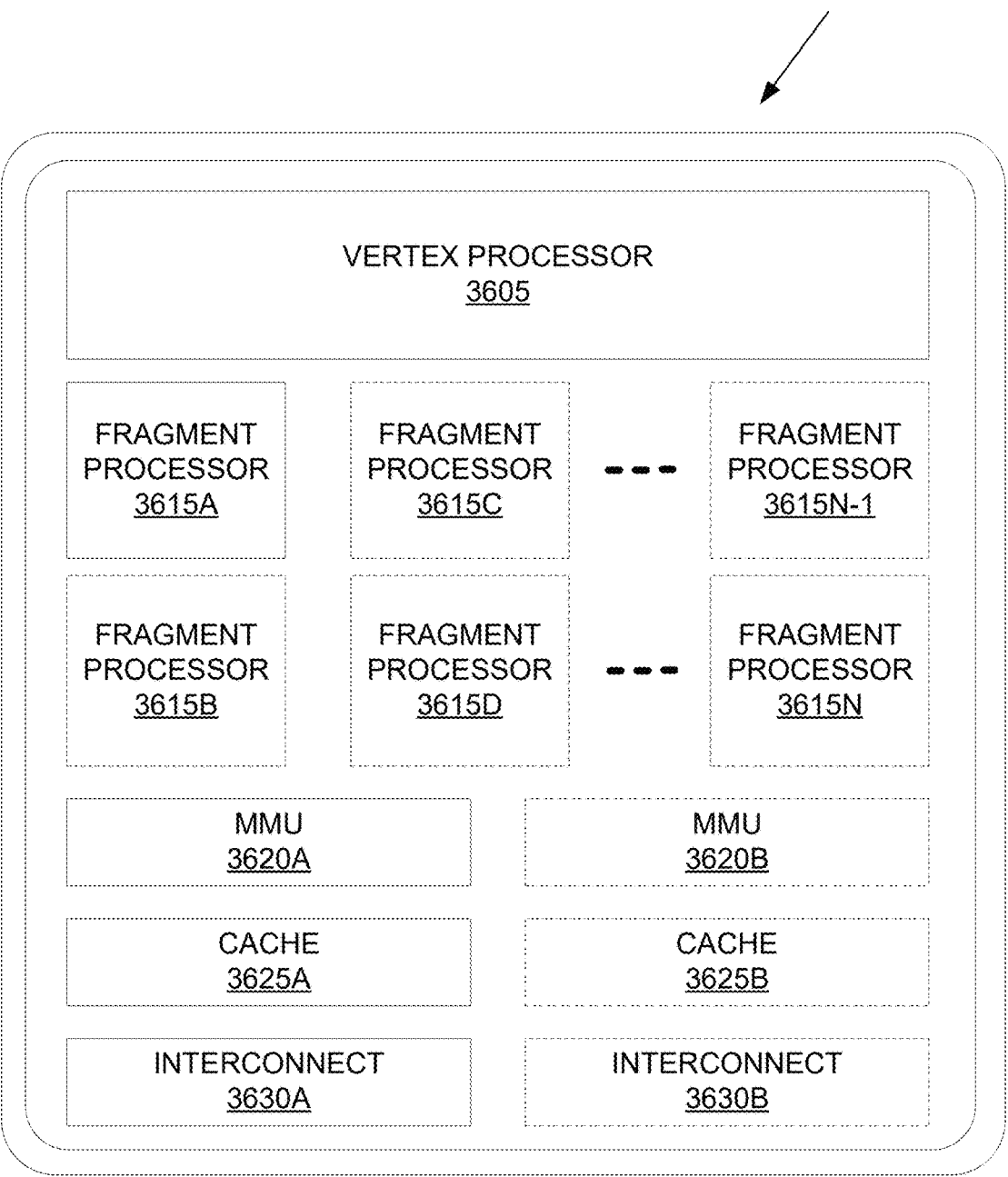
FIGS. 36A-36B illustrate exemplary graphics processors, in accordance with at least one embodiment.
Figure 36B:
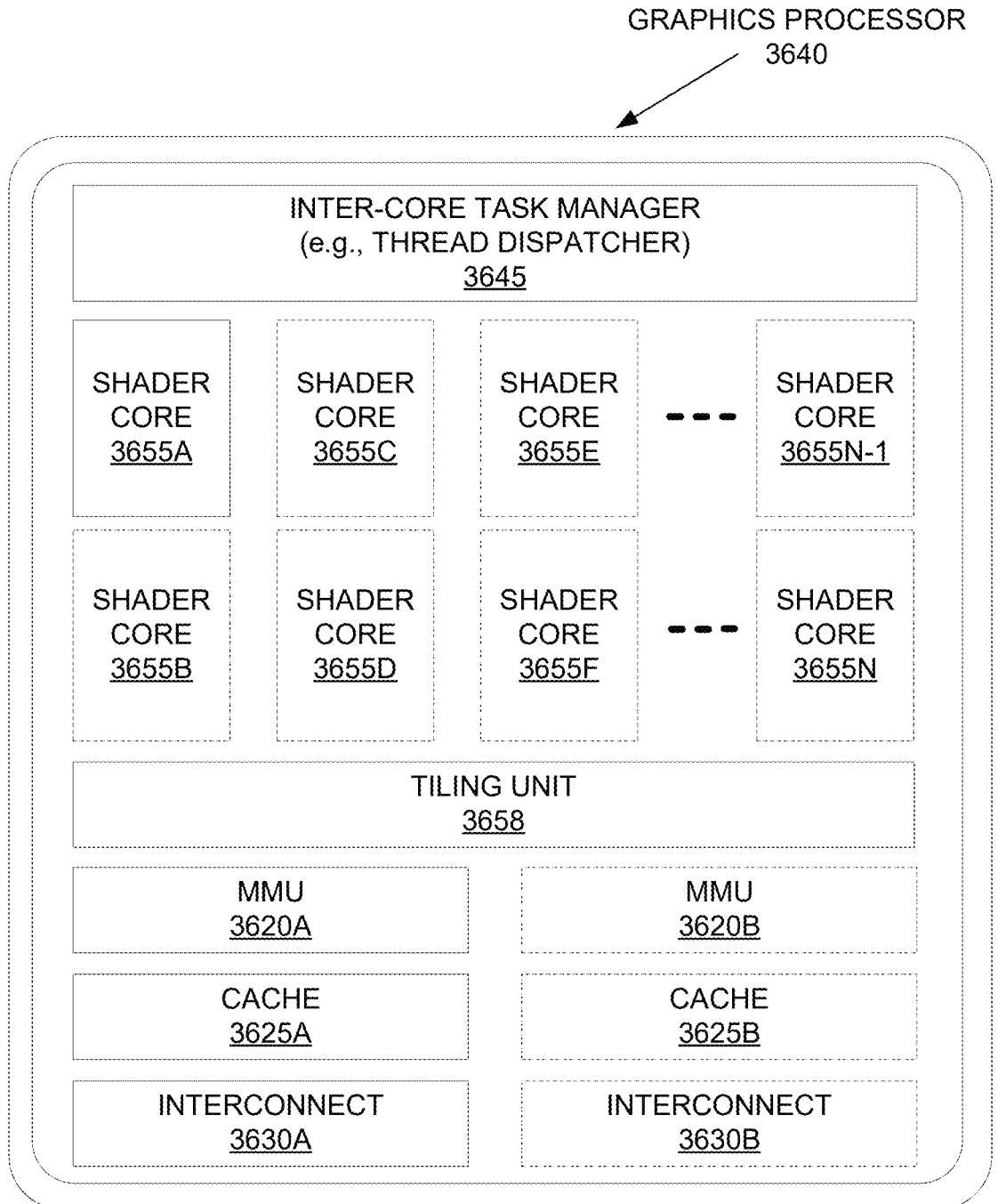

FIGS. 36A-36B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

In at least one embodiment, one or more systems depicted in FIG. 35 are utilized to generate and/or perform one or more software containers with various algorithms, formulas, and processes such as those described in connection with FIG. 1. In at least one embodiment, one or more systems depicted in FIG. 35 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

FIG. 36A illustrates an exemplary graphics processor 3610 of an SoC integrated circuit that may be fabricated using one or more IP cores, in accordance with at least one embodiment. FIG. 36B illustrates an additional exemplary graphics processor 3640 of an SoC integrated circuit that may be fabricated using one or more IP cores, in accordance with at least one embodiment. In at least one embodiment, graphics processor 3610 of FIG. 36A is a low power graphics processor core. In at least one embodiment, graphics processor 3640 of FIG. 36B is a higher performance graphics processor core. In at least one embodiment, each of graphics processors 3610, 3640 can be variants of graphics processor 1210 of FIG. 12.

In at least one embodiment, graphics processor 3610 includes a vertex processor 3605 and one or more fragment processor(s) 3615A-3615N (e.g., 3615A, 3615B, 3615C, 3615D, through 3615N−1, and 3615N). In at least one embodiment, graphics processor 3610 can execute different shader programs via separate logic, such that vertex processor 3605 is optimized to execute operations for vertex shader programs, while one or more fragment processor(s) 3615A-3615N execute fragment (e.g., pixel) shading operations for fragment or pixel shader programs. In at least one embodiment, vertex processor 3605 performs a vertex processing stage of a 3D graphics pipeline and generates primitives and vertex data. In at least one embodiment, fragment processor(s) 3615A-3615N use primitive and vertex data generated by vertex processor 3605 to produce a framebuffer that is displayed on a display device. In at least one embodiment, fragment processor(s) 3615A-3615N are optimized to execute fragment shader programs as provided for in an OpenGL API, which may be used to perform similar operations as a pixel shader program as provided for in a Direct 3D API.

In at least one embodiment, graphics processor 3610 additionally includes one or more MMU(s) 3620A-3620B, cache(s) 3625A-3625B, and circuit interconnect(s) 3630A-3630B. In at least one embodiment, one or more MMU(s) 3620A-3620B provide for virtual to physical address mapping for graphics processor 3610, including for vertex processor 3605 and/or fragment processor(s) 3615A-3615N, which may reference vertex or image/texture data stored in memory, in addition to vertex or image/texture data stored in one or more cache(s) 3625A-3625B. In at least one embodiment, one or more MMU(s) 3620A-3620B may be synchronized with other MMUs within a system, including one or more MMUs associated with one or more application processor(s) 1205, image processors 1215, and/or video processors 1220 of FIG. 12, such that each processor 1205-1220 can participate in a shared or unified virtual memory system. In at least one embodiment, one or more circuit interconnect(s) 3630A-3630B enable graphics processor 3610 to interface with other IP cores within an SoC, either via an internal bus of an SoC or via a direct connection.

In at least one embodiment, graphics processor 3640 includes one or more MMU(s) 3620A-3620B, caches 3625A-3625B, and circuit interconnects 3630A-3630B of graphics processor 3610 of FIG. 36A. In at least one embodiment, graphics processor 3640 includes one or more shader core(s) 3655A-3655N (e.g., 3655A, 3655B, 3655C, 3655D, 3655E, 3655F, through 3655N−1, and 3655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 3640 includes an inter-core task manager 3645, which acts as a thread dispatcher to dispatch execution threads to one or more shader cores 3655A-3655N and a tiling unit 3658 to accelerate tiling operations for tile-based rendering, in which rendering operations for a scene are subdivided in image space, for example to exploit local spatial coherence within a scene or to optimize use of internal caches.

In at least one embodiment, one or more systems depicted in FIG. 36A-B are utilized to generate and/or perform one or more software containers with various algorithms, formulas, and processes such as those described in connection with FIG. 1. In at least one embodiment, one or more systems depicted in FIG. 36A-B are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 37A:
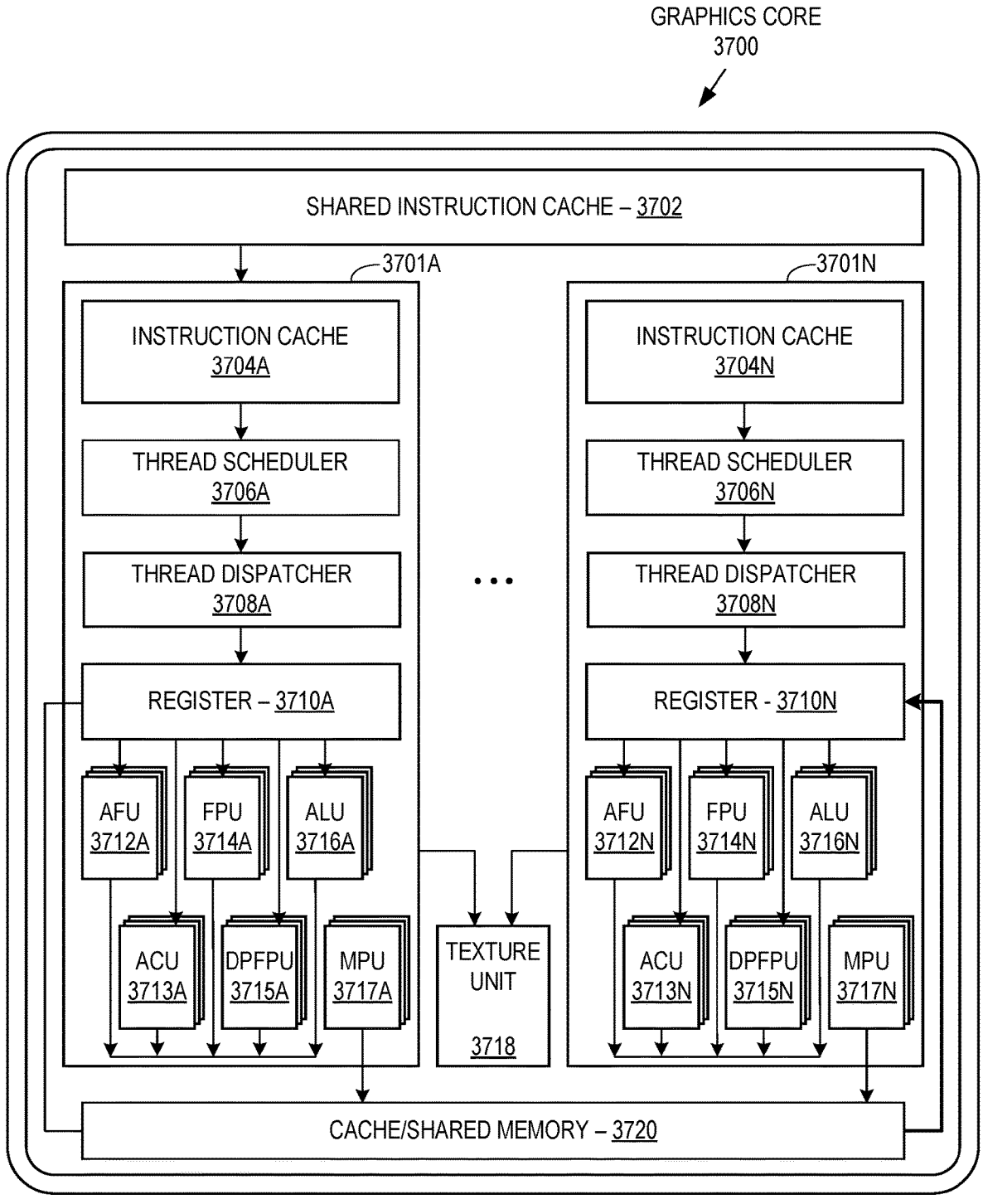
FIG. 37A illustrates a graphics core, in accordance with at least one embodiment.

FIG. 37A illustrates a graphics core 3700, in accordance with at least one embodiment. In at least one embodiment, graphics core 3700 may be included within graphics processor 3110 of FIG. 31. In at least one embodiment, graphics core 3700 may be a unified shader core 3655A-3655N as in FIG. 36B. In at least one embodiment, graphics core 3700 includes a shared instruction cache 3702, a texture unit 3718, and a cache/shared memory 3720 that are common to execution resources within graphics core 3700. In at least one embodiment, graphics core 3700 can include multiple slices 3701A-3701N or partition for each core, and a graphics processor can include multiple instances of graphics core 3700. Slices 3701A-3701N can include support logic including a local instruction cache 3704A-3704N, a thread scheduler 3706A-3706N, a thread dispatcher 3708A-3708N, and a set of registers 3710A-3710N. In at least one embodiment, slices 3701A-3701N can include a set of additional function units ("AFUs") 3712A-3712N, floating-point units ("FPUs") 3714A-3714N, integer arithmetic logic units ("ALUs") 3716-3716N, address computational units ("ACUs") 3713A-3713N, double-precision floating-point units ("DPFPUs") 3715A-3715N, and matrix processing units ("MPUs") 3717A-3717N.

In at least one embodiment, FPUs 3714A-3714N can perform single-precision (32-bit) and half-precision (16-bit) floating point operations, while DPFPUs 3715A-3715N perform double precision (64-bit) floating point operations. In at least one embodiment, ALUs 3716A-3716N can perform variable precision integer operations at 8-bit, 16-bit, and 32-bit precision, and can be configured for mixed precision operations. In at least one embodiment, MPUs 3717A-3717N can also be configured for mixed precision matrix operations, including half-precision floating point and 8-bit integer operations. In at least one embodiment, MPUs 3717-3717N can perform a variety of matrix operations to accelerate CUDA programs, including enabling support for accelerated general matrix to matrix multiplication ("GEMM"). In at least one embodiment, AFUs 3712A-3712N can perform additional logic operations not supported by floating-point or integer units, including trigonometric operations (e.g., Sine, Cosine, etc.).

Figure 37B:
FIG. 37B illustrates a GPGPU, in accordance with at least one embodiment.

FIG. 37B illustrates a general-purpose graphics processing unit ("GPGPU") 3730, in accordance with at least one embodiment. In at least one embodiment, GPGPU 3730 is highly-parallel and suitable for deployment on a multi-chip module. In at least one embodiment, GPGPU 3730 can be configured to enable highly-parallel compute operations to be performed by an array of GPUs. In at least one embodiment, GPGPU 3730 can be linked directly to other instances of GPGPU 3730 to create a multi-GPU cluster to improve execution time for CUDA programs. In at least one embodiment, GPGPU 3730 includes a host interface 3732 to enable a connection with a host processor. In at least one embodiment, host interface 3732 is a PCIe interface. In at least one embodiment, host interface 3732 can be a vendor specific communications interface or communications fabric. In at least one embodiment, GPGPU 3730 receives commands from a host processor and uses a global scheduler 3734 to distribute execution threads associated with those commands to a set of compute clusters 3736A-3736H. In at least one embodiment, compute clusters 3736A-3736H share a cache memory 3738. In at least one embodiment, cache memory 3738 can serve as a higher-level cache for cache memories within compute clusters 3736A-3736H.

In at least one embodiment, GPGPU 3730 includes memory 3744A-3744B coupled with compute clusters 3736A-3736H via a set of memory controllers 3742A-3742B. In at least one embodiment, memory 3744A-3744B can include various types of memory devices including DRAM or graphics random access memory, such as synchronous graphics random access memory ("SGRAM"), including graphics double data rate ("GDDR") memory.

In at least one embodiment, compute clusters 3736A-3736H each include a set of graphics cores, such as graphics core 3700 of FIG. 37A, which can include multiple types of integer and floating point logic units that can perform computational operations at a range of precisions including suited for computations associated with CUDA programs. For example, in at least one embodiment, at least a subset of floating point units in each of compute clusters 3736A-3736H can be configured to perform 16-bit or 32-bit floating point operations, while a different subset of floating point units can be configured to perform 64-bit floating point operations.

In at least one embodiment, multiple instances of GPGPU 3730 can be configured to operate as a compute cluster. In at least one embodiment, compute clusters 3736A-3736H may implement any technically feasible communication techniques for synchronization and data exchange. In at least one embodiment, multiple instances of GPGPU 3730 communicate over host interface 3732. In at least one embodiment, GPGPU 3730 includes an I/O hub 3739 that couples GPGPU 3730 with a GPU link 3740 that enables a direct connection to other instances of GPGPU 3730. In at least one embodiment, GPU link 3740 is coupled to a dedicated GPU-to-GPU bridge that enables communication and synchronization between multiple instances of GPGPU 3730. In at least one embodiment GPU link 3740 couples with a high speed interconnect to transmit and receive data to other GPGPUs 3730 or parallel processors. In at least one embodiment, multiple instances of GPGPU 3730 are located in separate data processing systems and communicate via a network device that is accessible via host interface 3732. In at least one embodiment GPU link 3740 can be configured to enable a connection to a host processor in addition to or as an alternative to host interface 3732. In at least one embodiment, GPGPU 3730 can be configured to execute a CUDA program.

In at least one embodiment, one or more systems depicted in FIG. 37A-B are utilized to generate and/or perform one or more software containers with various algorithms, formulas, and processes such as those described in connection with FIG. 1. In at least one embodiment, one or more systems depicted in FIG. 37A-B are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 38A:
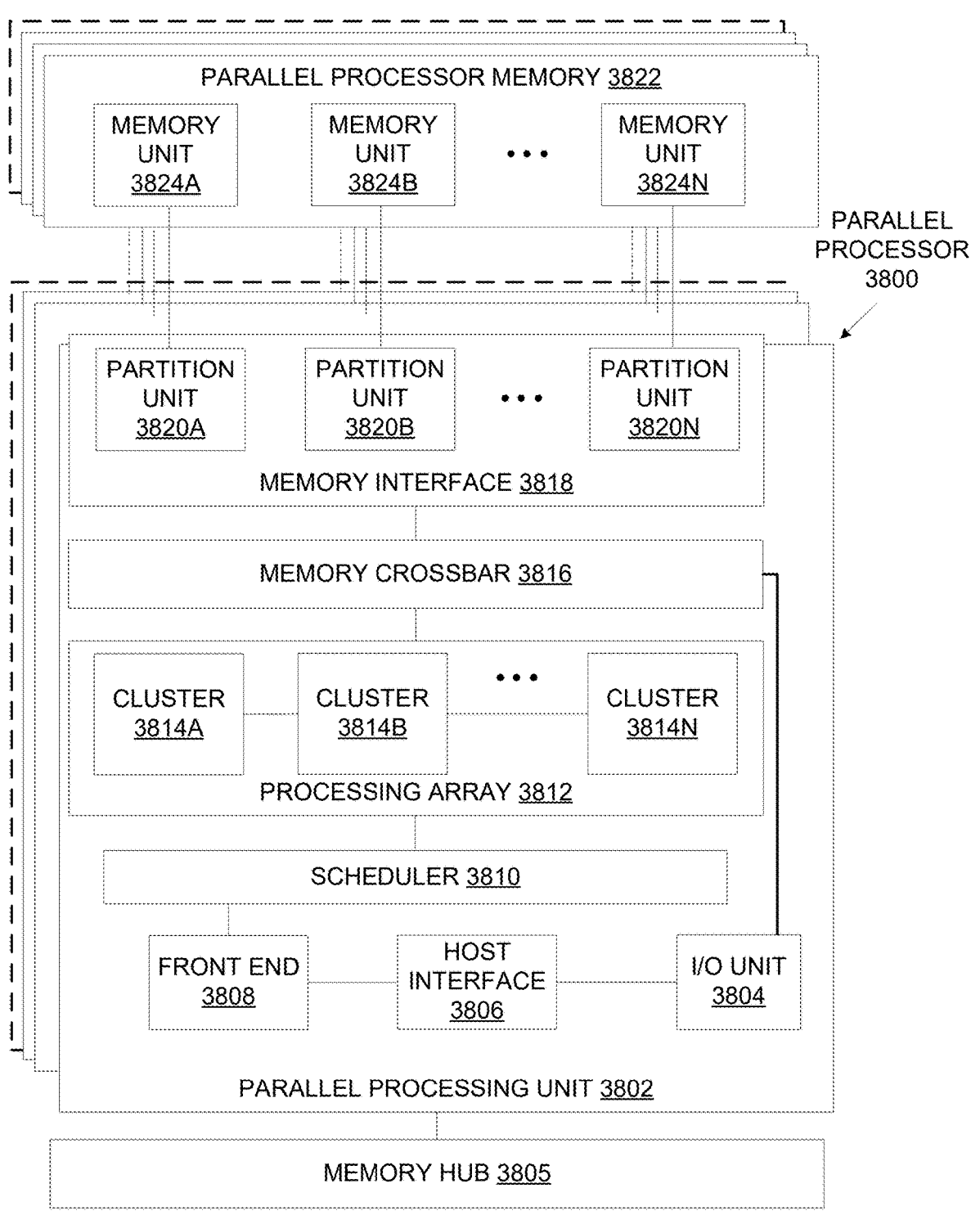
FIG. 38A illustrates a parallel processor, in accordance with at least one embodiment.

FIG. 38A illustrates a parallel processor 3800, in accordance with at least one embodiment. In at least one embodiment, various components of parallel processor 3800 may be implemented using one or more integrated circuit devices, such as programmable processors, application specific integrated circuits ("ASICs"), or FPGAs.

In at least one embodiment, parallel processor 3800 includes a parallel processing unit 3802. In at least one embodiment, parallel processing unit 3802 includes an I/O unit 3804 that enables communication with other devices, including other instances of parallel processing unit 3802. In at least one embodiment, I/O unit 3804 may be directly connected to other devices. In at least one embodiment, I/O unit 3804 connects with other devices via use of a hub or switch interface, such as memory hub 1305. In at least one embodiment, connections between memory hub 1305 and I/O unit 3804 form a communication link. In at least one embodiment, I/O unit 3804 connects with a host interface 3806 and a memory crossbar 3816, where host interface 3806 receives commands directed to performing processing operations and memory crossbar 3816 receives commands directed to performing memory operations.

In at least one embodiment, when host interface 3806 receives a command buffer via I/O unit 3804, host interface 3806 can direct work operations to perform those commands to a front end 3808. In at least one embodiment, front end 3808 couples with a scheduler 3810, which is configured to distribute commands or other work items to a processing array 3812. In at least one embodiment, scheduler 3810 ensures that processing array 3812 is properly configured and in a valid state before tasks are distributed to processing array 3812. In at least one embodiment, scheduler 3810 is implemented via firmware logic executing on a microcontroller. In at least one embodiment, microcontroller implemented scheduler 3810 is configurable to perform complex scheduling and work distribution operations at coarse and fine granularity, enabling rapid preemption and context switching of threads executing on processing array 3812. In at least one embodiment, host software can prove workloads for scheduling on processing array 3812 via one of multiple graphics processing doorbells. In at least one embodiment, workloads can then be automatically distributed across processing array 3812 by scheduler 3810 logic within a microcontroller including scheduler 3810.

In at least one embodiment, processing array 3812 can include up to "N" clusters (e.g., cluster 3814A, cluster 3814B, through cluster 3814N). In at least one embodiment, each cluster 3814A-3814N of processing array 3812 can execute a large number of concurrent threads. In at least one embodiment, scheduler 3810 can allocate work to clusters 3814A-3814N of processing array 3812 using various scheduling and/or work distribution algorithms, which may vary depending on a workload arising for each type of program or computation. In at least one embodiment, scheduling can be handled dynamically by scheduler 3810, or can be assisted in part by compiler logic during compilation of program logic configured for execution by processing array 3812. In at least one embodiment, different clusters 3814A-3814N of processing array 3812 can be allocated for processing different types of programs or for performing different types of computations.

In at least one embodiment, processing array 3812 can be configured to perform various types of parallel processing operations. In at least one embodiment, processing array 3812 is configured to perform general-purpose parallel compute operations. For example, in at least one embodiment, processing array 3812 can include logic to execute processing tasks including filtering of video and/or audio data, performing modeling operations, including physics operations, and performing data transformations.

In at least one embodiment, processing array 3812 is configured to perform parallel graphics processing operations. In at least one embodiment, processing array 3812 can include additional logic to support execution of such graphics processing operations, including, but not limited to texture sampling logic to perform texture operations, as well as tessellation logic and other vertex processing logic. In at least one embodiment, processing array 3812 can be configured to execute graphics processing related shader programs such as, but not limited to vertex shaders, tessellation shaders, geometry shaders, and pixel shaders. In at least one embodiment, parallel processing unit 3802 can transfer data from system memory via I/O unit 3804 for processing. In at least one embodiment, during processing, transferred data can be stored to on-chip memory (e.g., a parallel processor memory 3822) during processing, then written back to system memory.

In at least one embodiment, when parallel processing unit 3802 is used to perform graphics processing, scheduler 3810 can be configured to divide a processing workload into approximately equal sized tasks, to better enable distribution of graphics processing operations to multiple clusters 3814A-3814N of processing array 3812. In at least one embodiment, portions of processing array 3812 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 3814A-3814N may be stored in buffers to allow intermediate data to be transmitted between clusters 3814A-3814N for further processing.

In at least one embodiment, processing array 3812 can receive processing tasks to be executed via scheduler 3810, which receives commands defining processing tasks from front end 3808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 3810 may be configured to fetch indices corresponding to tasks or may receive indices from front end 3808. In at least one embodiment, front end 3808 can be configured to ensure processing array 3812 is configured to a valid state before a workload specified by incoming command buffers (e.g., batch-buffers, push buffers, etc.) is initiated.

In at least one embodiment, each of one or more instances of parallel processing unit 3802 can couple with parallel processor memory 3822. In at least one embodiment, parallel processor memory 3822 can be accessed via memory crossbar 3816, which can receive memory requests from processing array 3812 as well as I/O unit 3804. In at least one embodiment, memory crossbar 3816 can access parallel processor memory 3822 via a memory interface 3818. In at least one embodiment, memory interface 3818 can include multiple partition units (e.g., a partition unit 3820A, partition unit 3820B, through partition unit 3820N) that can each couple to a portion (e.g., memory unit) of parallel processor memory 3822. In at least one embodiment, a number of partition units 3820A-3820N is configured to be equal to a number of memory units, such that a first partition unit 3820A has a corresponding first memory unit 3824A, a second partition unit 3820B has a corresponding memory unit 3824B, and an Nth partition unit 3820N has a corresponding Nth memory unit 3824N. In at least one embodiment, a number of partition units 3820A-3820N may not be equal to a number of memory devices.

In at least one embodiment, memory units 3824A-3824N can include various types of memory devices, including DRAM or graphics random access memory, such as SGRAM, including GDDR memory. In at least one embodiment, memory units 3824A-3824N may also include 3D stacked memory, including but not limited to high bandwidth memory ("HBM"). In at least one embodiment, render targets, such as frame buffers or texture maps may be stored across memory units 3824A-3824N, allowing partition units 3820A-3820N to write portions of each render target in parallel to efficiently use available bandwidth of parallel processor memory 3822. In at least one embodiment, a local instance of parallel processor memory 3822 may be excluded in favor of a unified memory design that utilizes system memory in conjunction with local cache memory.

In at least one embodiment, any one of clusters 3814A-3814N of processing array 3812 can process data that will be written to any of memory units 3824A-3824N within parallel processor memory 3822. In at least one embodiment, memory crossbar 3816 can be configured to transfer an output of each cluster 3814A-3814N to any partition unit 3820A-3820N or to another cluster 3814A-3814N, which can perform additional processing operations on an output. In at least one embodiment, each cluster 3814A-3814N can communicate with memory interface 3818 through memory crossbar 3816 to read from or write to various external memory devices. In at least one embodiment, memory crossbar 3816 has a connection to memory interface 3818 to communicate with I/O unit 3804, as well as a connection to a local instance of parallel processor memory 3822, enabling processing units within different clusters 3814A-3814N to communicate with system memory or other memory that is not local to parallel processing unit 3802. In at least one embodiment, memory crossbar 3816 can use virtual channels to separate traffic streams between clusters 3814A-3814N and partition units 3820A-3820N.

In at least one embodiment, multiple instances of parallel processing unit 3802 can be provided on a single add-in card, or multiple add-in cards can be interconnected. In at least one embodiment, different instances of parallel processing unit 3802 can be configured to interoperate even if different instances have different numbers of processing cores, different amounts of local parallel processor memory, and/or other configuration differences. For example, in at least one embodiment, some instances of parallel processing unit 3802 can include higher precision floating point units relative to other instances. In at least one embodiment, systems incorporating one or more instances of parallel processing unit 3802 or parallel processor 3800 can be implemented in a variety of configurations and form factors, including but not limited to desktop, laptop, or handheld personal computers, servers, workstations, game consoles, and/or embedded systems.

Figure 38B:
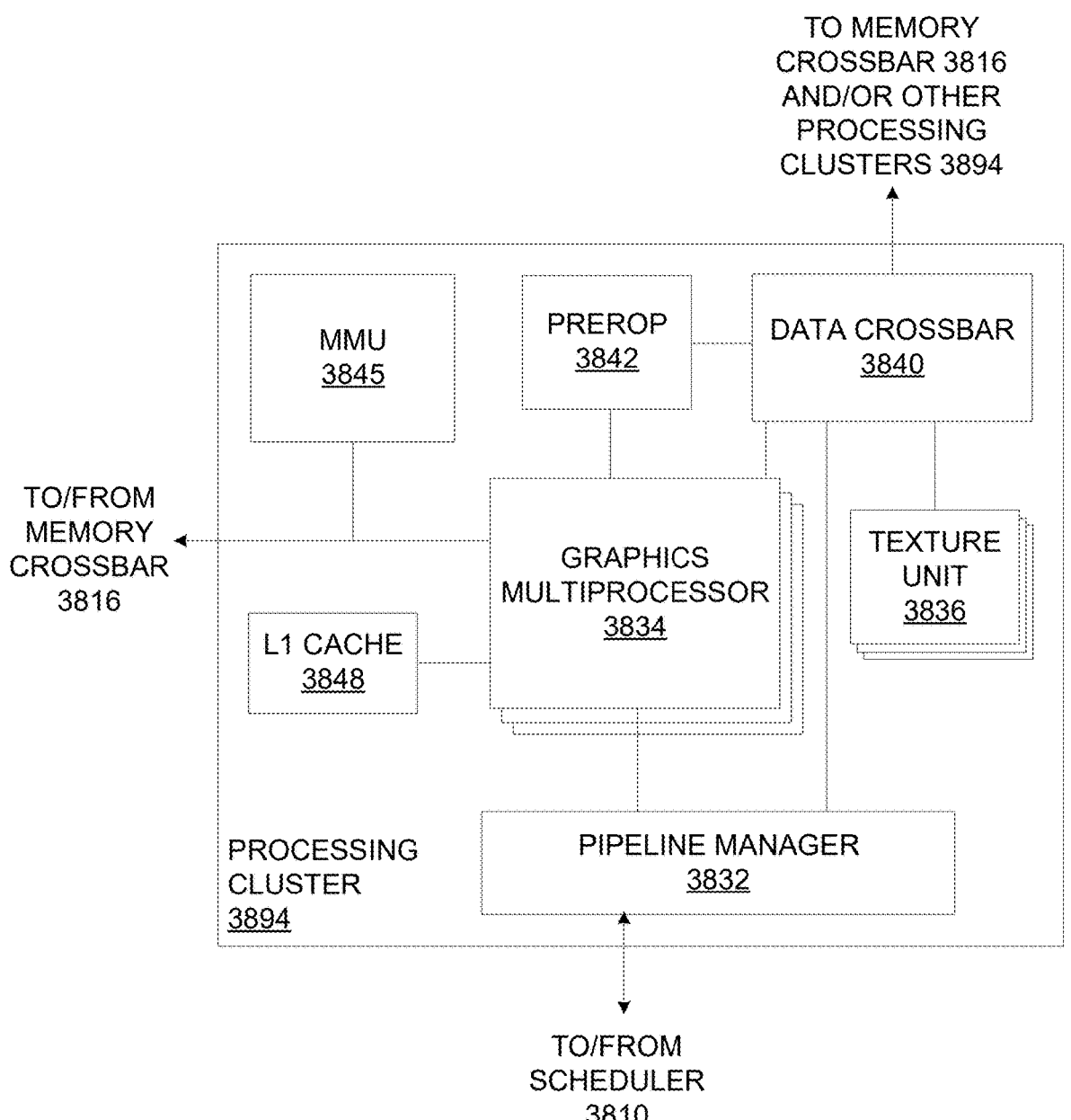
FIG. 38B illustrates a processing cluster, in accordance with at least one embodiment.

FIG. 38B illustrates a processing cluster 3894, in accordance with at least one embodiment. In at least one embodiment, processing cluster 3894 is included within a parallel processing unit. In at least one embodiment, processing cluster 3894 is one of processing clusters 3814A-3814N of FIG. 38. In at least one embodiment, processing cluster 3894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 3894.

In at least one embodiment, operation of processing cluster 3894 can be controlled via a pipeline manager 3832 that distributes processing tasks to SIMT parallel processors. In at least one embodiment, pipeline manager 3832 receives instructions from scheduler 3810 of FIG. 38 and manages execution of those instructions via a graphics multiprocessor 3834 and/or a texture unit 3836. In at least one embodiment, graphics multiprocessor 3834 is an exemplary instance of a SIMT parallel processor. However, in at least one embodiment, various types of SIMT parallel processors of differing architectures may be included within processing cluster 3894. In at least one embodiment, one or more instances of graphics multiprocessor 3834 can be included within processing cluster 3894. In at least one embodiment, graphics multiprocessor 3834 can process data and a data crossbar 3840 can be used to distribute processed data to one of multiple possible destinations, including other shader units. In at least one embodiment, pipeline manager 3832 can facilitate distribution of processed data by specifying destinations for processed data to be distributed via data crossbar 3840.

In at least one embodiment, each graphics multiprocessor 3834 within processing cluster 3894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 3894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 3834. In at least one embodiment, a thread group may include fewer threads than a number of processing engines within graphics multiprocessor 3834. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 3834. In at least one embodiment, when a thread group includes more threads than a number of processing engines within graphics multiprocessor 3834, processing can be performed over consecutive clock cycles. In at least one embodiment, multiple thread groups can be executed concurrently on graphics multiprocessor 3834.

In at least one embodiment, graphics multiprocessor 3834 includes an internal cache memory to perform load and store operations. In at least one embodiment, graphics multiprocessor 3834 can forego an internal cache and use a cache memory (e.g., L1 cache 3848) within processing cluster 3894. In at least one embodiment, each graphics multiprocessor 3834 also has access to Level 2 ("L2") caches within partition units (e.g., partition units 3820A-3820N of FIG. 38A) that are shared among all processing clusters 3894 and may be used to transfer data between threads. In at least one embodiment, graphics multiprocessor 3834 may also access off-chip global memory, which can include one or more of local parallel processor memory and/or system memory. In at least one embodiment, any memory external to parallel processing unit 3802 may be used as global memory. In at least one embodiment, processing cluster 3894 includes multiple instances of graphics multiprocessor 3834 that can share common instructions and data, which may be stored in L1 cache 3848.

In at least one embodiment, each processing cluster 3894 may include an MMU 3845 that is configured to map virtual addresses into physical addresses. In at least one embodiment, one or more instances of MMU 3845 may reside within memory interface 3818 of FIG. 38. In at least one embodiment, MMU 3845 includes a set of page table entries ("PTEs") used to map a virtual address to a physical address of a tile and optionally a cache line index. In at least one embodiment, MMU 3845 may include address translation lookaside buffers ("TLBs") or caches that may reside within graphics multiprocessor 3834 or L1 cache 3848 or processing cluster 3894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 3894 may be configured such that each graphics multiprocessor 3834 is coupled to a texture unit 3836 for performing texture mapping operations, e.g., determining texture sample positions, reading texture data, and filtering texture data. In at least one embodiment, texture data is read from an internal texture L1 cache (not shown) or from an L1 cache within graphics multiprocessor 3834 and is fetched from an L2 cache, local parallel processor memory, or system memory, as needed. In at least one embodiment, each graphics multiprocessor 3834 outputs a processed task to data crossbar 3840 to provide a processed task to another processing cluster 3894 for further processing or to store a processed task in an L2 cache, a local parallel processor memory, or a system memory via memory crossbar 3816. In at least one embodiment, a pre-raster operations unit ("preROP") 3842 is configured to receive data from graphics multiprocessor 3834, direct data to ROP units, which may be located with partition units as described herein (e.g., partition units 3820A-3820N of FIG. 38). In at least one embodiment, PreROP 3842 can perform optimizations for color blending, organize pixel color data, and perform address translations.

Figure 38C:
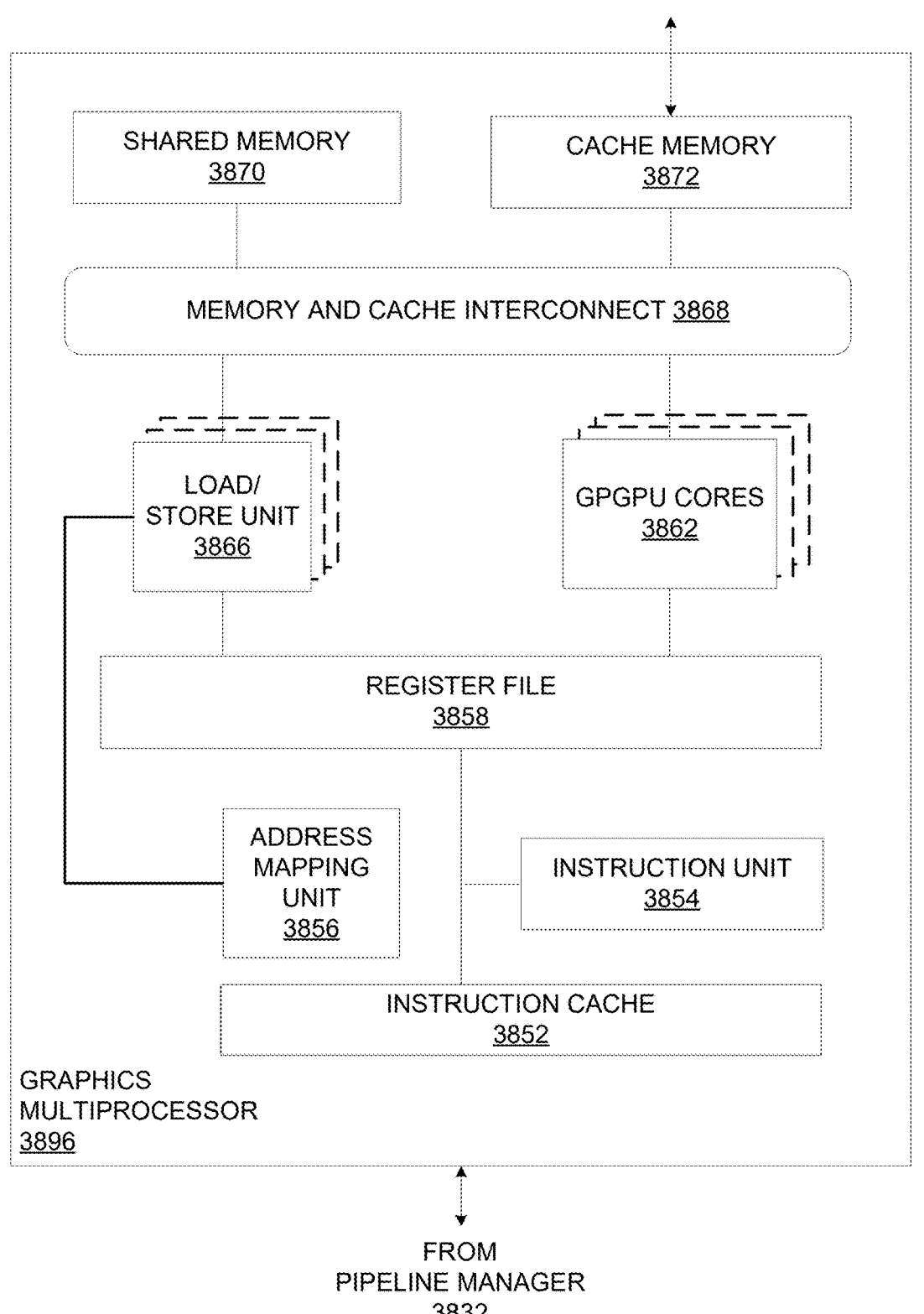
FIG. 38C illustrates a graphics multiprocessor, in accordance with at least one embodiment.

FIG. 38C illustrates a graphics multiprocessor 3896, in accordance with at least one embodiment. In at least one embodiment, graphics multiprocessor 3896 is graphics multiprocessor 3834 of FIG. 38B. In at least one embodiment, graphics multiprocessor 3896 couples with pipeline manager 3832 of processing cluster 3894. In at least one embodiment, graphics multiprocessor 3896 has an execution pipeline including but not limited to an instruction cache 3852, an instruction unit 3854, an address mapping unit 3856, a register file 3858, one or more GPGPU cores 3862, and one or more LSUs 3866. GPGPU cores 3862 and LSUs 3866 are coupled with cache memory 3872 and shared memory 3870 via a memory and cache interconnect 3868.

In at least one embodiment, instruction cache 3852 receives a stream of instructions to execute from pipeline manager 3832. In at least one embodiment, instructions are cached in instruction cache 3852 and dispatched for execution by instruction unit 3854. In at least one embodiment, instruction unit 3854 can dispatch instructions as thread groups (e.g., warps), with each thread of a thread group assigned to a different execution unit within GPGPU core 3862. In at least one embodiment, an instruction can access any of a local, shared, or global address space by specifying an address within a unified address space. In at least one embodiment, address mapping unit 3856 can be used to translate addresses in a unified address space into a distinct memory address that can be accessed by LSUs 3866.

In at least one embodiment, register file 3858 provides a set of registers for functional units of graphics multiprocessor 3896. In at least one embodiment, register file 3858 provides temporary storage for operands connected to data paths of functional units (e.g., GPGPU cores 3862, LSUs 3866) of graphics multiprocessor 3896. In at least one embodiment, register file 3858 is divided between each of functional units such that each functional unit is allocated a dedicated portion of register file 3858. In at least one embodiment, register file 3858 is divided between different thread groups being executed by graphics multiprocessor 3896.

In at least one embodiment, GPGPU cores 3862 can each include FPUs and/or integer ALUs that are used to execute instructions of graphics multiprocessor 3896. GPGPU cores 3862 can be similar in architecture or can differ in architecture. In at least one embodiment, a first portion of GPGPU cores 3862 include a single precision FPU and an integer ALU while a second portion of GPGPU cores 3862 include a double precision FPU. In at least one embodiment, FPUs can implement IEEE 754-2008 standard for floating point arithmetic or enable variable precision floating point arithmetic. In at least one embodiment, graphics multiprocessor 3896 can additionally include one or more fixed function or special function units to perform specific functions such as copy rectangle or pixel blending operations. In at least one embodiment one or more of GPGPU cores 3862 can also include fixed or special function logic.

In at least one embodiment, GPGPU cores 3862 include SIMD logic capable of performing a single instruction on multiple sets of data. In at least one embodiment GPGPU cores 3862 can physically execute SIMD4, SIMD8, and SIMD16 instructions and logically execute SIMD1, SIMD2, and SIMD32 instructions. In at least one embodiment, SIMD instructions for GPGPU cores 3862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 3868 is an interconnect network that connects each functional unit of graphics multiprocessor 3896 to register file 3858 and to shared memory 3870. In at least one embodiment, memory and cache interconnect 3868 is a crossbar interconnect that allows LSU 3866 to implement load and store operations between shared memory 3870 and register file 3858. In at least one embodiment, register file 3858 can operate at a same frequency as GPGPU cores 3862, thus data transfer between GPGPU cores 3862 and register file 3858 is very low latency. In at least one embodiment, shared memory 3870 can be used to enable communication between threads that execute on functional units within graphics multiprocessor 3896. In at least one embodiment, cache memory 3872 can be used as a data cache for example, to cache texture data communicated between functional units and texture unit 3836. In at least one embodiment, shared memory 3870 can also be used as a program managed cached. In at least one embodiment, threads executing on GPGPU cores 3862 can programmatically store data within shared memory in addition to automatically cached data that is stored within cache memory 3872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on a same package or chip as cores and communicatively coupled to cores over a processor bus/interconnect that is internal to a package or a chip. In at least one embodiment, regardless of a manner in which a GPU is connected, processor cores may allocate work to a GPU in a form of sequences of commands/instructions contained in a WD. In at least one embodiment, a GPU then uses dedicated circuitry/logic for efficiently processing these commands/instructions.

In at least one embodiment, one or more systems depicted in FIG. 38A-C are utilized to generate and/or perform one or more software containers with various algorithms, formulas, and processes such as those described in connection with FIG. 1. In at least one embodiment, one or more systems depicted in FIG. 38A-C are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

General Computing

The following figures set forth, without limitation, exemplary software constructs within general computing that can be used to implement at least one embodiment.

Figure 39:
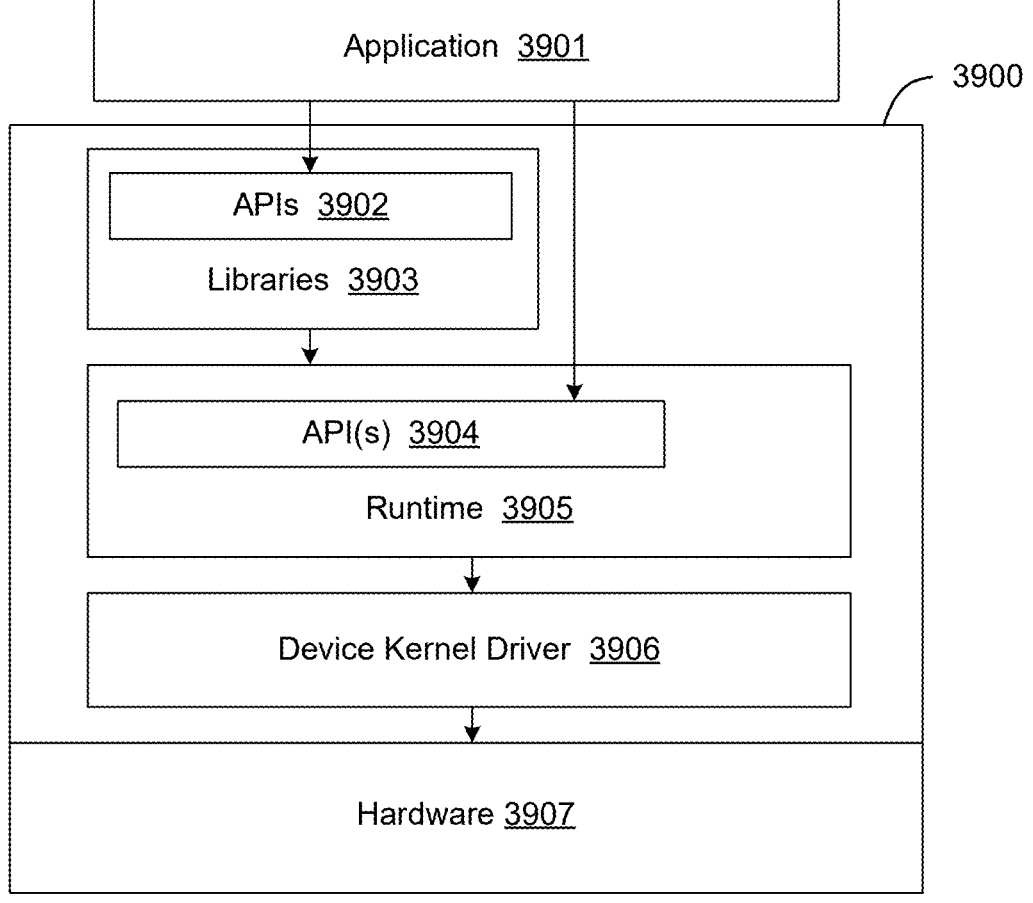
FIG. 39 illustrates a software stack of a programming platform, in accordance with at least one embodiment.

FIG. 39 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 3900 of a programming platform provides an execution environment for an application 3901. In at least one embodiment, application 3901 may include any computer software capable of being launched on software stack 3900. In at least one embodiment, application 3901 may include, but is not limited to, an artificial intelligence ("AI")/machine learning ("ML") application, a high performance computing ("HPC") application, a virtual desktop infrastructure ("VDI"), or a data center workload.

In at least one embodiment, application 3901 and software stack 3900 run on hardware 3907. Hardware 3907 may include one or more GPUs, CPUs, FPGAs, AI engines, and/or other types of compute devices that support a programming platform, in at least one embodiment. In at least one embodiment, such as with CUDA, software stack 3900 may be vendor specific and compatible with only devices from particular vendor(s). In at least one embodiment, such as in with OpenCL, software stack 3900 may be used with devices from different vendors. In at least one embodiment, hardware 3907 includes a host connected to one or more devices that can be accessed to perform computational tasks via application programming interface ("API") calls. A device within hardware 3907 may include, but is not limited to, a GPU, FPGA, AI engine, or other compute device (but may also include a CPU) and its memory, as opposed to a host within hardware 3907 that may include, but is not limited to, a CPU (but may also include a compute device) and its memory, in at least one embodiment.

In at least one embodiment, software stack 3900 of a programming platform includes, without limitation, a number of libraries 3903, a runtime 3905, and a device kernel driver 3906. Each of libraries 3903 may include data and programming code that can be used by computer programs and leveraged during software development, in at least one embodiment. In at least one embodiment, libraries 3903 may include, but are not limited to, pre-written code and subroutines, classes, values, type specifications, configuration data, documentation, help data, and/or message templates. In at least one embodiment, libraries 3903 include functions that are optimized for execution on one or more types of devices. In at least one embodiment, libraries 3903 may include, but are not limited to, functions for performing mathematical, deep learning, and/or other types of operations on devices. In at least one embodiment, libraries 4003 are associated with corresponding APIs 4002, which may include one or more APIs, that expose functions implemented in libraries 4003.

In at least one embodiment, application 3901 is written as source code that is compiled into executable code, as discussed in greater detail below in conjunction with FIG. 44. Executable code of application 3901 may run, at least in part, on an execution environment provided by software stack 3900, in at least one embodiment. In at least one embodiment, during execution of application 3901, code may be reached that needs to run on a device, as opposed to a host. In such a case, runtime 3905 may be called to load and launch requisite code on a device, in at least one embodiment. In at least one embodiment, runtime 3905 may include any technically feasible runtime system that is able to support execution of application S01.

In at least one embodiment, runtime 3905 is implemented as one or more runtime libraries associated with corresponding APIs, which are shown as API(s) 3904. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 3904 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, device kernel driver 3906 is configured to facilitate communication with an underlying device. In at least one embodiment, device kernel driver 3906 may provide low-level functionalities upon which APIs, such as API(s) 3904, and/or other software relies. In at least one embodiment, device kernel driver 3906 may be configured to compile intermediate representation ("IR") code into binary code at runtime. For CUDA, device kernel driver 3906 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 3906 to compile IR code at runtime.

In at least one embodiment, one or more systems depicted in FIG. 39 are utilized to generate and/or perform one or more software containers with various algorithms, formulas, and processes such as those described in connection with FIG. 1. In at least one embodiment, one or more systems depicted in FIG. 39 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 40:
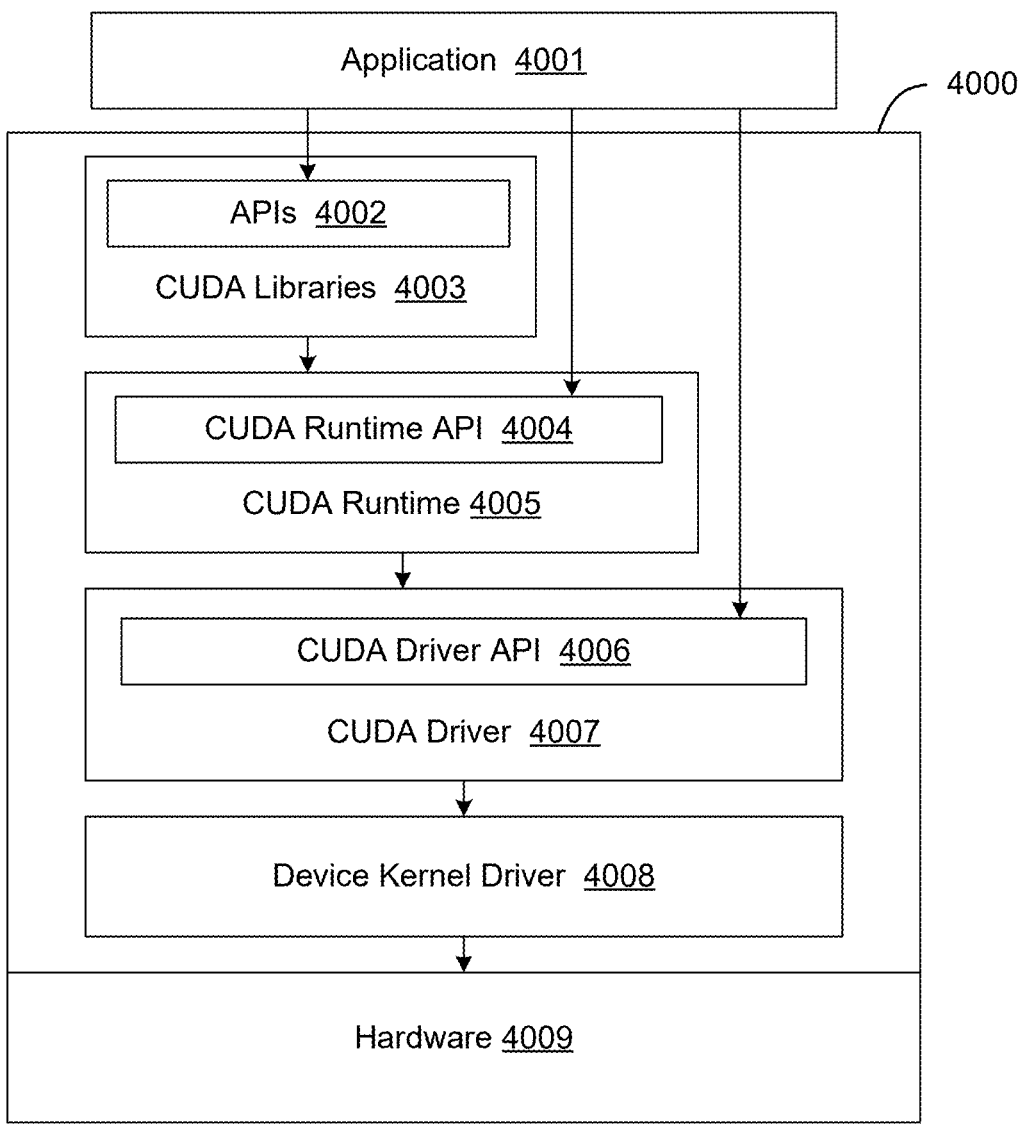
FIG. 40 illustrates a CUDA implementation of a software stack of FIG. 39, in accordance with at least one embodiment.

FIG. 40 illustrates a CUDA implementation of software stack 3900 of FIG. 39, in accordance with at least one embodiment. In at least one embodiment, a CUDA software stack 4000, on which an application 4001 may be launched, includes CUDA libraries 4003, a CUDA runtime 4005, a CUDA driver 4007, and a device kernel driver 4008. In at least one embodiment, CUDA software stack 4000 executes on hardware 4009, which may include a GPU that supports CUDA and is developed by NVIDIA Corporation of Santa Clara, CA.

In at least one embodiment, application 4001, CUDA runtime 4005, and device kernel driver 4008 may perform similar functionalities as application 3901, runtime 3905, and device kernel driver 3906, respectively, which are described above in conjunction with FIG. 39. In at least one embodiment, CUDA driver 4007 includes a library (libcuda.so) that implements a CUDA driver API 4006. Similar to a CUDA runtime API 4004 implemented by a CUDA runtime library (cudart), CUDA driver API 4006 may, without limitation, expose functions for memory management, execution control, device management, error handling, synchronization, and/or graphics interoperability, among other things, in at least one embodiment. In at least one embodiment, CUDA driver API 4006 differs from CUDA runtime API 4004 in that CUDA runtime API 4004 simplifies device code management by providing implicit initialization, context (analogous to a process) management, and module (analogous to dynamically loaded libraries) management. In contrast to high-level CUDA runtime API 4004, CUDA driver API 4006 is a low-level API providing more fine-grained control of a device, particularly with respect to contexts and module loading, in at least one embodiment. In at least one embodiment, CUDA driver API 4006 may expose functions for context management that are not exposed by CUDA runtime API 4004. In at least one embodiment, CUDA driver API 4006 is also language-independent and supports, e.g., OpenCL in addition to CUDA runtime API 4004. Further, in at least one embodiment, development libraries, including CUDA runtime 4005, may be considered as separate from driver components, including user-mode CUDA driver 4007 and kernel-mode device driver 4008 (also sometimes referred to as a "display" driver).

In at least one embodiment, CUDA libraries 4003 may include, but are not limited to, mathematical libraries, deep learning libraries, parallel algorithm libraries, and/or signal/image/video processing libraries, which parallel computing applications such as application 4001 may utilize. In at least one embodiment, CUDA libraries 4003 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 4003 may include deep learning libraries such as a cuDNN library of primitives for deep neural networks and a TensorRT platform for high-performance deep learning inference, among others.

In at least one embodiment, one or more systems depicted in FIG. 40 are utilized to generate and/or perform one or more software containers with various algorithms, formulas, and processes such as those described in connection with FIG. 1. In at least one embodiment, one or more systems depicted in FIG. 40 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 41:
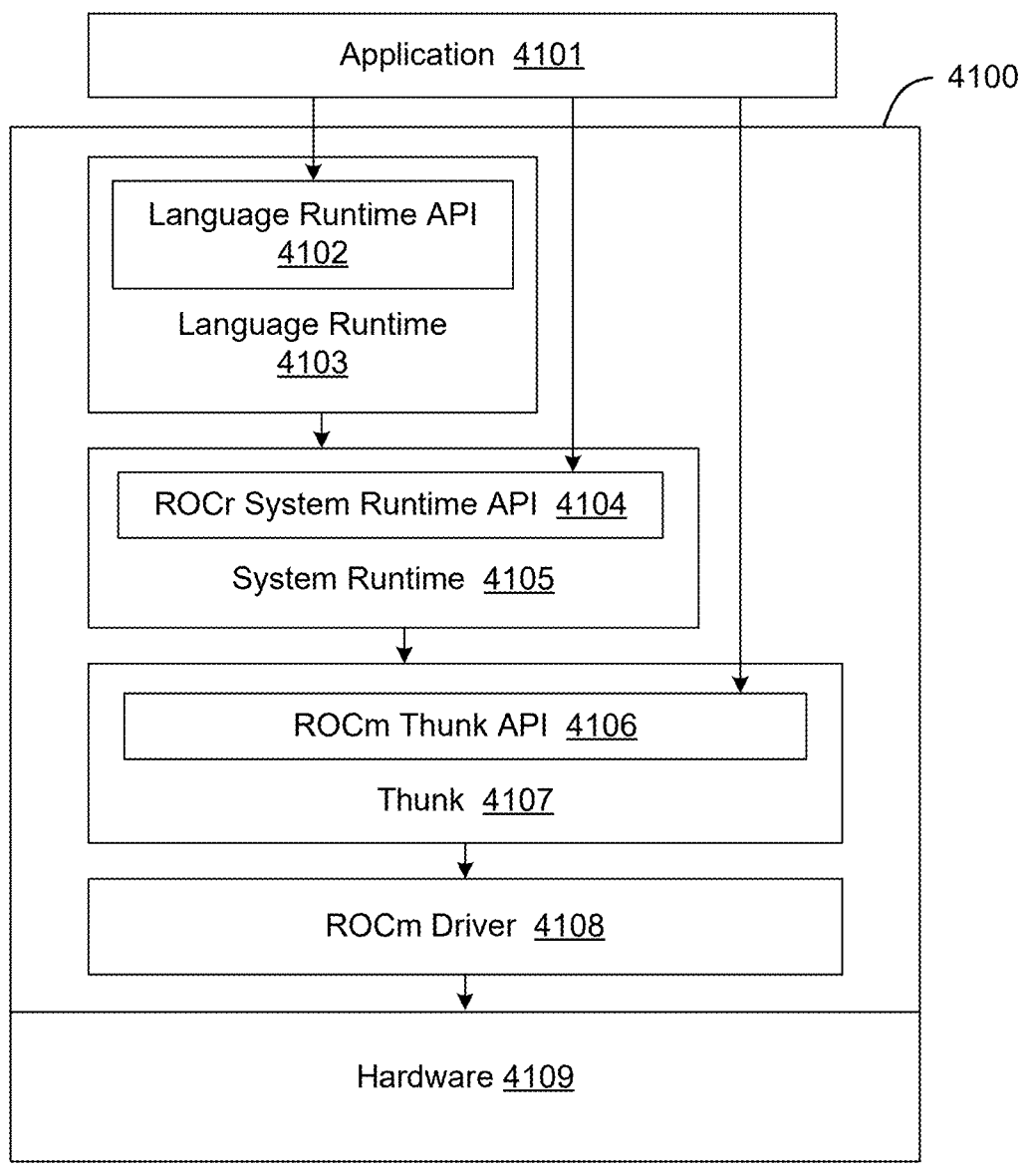
FIG. 41 illustrates a ROCm implementation of a software stack of FIG. 39, in accordance with at least one embodiment.

FIG. 41 illustrates a ROCm implementation of software stack 3900 of FIG. 39, in accordance with at least one embodiment. In at least one embodiment, a ROCm software stack 4100, on which an application 4101 may be launched, includes a language runtime 4103, a system runtime 4105, a thunk 4107, a ROCm kernel driver 4108, and a device kernel driver 4109. In at least one embodiment, ROCm software stack 4100 executes on hardware 4110, which may include a GPU that supports ROCm and is developed by AMD Corporation of Santa Clara, CA.

In at least one embodiment, application 4101 may perform similar functionalities as application 3901 discussed above in conjunction with FIG. 39. In addition, language runtime 4103 and system runtime 4105 may perform similar functionalities as runtime 3905 discussed above in conjunction with FIG. 39, in at least one embodiment. In at least one embodiment, language runtime 4103 and system runtime 4105 differ in that system runtime 4105 is a language-independent runtime that implements a ROCr system runtime API 4104 and makes use of a Heterogeneous System Architecture ("HAS") Runtime API. HAS runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 4105, language runtime 4103 is an implementation of a language-specific runtime API 4102 layered on top of ROCr system runtime API 4104, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 4004 discussed above in conjunction with FIG. 40, such as functions for memory management, execution control, device management, error handling, and synchronization, among other things.

In at least one embodiment, thunk (ROCt) 4107 is an interface that can be used to interact with underlying ROCm driver 4108. In at least one embodiment, ROCm driver 4108 is a ROCK driver, which is a combination of an AMDGPU driver and a HAS kernel driver (amdkfd). In at least one embodiment, AMDGPU driver is a device kernel driver for GPUs developed by AMD that performs similar function-alities as device kernel driver 3906 discussed above in conjunction with FIG. 39. In at least one embodiment, HAS kernel driver is a driver permitting different types of processors to share system resources more effectively via hardware features.

In at least one embodiment, various libraries (not shown) may be included in ROCm software stack 4100 above language runtime 4103 and provide functionality similarity to CUDA libraries 4003, discussed above in conjunction with FIG. 40. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, one or more systems depicted in FIG. 41 are utilized to generate and/or perform one or more software containers with various algorithms, formulas, and processes such as those described in connection with FIG. 1. In at least one embodiment, one or more systems depicted in FIG. 41 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 42:
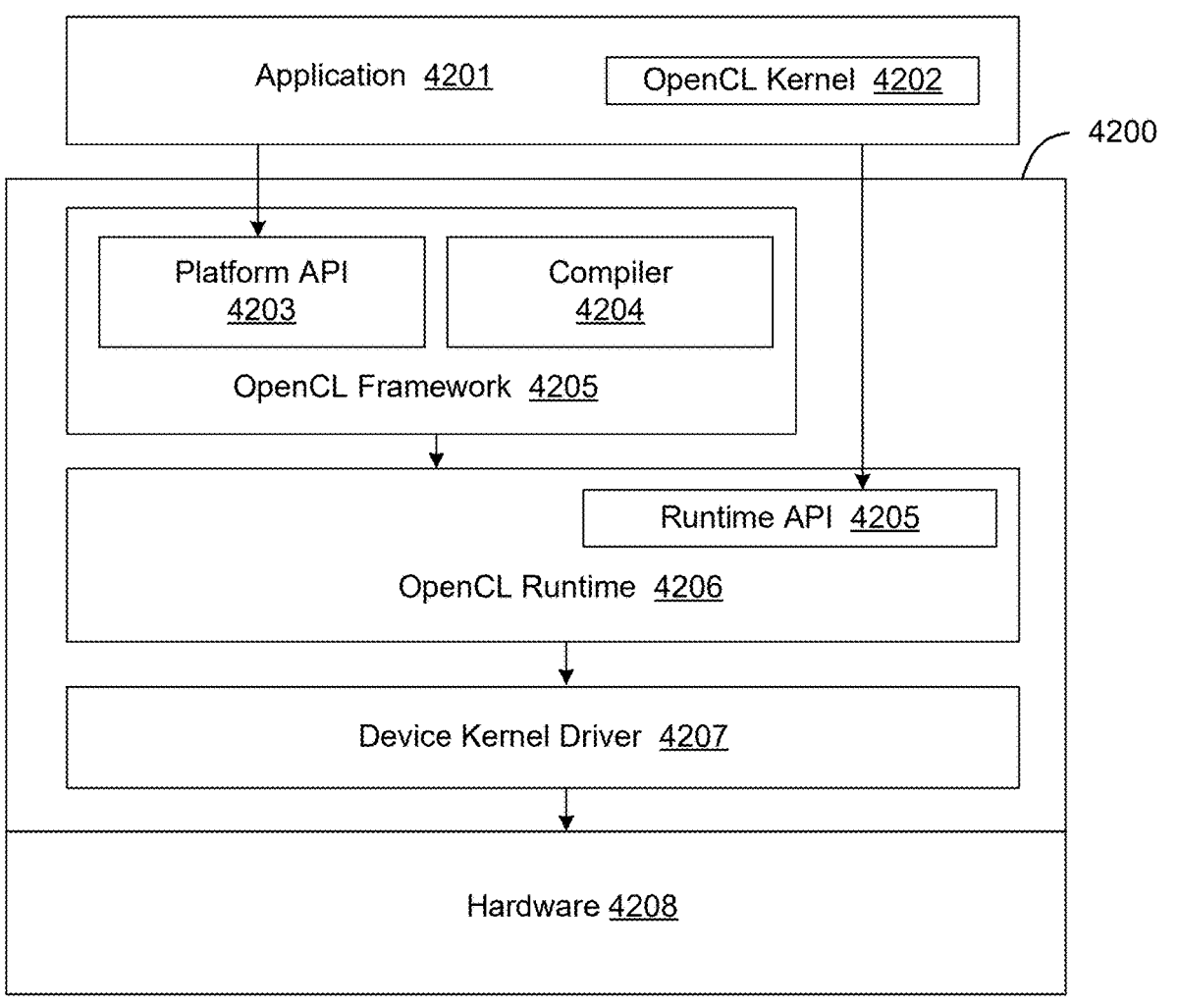
FIG. 42 illustrates an OpenCL implementation of a software stack of FIG. 39, in accordance with at least one embodiment.

FIG. 42 illustrates an OpenCL implementation of software stack 3900 of FIG. 39, in accordance with at least one embodiment. In at least one embodiment, an OpenCL software stack 4200, on which an application 4201 may be launched, includes an OpenCL framework 4205, an OpenCL runtime 4206, and a driver 4207. In at least one embodiment, OpenCL software stack 4200 executes on hardware 4009 that is not vendor-specific. As OpenCL is supported by devices developed by different vendors, specific OpenCL drivers may be required to interoperate with hardware from such vendors, in at least one embodiment.

In at least one embodiment, application 4201, OpenCL runtime 4206, device kernel driver 4207, and hardware 4208 may perform similar functionalities as application 3901, runtime 3905, device kernel driver 3906, and hardware 3907, respectively, that are discussed above in conjunction with FIG. 39. In at least one embodiment, application 4201 further includes an OpenCL kernel 4202 with code that is to be executed on a device.

In at least one embodiment, OpenCL defines a "platform" that allows a host to control devices connected to a host. In at least one embodiment, an OpenCL framework provides a platform layer API and a runtime API, shown as platform API 4203 and runtime API 4205. In at least one embodiment, runtime API 4205 uses contexts to manage execution of kernels on devices. In at least one embodiment, each identified device may be associated with a respective context, which runtime API 4205 may use to manage command queues, program objects, and kernel objects, share memory objects, among other things, for that device. In at least one embodiment, platform API 4203 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 4204 is also included in OpenCL frame-work 4205. Source code may be compiled offline prior to executing an application or online during execution of an application, in at least one embodiment. In contrast to CUDA and ROCm, OpenCL applications in at least one embodiment may be compiled online by compiler 4204, which is included to be representative of any number of compilers that may be used to compile source code and/or IR code, such as Standard Portable Intermediate Representation ("SPIR-V") code, into binary code. Alternatively, in at least one embodiment, OpenCL applications may be compiled offline, prior to execution of such applications.

In at least one embodiment, one or more systems depicted in FIG. 42 are utilized to generate and/or perform one or more software containers with various algorithms, formulas, and processes such as those described in connection with FIG. 1. In at least one embodiment, one or more systems depicted in FIG. 42 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 43:
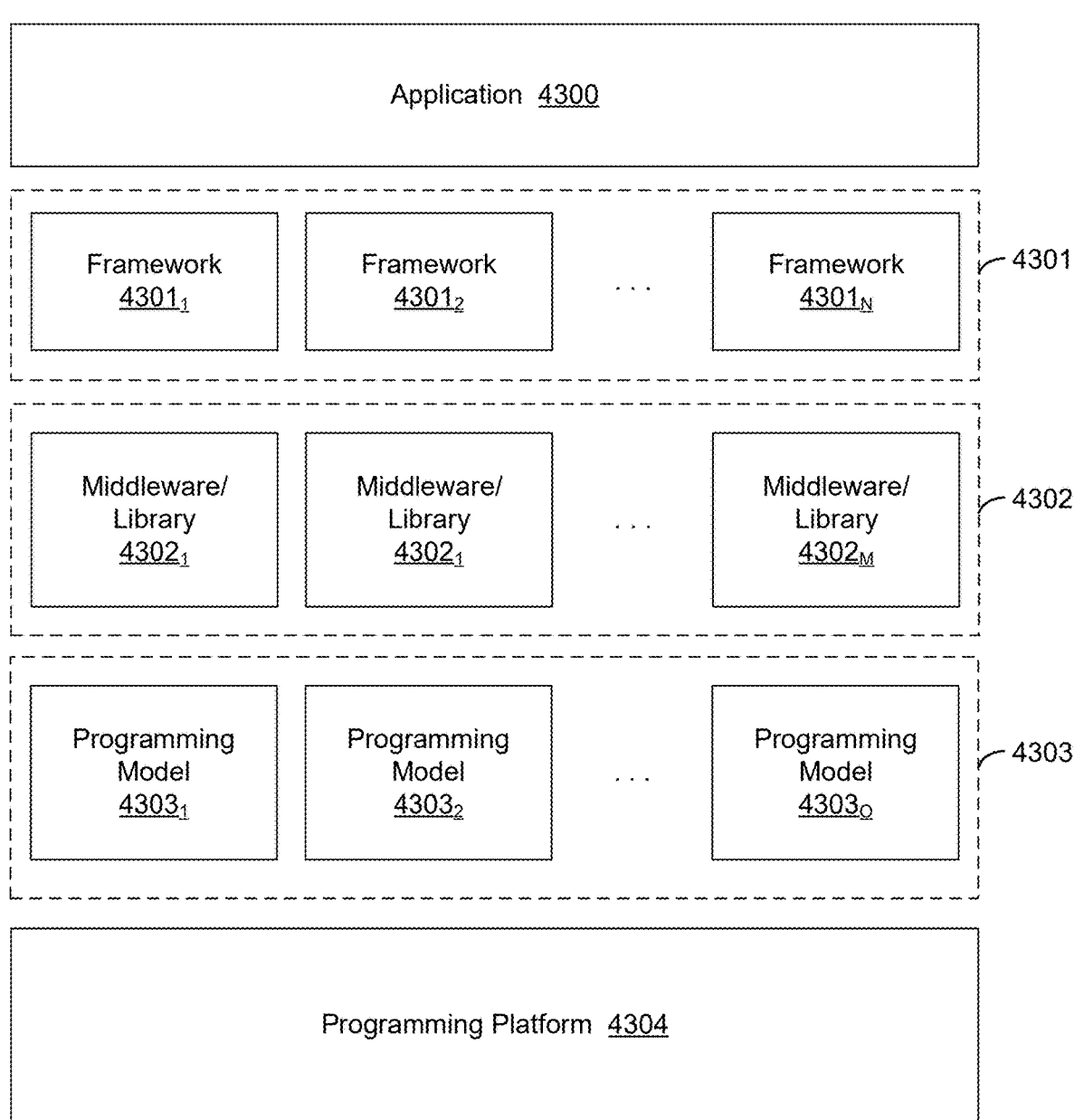
FIG. 43 illustrates software that is supported by a programming platform, in accordance with at least one embodiment.

FIG. 43 illustrates software that is supported by a programming platform, in accordance with at least one embodiment. In at least one embodiment, a programming platform 4304 is configured to support various programming models 4303, middlewares and/or libraries 4302, and frameworks 4301 that an application 4300 may rely upon. In at least one embodiment, application 4300 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 4304 may be one of a CUDA, ROCm, or OpenCL platform described above in conjunction with FIG. 40, FIG. 41, and FIG. 42, respectively. In at least one embodiment, programming platform 4304 supports multiple programming models 4303, which are abstractions of an underlying computing system permitting expressions of algorithms and data structures. Programming models 4303 may expose features of underlying hardware in order to improve performance, in at least one embodiment. In at least one embodiment, programming models 4303 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 4302 provide implementations of abstractions of programming models 4304. In at least one embodiment, such libraries include data and programming code that may be used by computer programs and leveraged during software development. In at least one embodiment, such middlewares include software that provides services to applications beyond those available from programming platform 4304. In at least one embodiment, libraries and/or middlewares 4302 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 4302 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 4301 depend on libraries and/or middlewares 4302. In at least one embodiment, each of application frameworks 4301 is a software framework used to implement a standard structure of application software. An AI/ML application may be implemented using a framework such as Caffe, Caffe2, TensorFlow, Keras, PyTorch, or MxNet deep learning frameworks, in at least one embodiment.

In at least one embodiment, one or more systems depicted in FIG. 43 are utilized to generate and/or perform one or more software containers with various algorithms, formulas, and processes such as those described in connection with FIG. 1. In at least one embodiment, one or more systems depicted in FIG. 43 are utilized to implement one or more systems and/or processes such as those described in connection with FIGS. 1-7, such as a processor comprising one or more circuits to generate one or more software containers, wherein one or more software containers are to automatically provide network configuration information to one or more proxy servers and/or otherwise perform operations described herein.

Figure 44:
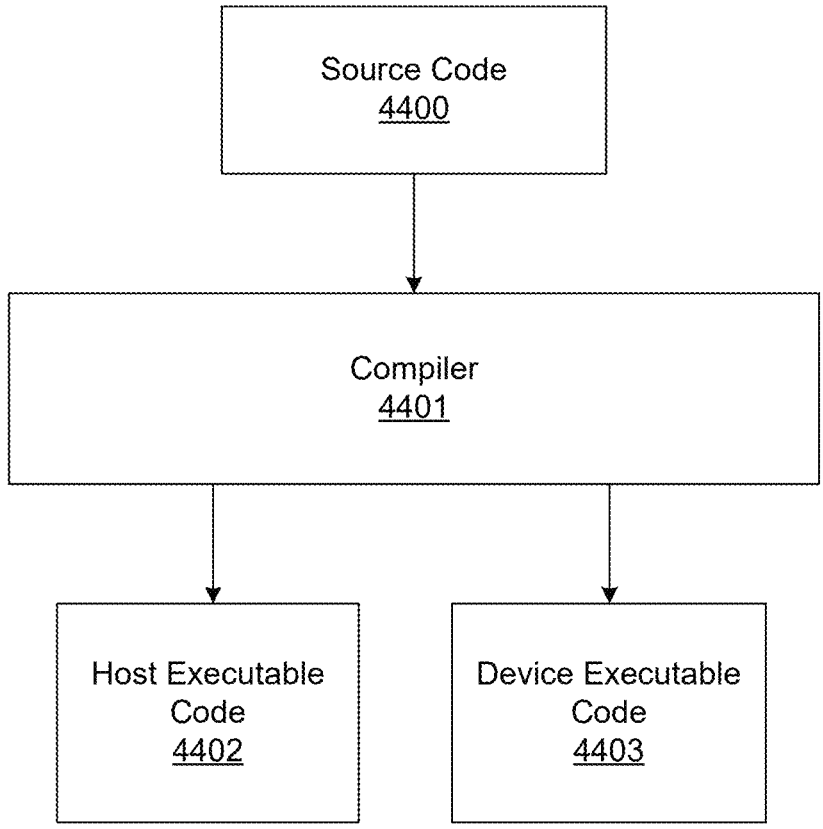
FIG. 44 illustrates compiling code to execute on programming platforms of FIGS. 39-42, in accordance with at least one embodiment.

FIG. 44 illustrates compiling code to execute on one of programming platforms of FIGS. 39-42, in accordance with at least one embodiment. In at least one embodiment, a compiler 4401 receives source code 4400 that includes both host code as well as device code. In at least one embodiment, complier 4401 is configured to convert source code 4400 into host executable code 4402 for execution on a host and device executable code 4403 for execution on a device. In at least one embodiment, source code 4400 may either be compiled offline prior to execution of an application, or online during execution of an application.

In at least one embodiment, source code 4400 may include code in any programming language supported by compiler 4401, such as C++, C, Fortran, etc. In at least one embodiment, source code 4400 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 4400 may include multiple source code files, rather than a single-source file, into which host code and device code are separated.

In at least one embodiment, compiler 4401 is configured to compile source code 4400 into host executable code 4402 for execution on a host and device executable code 4403 for execution on a device. In at least one embodiment, compiler 4401 performs operations including parsing source code 4400 into an abstract system tree (AST), performing optimizations, and generating executable code. In at least one embodiment in which source code 4400 includes a single-source file, compiler 4401 may separate device code from host code in such a single-source file, compile device code and host code into device executable code 4403 and host executable code 4402, respectively, and link device executable code 4403 and host executable code 4402 together in a single file, as discussed in greater detail below with respect to FIG. 33.

In at least one embodiment, host executable code 4402 and device executable code 4403 may be in any suitable format, such as binary code and/or IR code. In a case of CUDA, host executable code 4402 may include native object code and device executable code 4403 may include code in PTX intermediate representation, in at least one embodiment. In a case of ROCm, both host executable code 4402 and device executable code 4403 may include target binary code, in at least one embodiment.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

At least one embodiment of the disclosure can be described in view of the following clauses:

Clause 1. A processor comprising: one or more circuits to generate one or more software containers, wherein the one or more software containers are to automatically provide network configuration information to one or more proxy servers.

Clause 2. The processor of Clause 1, wherein the one or more circuits are to generate one or more software containers to comprise instructions to configure the one or more proxy servers to use one or more selected firewall ports.

Clause 3. The processor of any one of the preceding Clauses, wherein the one or more selected firewall ports are to be randomly selected.

Clause 4. The processor of any one of the preceding Clauses, wherein the one or more software containers are to be generated to comprise one or more programs to cause the one or more proxy servers to be configured based, at least in part, on the network configuration information.

Clause 5. The processor of any one of the preceding Clauses, wherein an application program included in the one or more software containers communicates with a client application through the one or more proxy servers.

Clause 6. The processor of any one of the preceding Clauses, wherein graphics are streamed to a client via one or more randomly configured firewall ports.

Clause 7. The processor of any one of the preceding Clauses, wherein one or more streaming sessions communicate through the one or more proxy servers.

Clause 8. The processor of any one of the preceding Clauses, wherein one or more streaming sessions communicating through the one or more proxy servers expire when not renewed within a threshold amount of time.

Clause 9. A system comprising:
one or more processors to generate one or more software containers, wherein the one or more software containers are to automatically provide network configuration information to one or more proxy servers.

Clause 10. The system of Clause 9, wherein the one or more processors are to generate one or more software containers to comprise instructions to configure the one or more proxy servers to use one or more selected firewall ports.

Clause 11. The system of any one of the preceding Clauses, wherein the one or more software containers are to be generated to comprise one or more programs to cause the one or more proxy servers to be configured based, at least in part, on the network configuration information.

Clause 12. The system of any one of the preceding Clauses, wherein an application program included in the one or more software containers communicates with a client application through the one or more proxy servers.

Clause 13. The system of any one of the preceding Clauses, wherein graphics are to be streamed to a client via one or more randomly configured firewall ports.

Clause 14. The system of any one of the preceding Clauses, wherein one or more streaming sessions communicate through the one or more proxy servers.

Clause 15. A method comprising:
generating one or more software containers, wherein the one or more software containers are to automatically provide network configuration information to one or more proxy servers.

Clause 16. The method of Clause 15, wherein generating one or more software containers includes generating instructions to configure the one or more proxy servers to use one or more selected firewall ports.

Clause 17. The method of any one of the preceding Clauses, further comprising selecting randomly one or more selected firewall ports.

Clause 18. The method of any one of the preceding Clauses, wherein the one or more software containers are to be generated to comprise a program cause the one or more proxy servers to be configured based, at least in part, on the network configuration information.

Clause 19. The method of any one of the preceding Clauses, wherein an application program included in the one or more software containers communicates with a client application through the one or more proxy servers.

Clause 20. The method of any one of the preceding Clauses, further comprising streaming graphics to a client via one or more randomly configured firewall ports.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, a number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium. In at least one embodiment, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals.

In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—in at least one embodiment, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, in at least one embodiment, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A processor, comprising:
one or more circuits to cause:
a software container to automatically provide network configuration information to one or more proxy servers, wherein the one or more proxy servers are configured to associate the software container with one or more firewall ports based, at least in part, on the network configuration information received from the software container, wherein the software container is software, including an application program and one or more software libraries, to enable the application program to run in a computing environment independently of an underlying operating system of the computing environment; and
the software container to receive network traffic from the one or more firewall ports via the one or more proxy servers.

2. The processor of claim 1, wherein the one or more circuits are to generate the software container to comprise instructions to configure the one or more proxy servers to use the one or more firewall ports.

3. The processor of claim 1, wherein the one or more firewall ports are to be randomly selected.

4. The processor of claim 1, wherein the software container is generated to comprise one or more programs to cause the one or more proxy servers to be configured based, at least in part, on network configuration information associated with the firewall ports.

5. The processor of claim 1, wherein an application program included in the software container communicates with a client application through one or more proxy servers using the one or more firewall ports.

6. The processor of claim 1, wherein graphics are streamed to a client from the software container via the one or more firewall ports, and wherein the one or more firewall ports are randomly configured.

7. The processor of claim 1, wherein the one or more firewall ports are automatically associated with the software container via the one or more proxy servers, and wherein one or more streaming sessions communicate through the one or more proxy servers with the software container.

8. The processor of claim 7, wherein one or more streaming sessions communicating through the one or more proxy servers expire when one or more leases on the one or more firewall ports are not renewed by a component of the software container within a threshold amount of time.

9. A system, comprising:
one or more processors to cause:
a software container to automatically provide network configuration information to one or more proxy servers, wherein the one or more proxy servers are configured to associate the software container with one or more firewall ports based, at least in part, on the network configuration information received from the software container, wherein the software container is software, including an application program and one or more software libraries, to enable the application program to run in a computing environment independently of an underlying operating system of the computing environment; and
the software container to receive network traffic from the one or more firewall ports via the one or more proxy servers.

10. The system of claim 9, wherein the one or more processors are to generate the software container to comprise instructions to configure the one or more proxy servers to use the one or more firewall ports.

11. The system of claim 9, wherein the software container is generated to comprise one or more programs to cause the one or more proxy servers to be configured based, at least in part, on network configuration information associated with the firewall ports.

12. The system of claim 9, wherein an application program included in the software container communicates with a client application through one or more proxy servers using the one or more firewall ports.

13. The system of claim 9, wherein graphics are to be streamed to a client from the software container via the one or more firewall ports, and wherein the one or more firewall ports are randomly configured.

14. The system of claim 9, wherein the one or more firewall ports are automatically associated with the software container via the one or more proxy servers, and wherein one or more streaming sessions communicate through the one or more proxy servers with the software container.

15. A method, comprising:
automatically providing, by a software container network configuration information to one or more proxy servers, wherein the one or more proxy servers are configured to associate the software container with one or more firewall ports based, at least in part, on the network configuration information received from the software container, wherein the software container is software, including an application program and one or more software libraries, to enable the application program to run in a computing environment independently of an underlying operating system of the computing environment; and
receiving, by the software container, network traffic from the one or more firewall ports via the one or more proxy servers.

16. The method of claim 15, further comprising generating the software container to include instructions to configure the one or more proxy servers to use the one or more firewall ports.

17. The method of claim 15, further comprising selecting randomly the one or more firewall ports.

18. The method of claim 15, wherein the software container are generated to comprise a program to cause the one or more proxy servers to be configured based, at least in part, on network configuration information associated with the firewall ports.

19. The method of claim 15, wherein an application program included in the software container communicates with a client application through one or more proxy servers using the one or more firewall ports.

20. The method of claim 15, further comprising streaming graphics to a client from the software container via the one or more firewall ports.

* * * * *